US012642725B2

(12) United States Patent
Bertoni et al.

(10) Patent No.: US 12,642,725 B2
(45) Date of Patent: Jun. 2, 2026

(54) BEDS AND OTHER BODY SUPPORT DEVICES WITH INDIVIDUALLY CONTROLLABLE CELLS COMPRISING ONE OR MORE AIR BLADDERS

(71) Applicant: LeviSense Medical, Inc., Beverly, MA (US)

(72) Inventors: David Bertoni, Beverly, MA (US); Matthew Culen, Medford, MA (US); Jason Fox, Somerville, MA (US); James Bleck, Chelmsford, MA (US); Thomas Eagan, Jr., Chelmsford, MA (US)

(73) Assignee: LeviSense Medical, Inc., Beverly, MA (US)

( * ) Notice: Subject to any disclaimer, the term of this patent is extended or adjusted under 35 U.S.C. 154(b) by 365 days.

(21) Appl. No.: 17/924,437

(22) PCT Filed: May 11, 2021

(86) PCT No.: PCT/US2021/031753
§ 371 (c)(1),
(2) Date: Nov. 10, 2022

(87) PCT Pub. No.: WO2021/231407
PCT Pub. Date: Nov. 18, 2021

(65) Prior Publication Data
US 2023/0181396 A1 Jun. 15, 2023

Related U.S. Application Data

(60) Provisional application No. 63/131,619, filed on Dec. 29, 2020, provisional application No. 63/023,805, filed on May 12, 2020.

(51) Int. Cl.
*A61G 7/057* (2006.01)
*A47C 27/08* (2006.01)
(Continued)

(52) U.S. Cl.
CPC ......... *A61G 7/05776* (2013.01); *A61G 7/018* (2013.01); *A47C 27/083* (2013.01); *A47C 27/10* (2013.01); *A61G 2203/30* (2013.01)

(58) Field of Classification Search
CPC ................ A61G 2203/30; A61G 7/018; A61G 7/05769; A61G 2203/34; A61G 7/05776;
(Continued)

(56) References Cited

U.S. PATENT DOCUMENTS 3,467,973 A 9/1969 Minnick
3,605,145 A 9/1971 Graebe
(Continued)

FOREIGN PATENT DOCUMENTS

CA 2774433 A1 2/2011
CN 1105538 C 4/2003
(Continued)

OTHER PUBLICATIONS

Invitation to Pay Additional Fees for International Application No. PCT/US2021/031753 dated Jul. 19, 2021.
(Continued)

*Primary Examiner* — Justin C Mikowski
*Assistant Examiner* — Deborah Talitha Gedeon
(74) *Attorney, Agent, or Firm* — Wolf, Greenfield & Sacks, P.C.

(57) ABSTRACT

Devices, systems, and methods for supporting the body of user are described. Devices, systems, and methods can employ a plurality of cells where each of the cells within the plurality of cells can comprise a bladder containing air or another compressible fluid supported by a base that forms a fluid-tight seal with the bladder The base and bladder can be constructed and arranged so that the bladder forms a rolling diaphragm portion with the base. The height and/or applied pressure in response to an applied load of such bladder may
(Continued)

be adjustable substantially independent of the crosssectional shape and dimensions of the bladder. Each of the cells within the plurality of cells which may be a subset or all of the cells of a given support, can also comprise, or otherwise be operatively associated with its own: pressure sensor, height sensor, or both, and/or controllable inlet/outlet valve(s).

22 Claims, 42 Drawing Sheets

(51) Int. Cl.
*A47C 27/10* (2006.01)
*A61G 7/018* (2006.01)

(58) Field of Classification Search
CPC ............ A61G 2203/42; A61G 2203/40; A61G 7/05761; A47C 27/083; A47C 27/10; A47C 27/084; A47C 27/081
USPC ......... 5/710, 713, 655, 671, 672, 655.3, 706
See application file for complete search history.

(56) References Cited

U.S. PATENT DOCUMENTS 3,822,425 A 7/1974 Scales
3,870,450 A 3/1975 Graebe
3,999,234 A 12/1976 Regan
4,005,236 A 1/1977 Graebe
4,134,168 A 1/1979 Guigan
4,541,136 A 9/1985 Graebe
4,542,547 A 9/1985 Sato
4,617,690 A 10/1986 Graebe
4,722,105 A 2/1988 Douglas
4,799,276 A 1/1989 Kadish
4,864,671 A 9/1989 Evans
4,947,500 A 8/1990 Seiler
4,949,412 A 8/1990 Goode
4,949,413 A 8/1990 Goodwin
5,020,176 A 6/1991 Dotson
5,052,068 A 10/1991 Graebe
5,060,326 A 10/1991 Oswald
5,070,560 A 12/1991 Wilkinson
5,090,077 A 2/1992 Caden et al.
5,163,196 A 11/1992 Graebe et al.
5,210,889 A 5/1993 Wesemann et al.
5,279,010 A 1/1994 Ferrand et al.
5,332,202 A 7/1994 Wagner et al.
5,414,874 A 5/1995 Wagner et al.
5,435,023 A 7/1995 Wagner et al.
5,446,933 A 9/1995 Gabelhouse
5,483,709 A 1/1996 Foster et al.
5,493,742 A 2/1996 Klearman
5,502,855 A 4/1996 Graebe
5,542,136 A 8/1996 Tappel
5,558,314 A 9/1996 Weinstein
5,592,706 A 1/1997 Pearce
5,649,331 A 7/1997 Wilkinson et al.
5,651,151 A 7/1997 Schild
5,652,985 A 8/1997 Wilkinson et al.
5,771,511 A 6/1998 Kummer et al.
5,797,155 A 8/1998 Maier et al.
5,802,640 A 9/1998 Ferrand et al.
5,815,864 A 10/1998 Sloop
5,836,027 A 11/1998 Leventhal et al.
5,873,137 A 2/1999 Yavets-Chen
5,944,494 A 8/1999 Soltani et al.
5,963,997 A 10/1999 Hagopian
6,008,598 A 12/1999 Luff et al.
6,036,271 A 3/2000 Wilkinson et al.
6,073,290 A 6/2000 Miller, Sr.
6,154,907 A 12/2000 Cinquin
6,223,369 B1 5/2001 Maier et al.
6,320,510 B2 11/2001 Menkedick et al.
6,321,878 B1 11/2001 Mobley et al.
6,351,862 B1 3/2002 Henley et al.
6,487,738 B1 12/2002 Graebe
6,516,483 B1 2/2003 VanSteenburg
6,591,437 B1 7/2003 Phillips
6,687,937 B2 2/2004 Harker
6,701,556 B2 3/2004 Romano et al.
6,721,981 B1 4/2004 Greenhaigh et al.
6,735,799 B1 5/2004 Ellis et al.
6,739,009 B2 5/2004 Drago
6,829,797 B2 12/2004 Partian
6,898,814 B2 5/2005 Kawamura et al.
7,069,610 B1 7/2006 Chai
7,251,845 B2 8/2007 Schaller et al.
7,253,366 B2 8/2007 Bhai
7,409,735 B2 8/2008 Kramer et al.
7,437,787 B2 10/2008 Bhai
7,444,704 B2 11/2008 Phillips et al.
7,458,119 B2 12/2008 Hornbach et al.
7,469,433 B2 12/2008 Ruehl et al.
7,480,953 B2 1/2009 Romano et al.
7,487,562 B2 2/2009 Frondorf et al.
7,506,390 B2 3/2009 Dixon et al.
7,515,059 B2 4/2009 Price et al.
7,520,006 B2 4/2009 Menkedick et al.
7,520,011 B1 4/2009 Liberkowski
7,533,429 B2 5/2009 Menkedick et al.
7,559,106 B1 7/2009 Crousore et al.
7,610,637 B2 11/2009 Menkedick et al.
7,669,263 B2 3/2010 Menkedick et al.
7,681,270 B2 3/2010 Wyatt et al.
7,698,765 B2 4/2010 Bobey et al.
7,703,158 B2 4/2010 Wilker, Jr. et al.
D616,679 S 6/2010 Heimbrock et al.
D617,586 S 6/2010 Heimbrock et al.
D617,589 S 6/2010 Heimbrock et al.
7,779,496 B2 8/2010 Crousore et al.
7,834,768 B2 11/2010 Dixon et al.
D628,416 S 12/2010 Heimbrock et al.
7,921,488 B2 4/2011 King et al.
7,966,680 B2 6/2011 Romano et al.
8,104,126 B2 1/2012 Caminade et al.
8,341,777 B2 1/2013 Hensley et al.
8,533,879 B1 9/2013 Taylor
8,572,783 B2 11/2013 Moutafis
8,601,620 B2 12/2013 Romano et al.
8,717,181 B2 5/2014 Tallent et al.
8,789,224 B2 7/2014 Wyatt et al.
8,813,284 B2 8/2014 Teasdale et al.
8,832,883 B2 9/2014 Schwirian et al.
8,832,884 B2 9/2014 Stacy et al.
8,832,885 B2 9/2014 Lafleche et al.
8,832,886 B2 9/2014 Riley et al.
8,955,178 B2 2/2015 Robertson
9,038,217 B2 5/2015 Elliot et al.
9,044,367 B2 6/2015 Yakam et al.
9,072,638 B2 7/2015 Heimbrock et al.
9,078,795 B1 7/2015 Wilkinson et al.
9,089,462 B1 7/2015 Lafleche
9,173,795 B2 11/2015 Heidlage et al.
9,198,521 B2 12/2015 Robertson
9,241,571 B2 1/2016 Robertson
9,420,895 B2 8/2016 Lafleche et al.
9,468,307 B2 10/2016 Lafleche et al.
9,474,375 B2 10/2016 Robertson
D770,827 S 11/2016 Newkirk et al.
D770,828 S 11/2016 Newkirk et al.
D770,829 S 11/2016 Newkirk et al.
D771,259 S 11/2016 Newkirk et al.
9,526,349 B2 12/2016 Lafleche et al.
D817,058 S 5/2018 Newkirk et al.
D826,615 S 8/2018 Newkirk et al.
D826,616 S 8/2018 Newkirk et al.
10,045,715 B2 8/2018 Hoffman et al.
10,137,044 B2 11/2018 Fisk et al.
10,226,132 B2 3/2019 Broom et al.
10,251,797 B2 4/2019 Kramer et al.
10,334,951 B2 7/2019 Robertson et al.
10,405,660 B2 9/2019 Robertson

(56) References Cited

U.S. PATENT DOCUMENTS

| | | | | |
|---|---|---|---|---|
| 10,492,619 | B2 | 12/2019 | Ohno | |
| 10,925,410 | B2 | 2/2021 | Hsu et al. | |
| 2003/0037377 | A1 | 2/2003 | Kawamura et al. | |
| 2003/0159219 | A1 | 8/2003 | Harrison et al. | |
| 2005/0081300 | A1 | 4/2005 | O'Reagan et al. | |
| 2007/0132292 | A1 | 6/2007 | Robertson | |
| 2007/0277320 | A1 | 12/2007 | Massmann | |
| 2008/0052837 | A1 | 3/2008 | Blumberg | |
| 2008/0086821 | A1* | 4/2008 | Friedrichs | A47C 27/10 5/713 |
| 2009/0106905 | A1 | 4/2009 | Ochi et al. | |
| 2009/0237264 | A1 | 9/2009 | Bobey et al. | |
| 2009/0314354 | A1 | 12/2009 | Chaffee | |
| 2010/0011502 | A1 | 1/2010 | Brykalski et al. | |
| 2010/0132116 | A1 | 6/2010 | Stacy et al. | |
| 2010/0132118 | A1 | 6/2010 | Robertson | |
| 2010/0139003 | A1* | 6/2010 | Moutafis | A47C 27/081 5/655.3 |
| 2010/0205750 | A1 | 8/2010 | McCausland et al. | |
| 2011/0047709 | A1 | 3/2011 | Tarsaud et al. | |
| 2011/0163885 | A1 | 7/2011 | Poulos et al. | |
| 2012/0193946 | A1 | 8/2012 | Robertson | |
| 2013/0006151 | A1 | 1/2013 | Main et al. | |
| 2014/0035336 | A1 | 2/2014 | Robertson | |
| 2014/0059780 | A1 | 3/2014 | Lafleche et al. | |
| 2014/0215721 | A1 | 8/2014 | Moutafis | |
| 2014/0304915 | A1 | 10/2014 | Lachenbruch | |
| 2016/0058641 | A1* | 3/2016 | Moutafis | A47C 27/084 5/672 |
| 2016/0262548 | A1 | 9/2016 | Broom et al. | |
| 2016/0286970 | A1 | 10/2016 | Robertson | |
| 2017/0343675 | A1 | 11/2017 | Oggier et al. | |
| 2017/0347797 | A1 | 12/2017 | Robertson | |
| 2020/0029704 | A1 | 1/2020 | Karschnik et al. | |
| 2020/0054149 | A1* | 2/2020 | Ohno | G05D 7/0676 |
| 2023/0000261 | A1 | 1/2023 | Webster | |

FOREIGN PATENT DOCUMENTS

| | | | | |
|---|---|---|---|---|
| CN | 104433487 | B | 3/2015 | |
| CN | 102753057 | B | 8/2015 | |
| CN | 102686129 | B | 12/2015 | |
| CN | 104545110 | B | 4/2018 | |
| EP | 0 360 733 | A2 | 3/1990 | |
| EP | 1 754 462 | A2 | 2/2007 | |
| EP | 2 467 044 | B1 | 5/2015 | |
| EP | 2 490 574 | B1 | 4/2021 | |
| FR | 2949321 | A1 | 3/2011 | |
| JP | 2887767 | B2 * | 4/1999 | |
| JP | 2007-313348 | A | 12/2007 | |
| JP | 2008-543351 | A | 12/2008 | |
| JP | 2017-064014 | A | 4/2017 | |
| MX | 2012002037 | A | 9/2012 | |
| WO | WO 97/05843 | A1 | 2/1997 | |
| WO | WO 97/36521 | A1 | 10/1997 | |
| WO | WO 00/72729 | A1 | 12/2000 | |
| WO | WO 01/01822 | A1 | 1/2001 | |
| WO | WO 01/91617 | A1 | 12/2001 | |
| WO | WO 2007/008831 | A2 | 1/2007 | |
| WO | WO 2011/006093 | A1 | 1/2011 | |
| WO | WO-2011097569 | A2 * | 8/2011 | A47C 27/10 |
| WO | WO 2014/153049 | A1 | 9/2014 | |
| WO | WO 2015/011432 | A1 | 1/2015 | |

OTHER PUBLICATIONS

International Search Report and Written Opinion for International Application No. PCT/US2021/031753 dated Oct. 1, 2021.
International Preliminary Report on Patentability for International Application No. PCT/US2021/031753 dated Nov. 24, 2022.
Extended European Search Report for EP Application No. 07862665.2 dated Mar. 29, 2012.
International Search Report and Written Opinion for International Application No. PCT/US2007/025132 dated Apr. 28, 2008.
International Preliminary Report on Patentability for International Application No. PCT/US2007/025132 dated Jun. 18, 2009.
International Search Report and Written Opinion for International Application No. PCT/US2014/028835 dated Aug. 5, 2014.
International Preliminary Report on Patentability for International Application No. PCT/US2014/028835 dated Sep. 24, 2015.
[No Author Listed], Air Bellows Series. Numatics. Emerson Industrial Information. Jan. 2006:34 pages.
[No Author Listed], Mattresses. Linet. 2022. https://www.linet.com/en/products/mattresses [last accessed Nov. 17, 2022]. 3 pages.
[No Author Listed], MicroPressure Board Mount Pressure Sensors Compact, High Accuracy, Compensated/Amplified. MPR Series. Honeywell. Issue F. Sep. 2019: 25 pages.
[No Author Listed], P500 Low Air Loss Mattresses. Hillrom. https://www.hill-rom.com/USA/Products/Category/Support-Surfaces/P500-Low-Air-Loss-Mattresses/.
[No Author Listed], Proximity and ambient light sensing (ALS) module. VL6180X. STMicroelectronics. Mar. 2016;026171(7):87 pages.
[No Author Listed], Rapid-Air™ Mattress Overlay System—Model 4300. Blue Chip Medical Products, Inc. 2022. https://www.bluechipmedical.com/mattress-overlays/air-water-overlays/rapid-air/ [last accessed Nov. 17, 2022]. 9 pages.
[No Author Listed], Rolling Diaphragm Air Cylinders. ControlAir Inc. Jun. 2, 2004:12 pages.
Fader et al., Effects of absorbent incontinence pads on pressure management mattresses. J Adv Nurs. Dec. 2004;48(6):569-74.
Fleck et al., Use of alternatives to air-fluidized support surfaces in the care of complex wounds in postflap and postgraft patients. J Am Col Certif Wound Spec. Mar. 21, 2010;2(1):4-8. doi: 10.1016/j.jcws.2010.02.002.
Maklebust et al., Pressure relief capabilities of the Sof.Care bed and the Clinitron bed. Ostomy Wound Manage. 1988 Winter;21:32, 36-41, 44.
Myers et al., Computer-controller, Air-modulated Matttress For The Prevention Of Decubiti. Proceedings of the Annual International Conference of the IEEE Engineering in Medicine and Biology Society. Oct. 31, 1991;13:1932-3.
Russo et al., Hospitalizations Related to Pressure Ulcers among Adults 18 Years and Older, 2006. Healthcare Cost & Utilization Product. Dec. 2008. <https://www.hcup-us.ahrq.gov/reports/statbriefs/sb64.jsp> [last accessed Nov. 17, 2022]. 8 pages.
Small, Flat circular punch testing of clinical support surfaces. Engineering in Medicine. 1980;9(1):9-16.
Todd et al., Polyurethane foams: Effects of specimen size when determining cushioning stiffness. J Rehab Res Dev. Jun. 1998;35(2):219-24.
Office Action for CA Application No. 3,173,271 dated Feb. 26, 2024 and claims pending as of Feb. 26, 2024.
Extended European Search Report for EP Application No. 21804212.5 dated Feb. 7, 2024 and claims pending as of Feb. 7, 2024.
Intention to Grant for EP Application No. 21804212.5 dated Jan. 21, 2025.
CA 3,173,271, Feb. 26, 2024, Office Action.
EP 21804212.5, Feb. 7, 2024, Extended European Search Report.
EP 21804212.5, Jan. 21, 202, Intention to Grant.
Notice of Acceptance for AU Application No. 2021271826 dated Apr. 9, 2025 and allowed claims as of Apr. 9, 2025.
Office Action for JP Application No. 2022-567496 dated Apr. 11, 2025 and claims pending as of Apr. 11, 2025.
Extended European Search Report for EP Application No. 25186607.5 dated Jul. 24, 2025.
Decision to Grant for JP Application No. 2022-567496 dated Jul. 24, 2025 and allowed claims.

* cited by examiner

BEDS AND OTHER BODY SUPPORT DEVICES WITH INDIVIDUALLY CONTROLLABLE CELLS COMPRISING ONE OR MORE AIR BLADDERS

RELATED APPLICATIONS

This application is the National Stage of International Application No. PCT/US2021/031753, filed May 11, 2021, which claims priority under 35 U.S.C. § 119(e) to U.S. Provisional Application No. 63/023,805, filed May 12, 2020, and entitled "Beds and Other Body Support Devices with Individually Controllable Air Bladders," and to U.S. Provisional Application No. 63/131,619, filed Dec. 29, 2020, and entitled "Beds and Other Body Support Devices with Individually Controllable Air Bladders," each of which is incorporated herein by reference in its entirety for all purposes.

TECHNICAL FIELD

Devices, systems, and methods for supporting the body of a user are generally described, specifically supports containing a plurality of individually controllable airbladders which may be of a rolling-diaphragm type.

BACKGROUND

A variety of support devices, such as mattresses, cushions and chair seats, arm rests, and the like are known and used in medical care, skilled nursing, and personal care fields to support the body of a user. For example, a conventional mattress may include an array of spring elements to support a body. When a user lies on such a conventional mattress, a number of the springs compress. As the level of compression increases, the resistive force in the springs increase as a result of user's weight on the mattress. This increased resistance tends to focus on protruding regions of patient anatomy which may cause lesions such as pressure ulcers—e.g. Stage III and Stage IV pressure ulcers, or other local circulatory problems, especially in bedridden patients. Pressure ulcer or pressure injury is a localized damage to the skin and/or underlying tissue, as a result of pressure or pressure in combination with shear. Pressure injuries usually occur over a boney prominence but may also related to a medical device or other object. Protuberant regions of the anatomy are more prone to develop pressure sores because they tend to penetrate more deeply into mattresses, encountering greater forces than nearby regions and thus are more likely to have diminished local blood circulation or create shear.

Areas of a patient's body exposed to higher pressures (i.e., pressure points) when positioned on existing conventional support device, are undesirable and can cause harm to a user. Current methods to reduce pressure points on bedridden patients involve, for example, frequently moving or rotating the position of the patient on the support device so that a pressure point does not lead to the above-mentioned lesions. While this approach may be somewhat helpful, it requires an external user, such as a nurse, to physically move the patient. This additional effort is time consuming, costly, and may also lead to injuring the nurse and/or the patient.

Other devices such as Air Flotation Treatment (AFT) patient support devices are known for reducing pressure induced injuries in patients, they are very complex, expensive, difficult to use and maintain, and therefor typically only used as a last resort treatment for serious illness and injury. They also lack the ability to provide any ability to control the support pressure and or support height of differently for different areas of the patient's body.

Air bladder mattresses and other patient support devices are also known, but typically such devices do not permit individualized measurement or control of parameters such as pressure and height of individual bladders and/or are not able to control the pressure applied to the body of a user over a range of support heights or immersion depths of the user's body or parts thereof into the support surface. Accordingly, improved devices, systems, and methods are needed.

SUMMARY

Devices, systems, and methods for supporting the body of user, such as a patient in a hospital, rehabilitation facility, other skilled nursing facility, or home healthcare are described. Devices, systems, and methods can employ a plurality of cells where each of the cells within the plurality of cells can comprise a bladder that may be supported by a base that forms a seal with the bladder that can contain a compressible fluid—e.g. air—under pressure (a "fluid-tight" seal). In certain preferred embodiments, the base and bladder are constructed and arranged and described and illustrated herein so that the base forms a rolling diaphragm portion with the bladder—i.e. a portion of the bladder, as it inflates and deflates, rolls onto and over at least a portion of the base. As explained in more detail below, such a design can allow for the height and/or applied pressure in response to an applied load of such bladder to be adjusted substantially independent of the cross-sectional shape and dimensions of the bladder. In certain embodiments, each of the cells within the plurality of cells which may be a subset or all of the cells of a given support, can also comprise, or otherwise be operatively associated with its own: pressure sensor, height sensor, or both, and/or controllable inlet/outlet valve(s). The bladder of a cell can be filled with fluid (preferably, a compressible fluid) and the pressure sensor and height sensor can be used to measure the pressure of a fluid within the bladder and the height of the bladder of a particular cell. Control of each cell or any chosen group or subsets of cells within the plurality of cells can provide a patient with contact pressure relief at the site of certain protrusions from the anatomy and/or particularly sensitive areas of the patient (e.g., a catheter, an orthopedic support device, a sore, an ulcer, a burn, skin graft, post-surgical site, etc.) while maintaining adequate and comfortable overall support to the patient in other areas of the anatomy. The subject matter of the present invention involves, in some cases, interrelated products, alternative solutions to a particular problem, and/or a plurality of different uses of one or more systems and/or articles.

In one aspect, a device for supporting at least a portion of a body of a user is described, the device comprising a plurality of cells, each individual cell within the plurality of cells comprising a bladder configured to contain and be inflatable by a compressible fluid within the bladder, a base adjacent, attached to, forming a fluid-tight seal with, and supporting the bladder, wherein the bladder forms a rolling diaphragm portion with the base, the rolling diaphragm portion configured to roll along the base decreasing a volume and a height of the bladder when a force is applied to the bladder by the body of the user; the base comprising functionally associated therewith: at least one valve in fluidic communication with the bladder, the valve configured to control inflow and/or outflow of the compressible fluid; a pressure sensor adapted and arranged to measure a pressure of the compressible fluid; and a height sensor configured to measure the height of the bladder over a majority of its range of motion.

In another aspect, a device for supporting at least a portion of a body of a user is described, the device comprising a plurality of cells, each of the cells within the plurality of cells comprising a bladder configured to contain and be inflatable by a compressible fluid within the bladder; a base adjacent, attached to, forming a fluid-tight seal with, and supporting the bladder, wherein the bladder forms a rolling diaphragm portion with the base, the rolling diaphragm portion configured to roll along the base decreasing a volume and a height of the bladder when a force is applied to the bladder by the body of the user; the base comprising functionally associated therewith: at least one valve in fluidic communication with the bladder, the valve configured to control inflow and/or outflow the compressible fluid; a pressure sensor adapted and arranged to measure a pressure of the compressible fluid; and a height sensor configured to measure the height of the bladder within an accuracy of +/−5 mm, +/−4 mm, +/−3 mm, or +/−2 mm.

In another aspect, a device for supporting at least a portion of a body of a user, the device comprising a plurality of cells, each of the cells within the plurality of cells comprising or operatively associated with a bladder configured to contain and be inflatable by a compressible fluid within the bladder; and an optical sensor configured to determine a height of the bladder independent of a light intensity is described.

In another aspect, a device for supporting at least a portion of a body of a user, the device comprising a plurality of cells, each of the cells within the plurality of cells comprising or operatively associated with a bladder configured to contain and be inflatable by a compressible fluid within the bladder; and a time-of-flight optical sensor configured to determine a height of the bladder is described.

In yet another aspect, a device for supporting at least a portion of a body of a user is described, the device comprising a plurality of cells, each of the cells within the plurality of cells comprising, or operatively associated with a bladder configured to contain and be inflatable by a compressible fluid within the bladder; and at least one piezoelectric valve in fluidic communication with the bladder, the valve configured to control inflow and/or outflow the compressible fluid.

In yet another aspect, a device for supporting at least a portion of a body of a user is described, the device comprising a plurality of cells, each of the cells within the plurality of cells comprising or operatively associated with: a bladder configured to contain and be inflatable by a compressible fluid within the bladder; and a light associated with each cell positioned to separately and controllably illuminate each bladder to indicate a condition or status of the bladder.

Also disclosed are processor-controlled systems for providing adjustable and controllable support for at least a portion of a body of a user. In one aspect, a system for providing adjustable and controllable support for at least a portion of a body of a user is described, the system comprising a plurality of cells, each of the cells within the plurality of cells comprising or operatively associated with a bladder configured to contain and be inflatable by a compressible fluid within the bladder; at least one valve in fluidic communication with the bladder, the valve configured to control inflow and/or outflow of the compressible fluid; a pressure sensor adapted and arranged to measure a pressure of the compressible fluid; and a height sensor configured to measure a height of the bladder over a majority of its range of motion; and a controller operatively associated with each of the cells within the plurality of the cells, the controller comprising a processor, wherein the processor is configured and programmed to: independently control the pressure of the compressible fluid to at least 10 mmHg, and the height of each bladder to an accuracy of +/−20 mm; and record and/or display the pressure and/or the height of each bladder.

In another aspect, a system for providing adjustable and controllable support for at least a portion of a body of a user is described, the system comprising a plurality of cells, each of the cells within the plurality of cells comprising or operatively associated with: a bladder configured to contain and be inflatable by a compressible fluid within the bladder; at least one valve in fluidic communication with the bladder, the valve configured to control inflow and/or outflow of the compressible fluid; a pressure sensor adapted and arranged to measure a pressure of the compressible fluid; and a height sensor configured to measure a height of the bladder over a majority of its range of motion; and a controller operatively associated with each of the cells within the plurality of the cells, the controller comprising a processor, wherein the processor is configured and programmed to: control the height of a first set of vertically-oriented bladders within the plurality of cells, the first set comprising at least one bladder, wherein the first set is configured to support the body of the user; and control the height of a second set of vertically-oriented bladders within the plurality of cells, the second set comprising at least one bladder, to maintain a height of the second set beneath the height of the first set to provide a clearance between the bladders of the second set and the body of the user.

In yet another aspect still, a system for providing adjustable and controllable support for at least a portion of a body of a user is described, the system comprising a plurality of cells, each of the cells within the plurality of cells comprising or operatively associated with: a bladder configured to contain and be inflatable by a compressible fluid within the bladder; a height sensor configured to measure a height of the bladder over a majority of its range of motion; and a controller operatively associated with each of the cells within the plurality of the cells, the controller comprising a processor, wherein the processor is configured and programmed to: permit the user and/or an operator of the system to, when at least a first set of vertically-oriented bladders of the plurality are inflated with the compressible fluid, manually depress at least a subset of the first set to a subset height and initiate a height control set point of the subset height; and maintain a height of the subset of bladders at the subset height within an accuracy of +/−5 mm, +/−4 mm, +/−3 mm, or +/−2 mm.

In another aspect, a system for supporting a body of a user, the system comprising a plurality of cells adjacent to the body of the user, each of the cells within the plurality of cells comprising or operatively associated with: a bladder having a top surface for supporting the body of the user; a base adjacent and forming a fluid-tight seal with a bottom portion of the bladder for supporting and maintaining a fluid pressure within the bladder, wherein the bladder forms a rolling diaphragm portion with the base, the rolling diaphragm configured to roll along the support element when a force is applied to the bladder by the body of the patient; and a compressible fluid within the bladder, when in use, inflating the bladder such that the top surface is at a height above the base, the base comprising functionally associated therewith: at least one valve in fluidic communication with the bladder, the valve configured to control inflow and/or outflow of the compressible fluid; a pressure sensor adapted and arranged to measure a pressure of the compressible fluid; and a height sensor configured to measure the height of the top surface of the bladder above the base over a majority of its range of motion; wherein a body support surface topology of the plurality of cells is defined, collectively, by the height of the top surface of each of the cells of the plurality, and wherein a controller in electronic communication and operatively associated with each of the cells within the plurality of the cells, the controller comprising a processor configured and programmed to measure, record, display, and/or control the body support surface topology is described.

In another aspect still, a system for providing adjustable and controllable support for at least a portion of a body of a user is described. The system comprises a plurality of cells, each of the cells within the plurality of cells comprising or operatively associated with a bladder configured to contain and be inflatable by a compressible fluid within the bladder, at least one valve in fluidic communication with the bladder, the valve configured to control inflow and/or outflow of the compressible fluid, and a pressure sensor adapted and arranged to measure a pressure of the compressible fluid. In some embodiments, the system also comprises a controller operatively associated with each of the cells within the plurality of the cells, the controller comprising a processor, wherein the processor is configured and programmed to measure a duration of time the compressible fluid is contained in the bladder of each cell to determine a pressure time-value for each cell, compare the pressure-time value of each cell to a predetermined threshold, and lower the pressure of a cells within the plurality of cells for which the pressure-time value exceeds the predetermined threshold, and maintain or increase the pressure of cells within the plurality of cells for which the pressure-time value does not exceed the predetermined threshold. In some embodiments, the predetermined threshold is indicative of the risk of injury to the body of the user.

In another aspect, a system for providing adjustable and controllable support for at least a portion of a body of a user, the system comprising a plurality of cells, each of the cells within the plurality of cells comprising or operatively associated with: a bladder configured to contain and be inflatable by a compressible fluid within the bladder; at least one valve in fluidic communication with the bladder, the valve configured to control inflow and/or outflow of the compressible fluid; a pressure sensor adapted and arranged to measure a pressure of the compressible fluid; and a height sensor configured to measure a height of the bladder over a majority of its range of motion; and a controller operatively associated with each of the cells within the plurality of the cells, the controller comprising a processor, wherein the processor is configured and programmed to reduce a pressure of the compressible fluid in each cell of the plurality of cells to a minimum pressure; determine a height of each cell of the plurality of cells at the minimum pressure; compute a target height setting and/or target pressure setting for each cell of the plurality of cells to achieve a user- or operator-selected support surface end condition topography; selectively pressurize each cell of the plurality of cells based the target height and/or target pressure setting for each cell is described.

In yet another aspect, the system for providing adjustable and controllable support for at least a portion of a body of a user, may be further configured and programmed to, after the step of selectively pressurizing each cell of the plurality of cells based the target height and/or target pressure setting for each cell: a. measure a height of each cell of the plurality of cells adjusted to its target height and/or target pressure setting; b. compare a minimum cell height determined in the step (a) to a target minimum height threshold; and c. selectively adjust the pressure of the compressible fluid in each cell, followed by repeating steps (a) and (b) until the minimum cell height determined in the step (a) matches the target minimum height threshold is described.

In yet another aspect, a device for supporting at least a portion of a body of a user, the device comprising a plurality of cells, each individual cell within the plurality of cells comprising: a bladder configured to contain and be inflatable by a compressible fluid within the bladder; a base adjacent, attached to, forming a fluid-tight seal with, and supporting the bladder, wherein the bladder forms a rolling diaphragm portion with the base, the rolling diaphragm portion configured to roll along the base decreasing a volume and a height of the bladder when a force is applied to the bladder by the body of the user; wherein the bladder comprises a first end shaped and configured to attach to and forming the fluid-tight seal with the base, and a second end comprising a user support surface configured to apply a supporting force to the body of the user; wherein the bladder is shaped and configured so that an angular orientation of the user support surface can be adjusted without substantially changing an angular orientation of a long axis of the bladder with respect to the base is described.

In yet another aspect, a system for providing adjustable and controllable support for at least a portion of a body of a user is disclosed that comprises a plurality of cells, each of the cells within the plurality of cells comprising or operatively associated with a bladder configured to contain and be inflatable by a compressible fluid within the bladder; at least one valve in fluidic communication with the bladder, the valve configured to control inflow and/or outflow of the compressible fluid; and a pressure sensor adapted and arranged to measure a pressure of the compressible fluid; and a controller operatively associated with each of the cells within the plurality of the cells, the controller comprising a processor The processor is configured and programmed to measure a duration of time the compressible fluid is contained in the bladder of each cell to determine a pressure time-value for each cell; compare the pressure-time value of each cell to a predetermined threshold; lower the pressure of a cells within the plurality of cells for which the pressure-time value exceeds the predetermined threshold indicative of the risk of injury to the body of the user; and maintain or increase the pressure of cells within the plurality of cells for which the pressure-time value does not exceed the predetermined threshold indicative of the risk of injury to the body of the user.

In yet another aspect, a system for providing adjustable and controllable support for at least a portion of a body of a user is disclosed that comprises a plurality of cells, each of the cells within the plurality of cells comprising or operatively associated with a bladder configured to contain and be inflatable by a compressible fluid within the bladder; at least one valve in fluidic communication with the bladder, the valve configured to control inflow and/or outflow of the compressible fluid; a pressure sensor adapted and arranged to measure a pressure of the compressible fluid; a height sensor configured to measure a height of the bladder over a majority of its range of motion; and a controller operatively associated with each of the cells within the plurality of the cells. The controller comprises a processor configured and programmed to reduce a pressure of the compressible fluid in each cell of the plurality of cells to a predetermined pressure (e.g. a minimum operating pressure or a maximum operating pressure); determine a height of each cell of the plurality of cells at the predetermined pressure; compute a target height setting and/or target pressure setting for each cell of the plurality of cells to achieve a user- or operator-selected support surface end condition topography; selectively pressurize each cell of the plurality of cells based the target height and/or target pressure setting for each cell.

In yet another aspect, a device for supporting at least a portion of a body of a user is disclosed that comprises a plurality of cells, each individual cell within the plurality of cells comprising a bladder configured to contain and be inflatable by a compressible fluid within the bladder; a base adjacent, attached to, forming a fluid-tight seal with, and supporting the bladder, wherein the bladder forms a rolling diaphragm portion with the base, the rolling diaphragm portion configured to roll along the base decreasing a volume and a height of the bladder when a force is applied to the bladder by the body of the user; wherein the bladder comprises a first end shaped and configured to attach to and forming the fluid-tight seal with the base, and a second end comprising a user support surface configured to apply a supporting force to the body of the user; wherein the bladder is shaped and configured so that an angular orientation of the user support surface can be adjusted without substantially changing an angular orientation of a long axis of the bladder with respect to the base.

In yet another aspect, a device for supporting at least a portion of a body of a user is disclosed that comprises a plurality of cells comprising at least one cell comprising 2-20 (e.g. 3, 8 or 16 in some embodiments) bladders configured to contain and be inflatable by a compressible fluid within the bladders; a common base adjacent, attached to, forming a fluid-tight seal with, and supporting each bladder, wherein each bladder forms a rolling diaphragm portion with the base, the rolling diaphragm portion configured to roll along the base decreasing a volume and a height of the bladder when a force is applied to the bladder by the body of the user; the base containing or comprising functionally associated therewith: at least one valve in fluidic communication with the bladders, the valve configured to control inflow and/or outflow of the compressible fluid; at least one pressure sensor adapted and arranged to measure a pressure of the compressible fluid; and a height sensor associated with each bladder configured to measure the height of each bladder over a majority of its range of motion.

In still another aspect, an improved bladder is disclosed configured to attach to and form a fluid-tight seal with a base support such that the bladder forms a rolling diaphragm portion with the base decreasing a volume and a height of the bladder when a force is applied to the bladder, wherein the bladder is shaped to have a first open end configured to attach to and form a fluid-tight seal with the base support, and a second closed end being including user support surface configured to apply a supporting force to a body of a user of a support device in which the bladder is used, the improvement comprising: the bladder being shaped and configured so that an angular orientation of the user support surface can be adjusted without substantially changing an angular orientation of a long axis of the bladder with respect to the base support, when the bladder is attached to the base support is described.

In still another aspect, a bladder configured to attach to and form a fluid-tight seal with a base support such that the bladder forms a rolling diaphragm portion with the base decreasing a volume and a height of the bladder when a force is applied to the bladder is disclosed that is shaped to have a first open end configured to attach to and form a fluid-tight seal with the base support, and that has a second closed end providing a user support surface configured to apply a supporting force to a body of a user of a support device in which the bladder is used. The bladder further includes the improvement comprising being shaped and configured so that an angular orientation of the user support surface can be adjusted without substantially changing an angular orientation of a long axis of the bladder with respect to the base support, when the bladder is attached to the base support.

Also disclosed are methods of supporting a body of a user. In one aspect, a method of supporting a body of a user is described, the method comprising positioning the body of the user adjacent to a plurality of cells, each of the cells within the plurality of cells comprising: a bladder; a compressible fluid within the bladder; a base adjacent, attached to, forming a fluid-tight seal with, and supporting the bladder, wherein the bladder forms a rolling diaphragm portion with the base, the rolling diaphragm configured to roll along the base when a force is applied to the bladder by the body of the user; and for each cell: measuring a pressure of the compressible fluid in the bladder with a pressure sensor; measuring a height of the bladder with a height sensor configured to determine a height of the bladder over a majority of its range of motion; and adjusting the height and/or of the cell.

Also disclosed is a device for providing adjustable and controllable support for at least a portion of a body of a user comprising a plurality of cells, each of the cells within the plurality of cells comprising or operatively associated with an air-tight bladder configured to contain and be inflatable by air supplied to and contained within the bladder; at least one valve in fluidic communication with the bladder, the valve configured to control inflow and/or outflow of the compressible fluid; and a ventilation system configured to provide ventilation to a space surrounding and between bladders of the plurality of cells; wherein air is circulated by the ventilation system to provide ventilation system, and wherein the air circulated by the ventilation system is not the air supplied to and contained within the bladders to inflate the bladders.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Devices, systems, and methods for supporting the body of a user (e.g., a patient in a hospital, rehabilitation center, assisted care facility, hospice, home healthcare setting, etc.) are described herein. Various devices can be configured as beds, mattresses, seating surfaces, armrests, headrests, etc. depending on the application. Many of the embodiments below are described in the context of a hospital or medical facility bed for acute or chronic care of a patient, and certain embodiments provide features and advantages that are improvements over typical prior art and are particularly suitable for such purposes. But in other embodiments systems and devices described herein could be used for other purposes or applications, such as a bed or mattress for home, use for general sleep support, seat cushions, wheelchair cushions, patient transport systems, head rests, arm rests, etc. Many of the features and advantages described below for devices intended for medical applications—e.g. pressure control, height control, massage capability, user repositioning, etc.—can also provide advantageous utility for other purposes as would be understood by those of ordinary skill in the art having the benefit of this disclosure.

In certain embodiments, support for the user's body, or at least a portion thereof, can be provided by a plurality of cells, where each cell can comprise a base for supporting the cell and at least one inflatable bladder that forms a seal where it is attached to the base that is substantially free of leakage (e.g., fluid leakage) at the operating pressures of the cell (i.e., a "fluid tight" or "pressure tight" seal). In certain embodiments, the bladder is vertically oriented, meaning that its fully inflated height (i.e., measured in a first direction extending from the base to a top surface of the bladder positioned adjacent the body of a user when in use) exceeds the maximum cross-sectional dimension of the fully inflated bladder measured in a direction perpendicular to the first direction by at least a factor of 1.5 and preferably by at least a factor of 2, 5, 10 or greater.

Figure 1A:
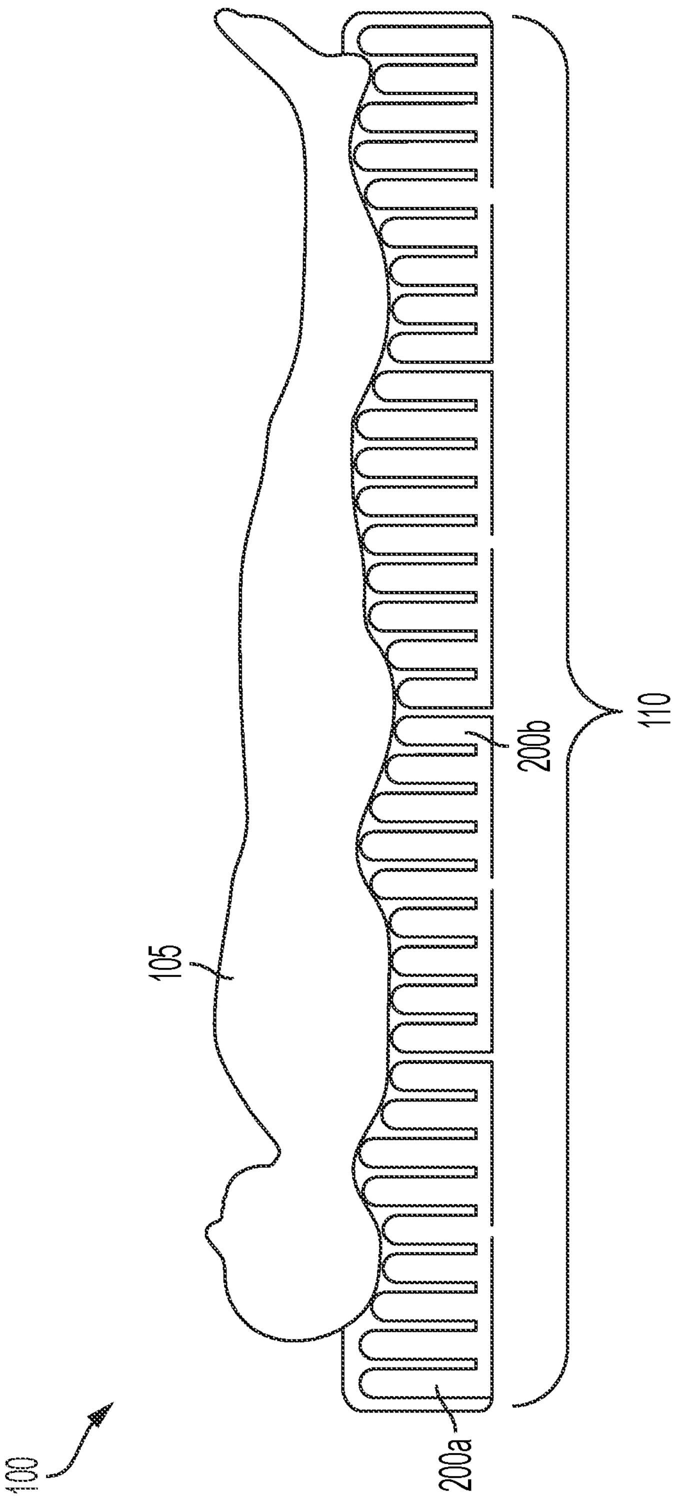
FIG. 1A is a schematic illustration of a device for supporting the body of a user with a plurality of cells, according to some embodiments.
Figure 1B:
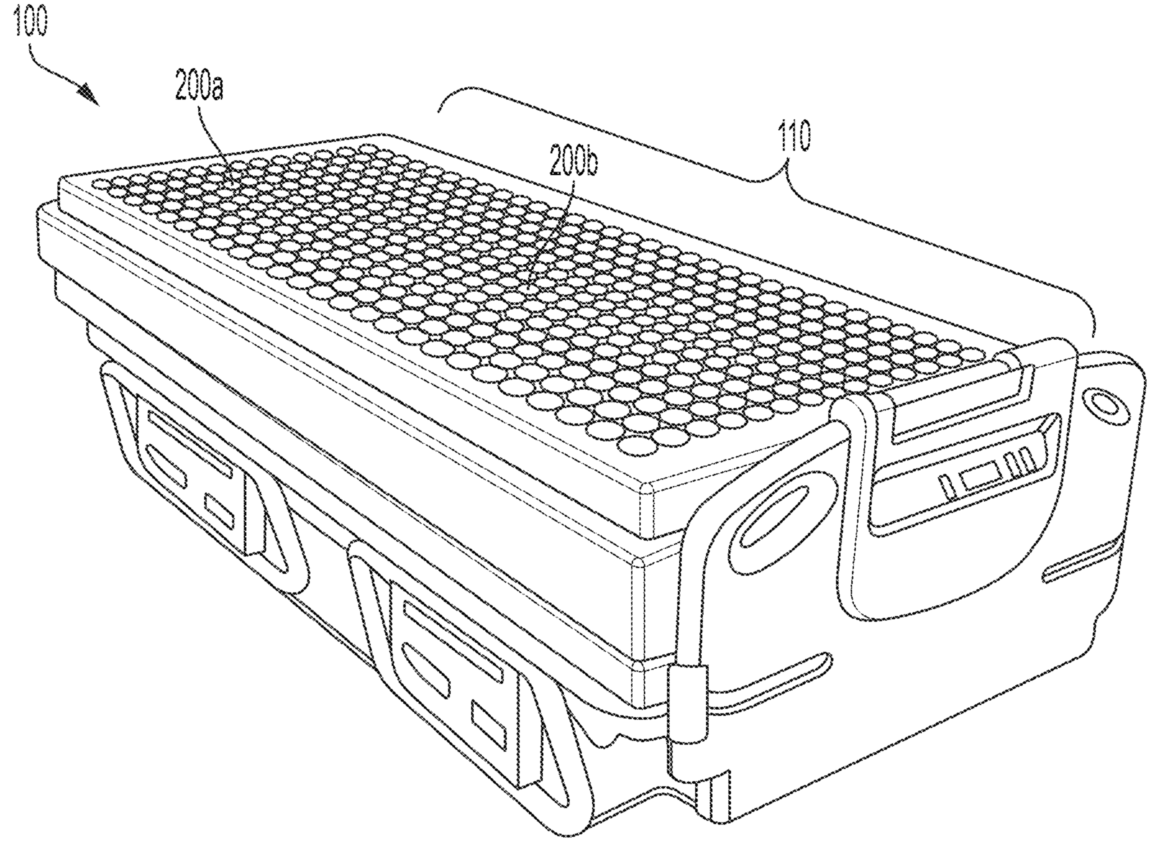
FIG. 1B is an image of a hospital bed incorporating a support system, according to one embodiment.
Figure 1C:
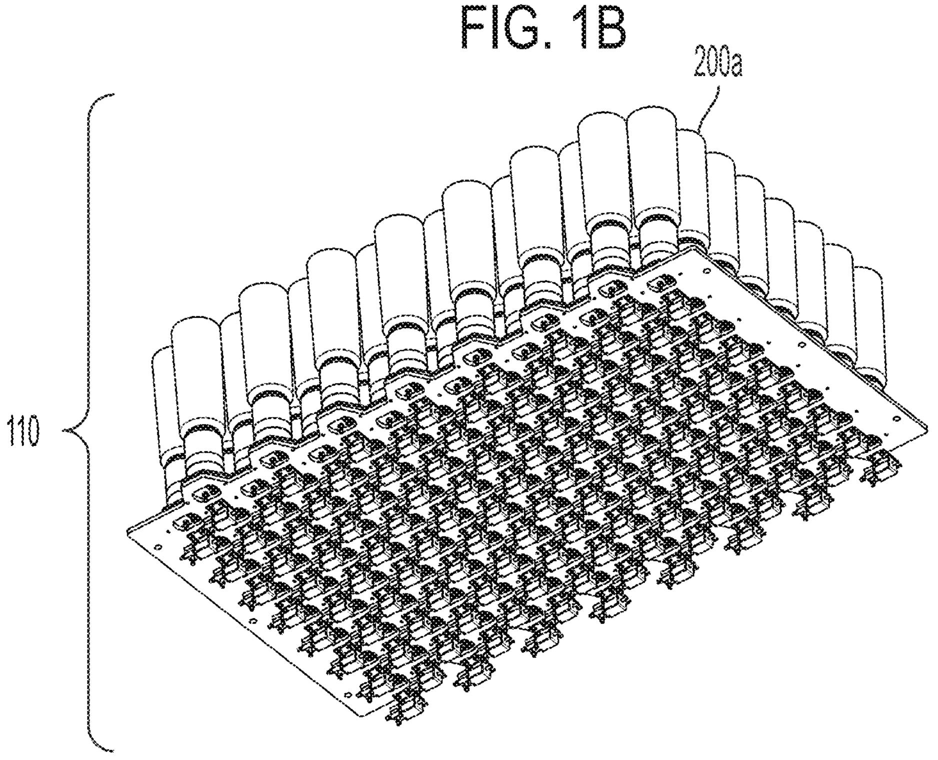
FIG. 1C schematically depicts a plurality of cells of a support device mounted on a plate that can be mounted and removed from a supporting frame or bed frame, according to some embodiments.

In certain particularly preferred embodiments, the vertically oriented bladder is designed, together with the base to form a rolling diaphragm over the base. Such a rolling diaphragm design can enable precise, substantially height independent patient contact pressure control over all or a substantial portion of the range of motion of the diaphragm and allow for deflection, infiltration, inflation and deflation of the bladder with the resulting substantial changes in cell diaphragm height, without any substantial change in the width of the cell diaphragm (i.e. the maximum cross-sectional dimension of the fully inflated bladder measured in a direction perpendicular to the height direction as described above). Rolling diaphragm support cells of a type suitable for adaptation for use with the present disclosure, together with their ability to precisely provide and control desirable patient contacting pressures, been described in the following patent and published patent application commonly owned by the applicant, that are incorporated herein by reference: U.S. Pat. No. 8,572,783 and International Publication No. WO 2014/153049. For example, in FIG. 1A, a device 100 for supporting at least a portion of a body of a user 105 is shown. User 105 rests horizontally on plurality of cells 110 that are vertically oriented. Various cells (e.g. cell 200*a* versus cell 200*b*) within the plurality of cells can be at a different height, as shown in the figure, to provide support to user 105. When a user is not lying on the support system, the plurality of cells can have the same height, as shown in relation to FIG. 1B with FIG. 1C schematically illustrating a set of the plurality of cells 110 within support device 100.

Figure 2A:
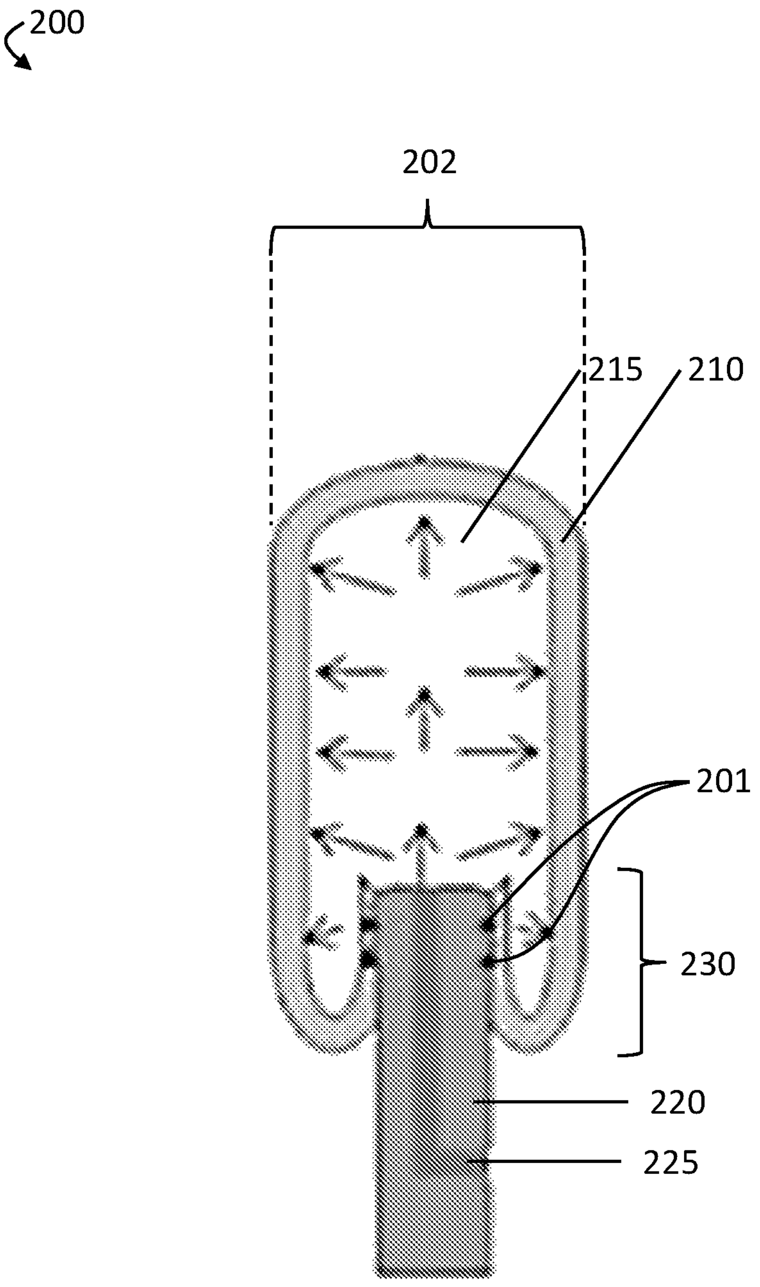
FIG. 2A is a schematic of an individual rolling diaphragm cell comprising a bladder and a base with a valve, according to some embodiments.
Figure 2B:
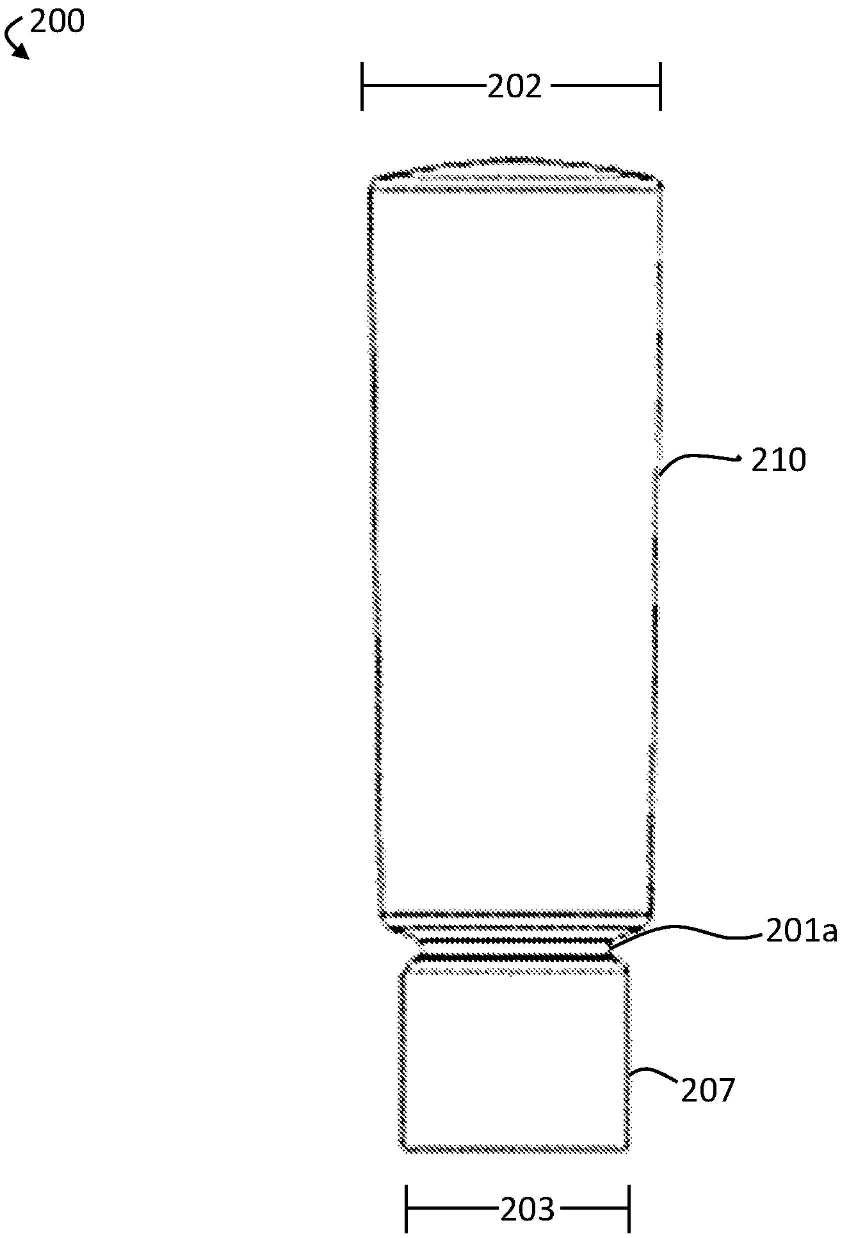
FIG. 2B is a schematic of a first embodiment of a generally cylindrical bladder for use in the rolling diaphragm cell illustrated in FIG. 2D, according to some embodiments.

For embodiments with a rolling diaphragm design, the diaphragm can be configured to roll along the base when a force (e.g., a pressure) from a user (e.g., a patient, a caregiver, a nurse) is applied to the bladder such that a volume and a height of the bladder is decreased without substantially increasing the diameter of the bladder, and the bladder contains a compressible fluid, such as air, in order to provide an opposing force to support the user. For example, as shown in FIG. 2A, cell 200 comprises bladder 210 filled with air 215. Bladder 210 forms a fluid-tight seal 201 with base 220, and the base 220 can comprise a valve, such as valved fluid pathway 225, for providing inflow and outflow of fluid 215. Rolling diaphragm portion 230 allows bladder 210 to roll along base 220 without increasing the diameter 202 of bladder 210. In some embodiments, the cell comprises a bladder that is generally cylindrical in shape, as show in in FIG. 2B. In some embodiments, the cell comprises a bladder that tapers (i.e., the bladder becomes narrower along the direction from the top portion of the bladder to the bottom portion of the bladder) as it approaches the base of cell, as schematically show in FIG. 2C.

Figure 3A:
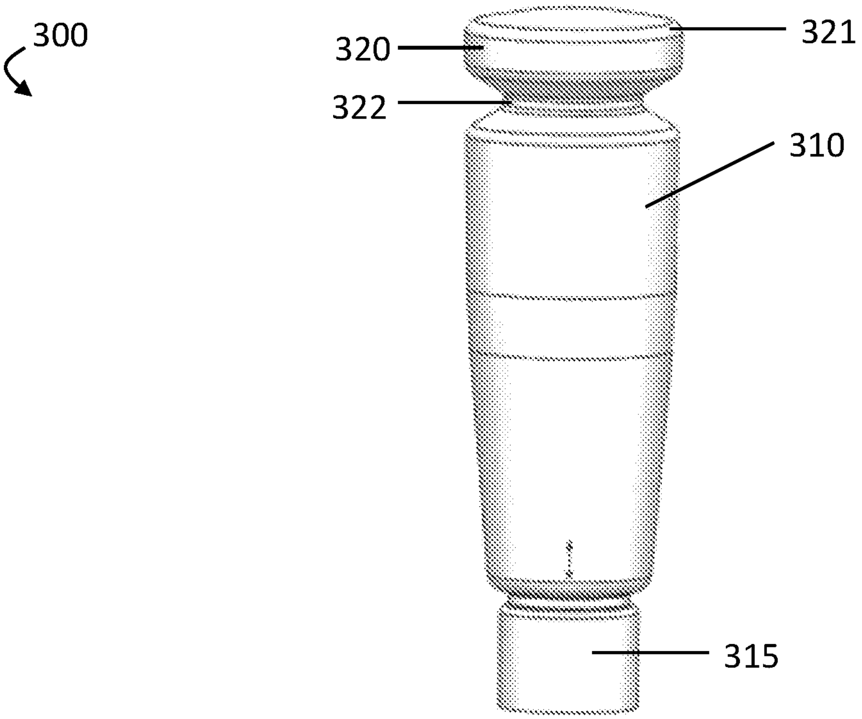
FIGS. 3A-3B show a schematic diagram of an articulating bladder of a cell, according to one set of embodiments.
Figure 3B:
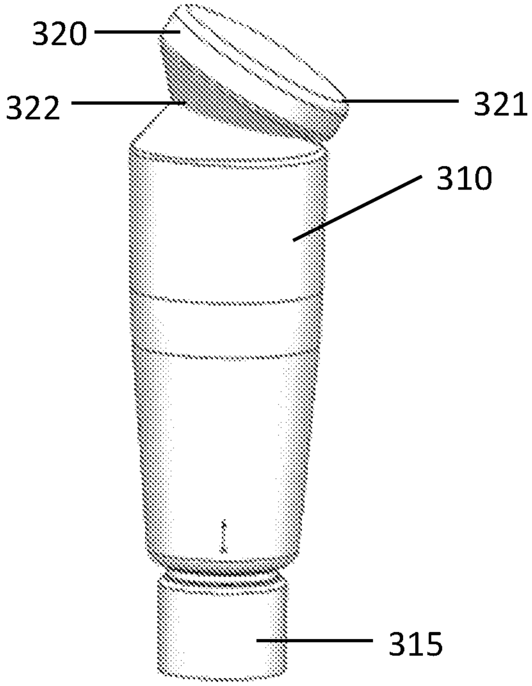

A variety of cell and bladder architectures are possible. For example, in some embodiments, the bladder may be adapted and arranged to articulate or conform more readily to the contours of the body and reduce applied pressure when only part of the bladder is contacted by the body or the body is positioned at an angle with respect to the cell and bladder. For example, FIG. 3A shows cell bladder 300 with main body portion 310 and base-mating portion 315. Bladder main body portion 310 has a cylindrical shape that tapers in a downward direction as it approaches base 315. The top portion 320 of bladder 300 connects to bladder main body portion 310 via a circumferentially recessed articulatable joint region 322. Top portion 320 includes may include a beveled circumferential edge 321 that can conform to the contours of the body of a user to enhance articulation between the cell 300 and the body of the user. Joint region 322 is also configured to permit top portion 320 to angularly pivot in order to provide more articulation to track movement of the body of a user. For example, in FIG. 3B, joint region 322 is tilted such that top portion 320 is angled relative to its position in FIG. 3A. This feature can provide enhanced support and comfort to the body of the user.

Figure 3C:
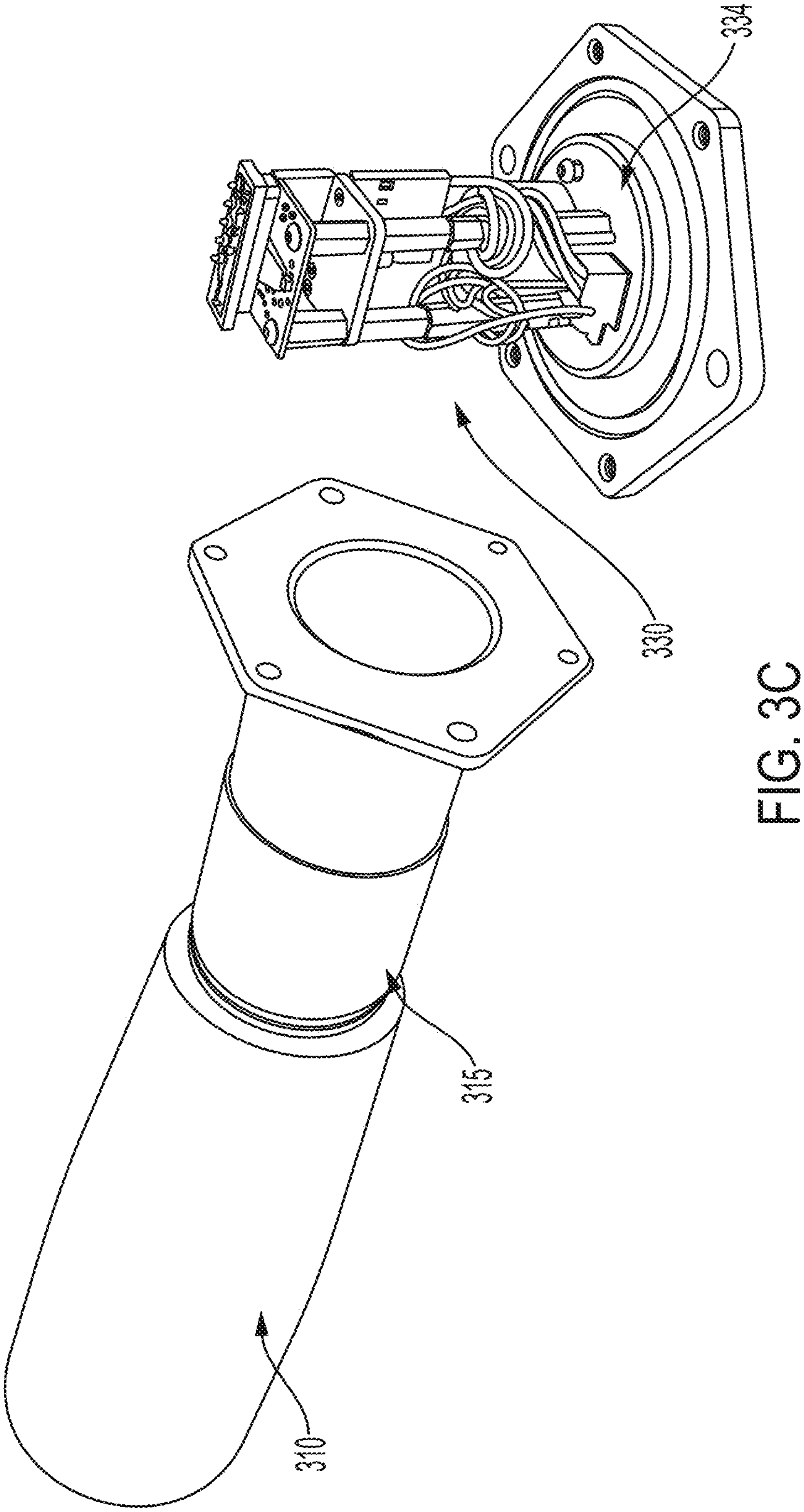
FIG. 3C is a photographic image of a bladder, cell and a sensor unit, disassembled to show internal components, according to one embodiment.

FIG. 3C shows a photographic image of an exemplary cell and bladder as described and illustrated herein in a disassembled state to also show. The figure also shows associated sensor 330 and piezoelectric valve 334.

While both the pressure and the height (see FIG. 2D "H") of at least some cells of the plurality of cells can be controlled, in some embodiments, the pressure and/or the height of each individual cell (e.g., the at least one bladder associated with each cell, and in the case of a cell associated with a single bladder, with each such individual bladder above its corresponding base) can be controlled independently of and/or or in tandem with adjacent cells within the plurality of cells. In addition, a simultaneous and accurate determination of the height and pressure of an individual cell within the plurality of cells can be determined with a height sensor and pressure sensor, respectively, within each cell, or remotely positioned but functionally associated with each cell, in certain embodiments. As will be described further below, this can provide several advantages over existing support systems for a user's body, as a particular cell or a group or zone of cells (i.e. a subset of all of the cells) can be controlled to a different pressure and/or height (e.g. may be depressed relative to adjacent, neighboring cells) to provide areas of reduced or no contact pressure to the body of user. This can provide the patient relief from contact pressure on protrusions from or sensitive areas of the patient's anatomy, such as an ulcer, or a sore, a burn, post-surgical wound area, an attached device like a catheter of breathing tube, an orthopedic device, a colostomy bag, negative pressure wound therapy device, etc., which is a feature not typically provided by existing support systems.

In some embodiments, in addition to or instead individual cells that are associated with a single bladder (thus providing height and pressure control at the resolution of an individual bladder), as a cost reduction strategy and/or to simplify control/maintenance/fabrication complexity, cells with a common base associated with two or more bladders may be included, e.g. in areas of the surface where the spatial resolution of independent height/pressure control may be less critical. In such embodiments, a plurality of bladders can be grouped into a single cell, that can be controlled independently of one another or in tandem, where independent control of the pressure of such cell provides a common pressure and pressure control for its associated bladders. The numbers of bladders associated with such cells (and in certain embodiments with the common base for each such cell) may be any suitable, such as 2, 3, 4, 5, 6, 7, 8, 9, 10, 16, 20 or more, between 2-20, between 2-16, between 2-10, or between 2-5, in some cases 3, 8, or 16 bladders).

Figure 2C:
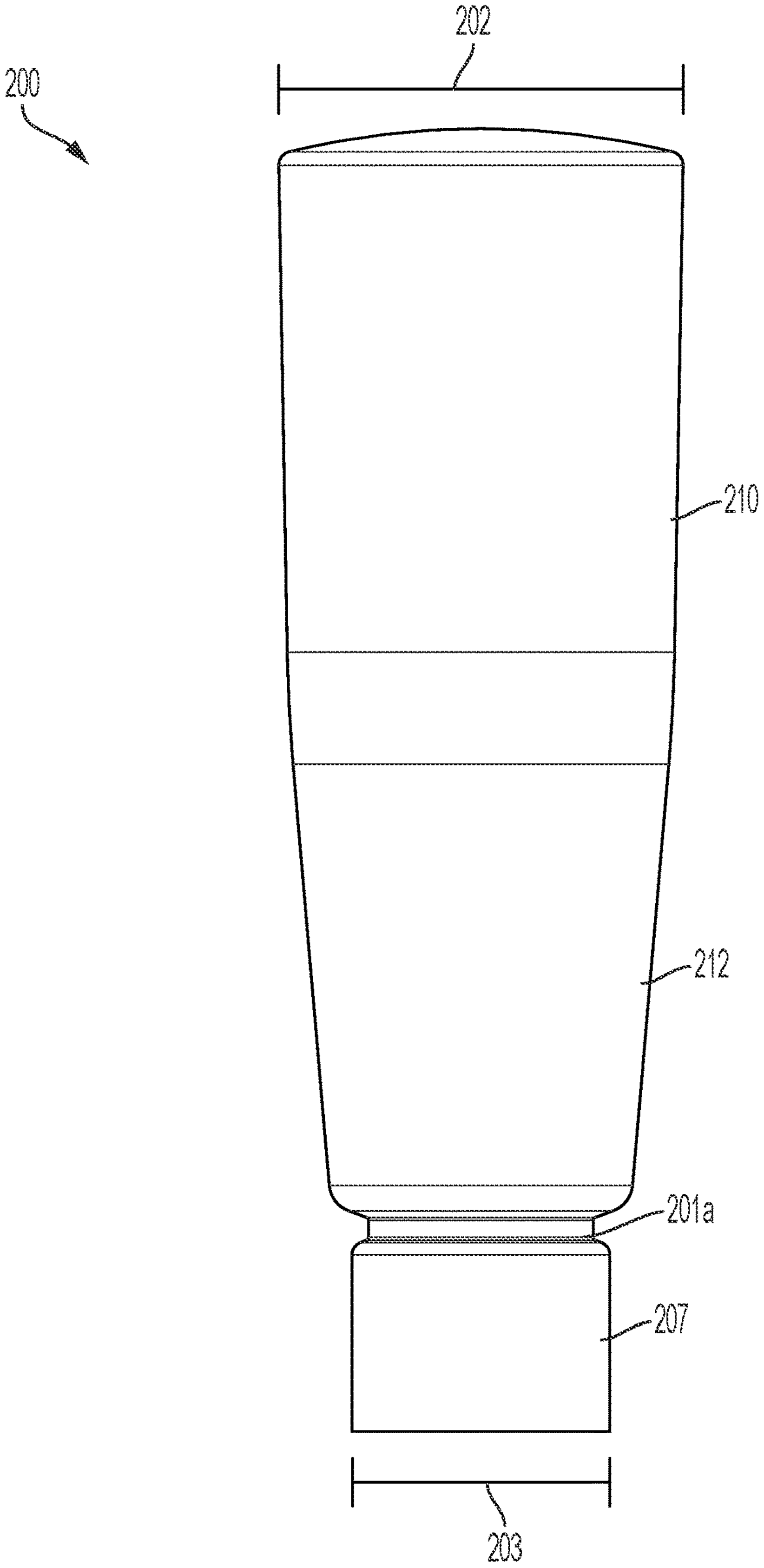
FIG. 2C is a schematic of a second embodiment of a generally cylindrical bladder with a tapered bladder for use in the rolling diaphragm cell illustrated in FIG. 2D, according to some embodiments.
Figure 2D:
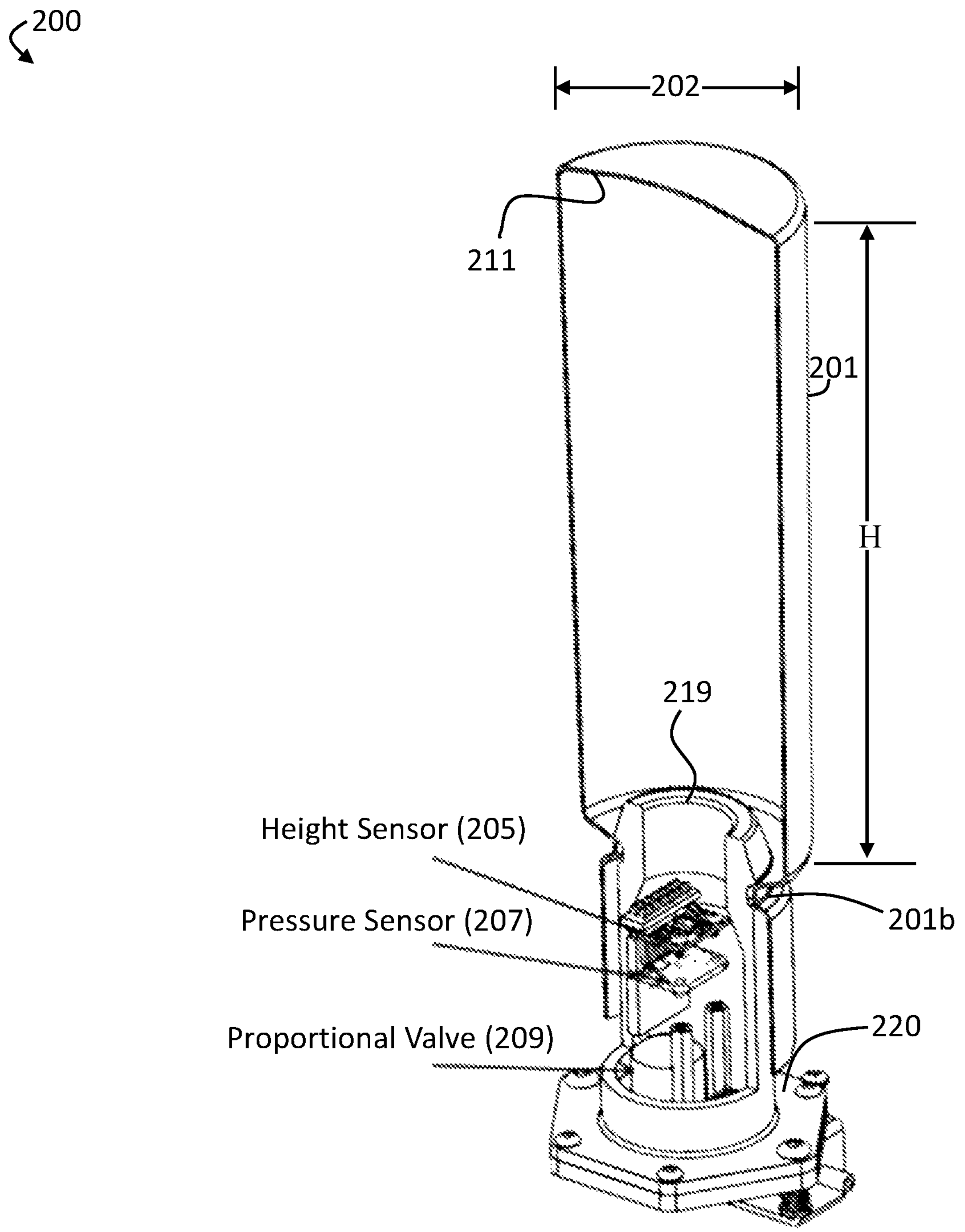
FIG. 2D is an illustration that schematically depicts a complete cell with a support base and bladder, where the base comprises a height sensor, a pressure sensor, a proportional valve, according to some embodiments.
Figure 4A:
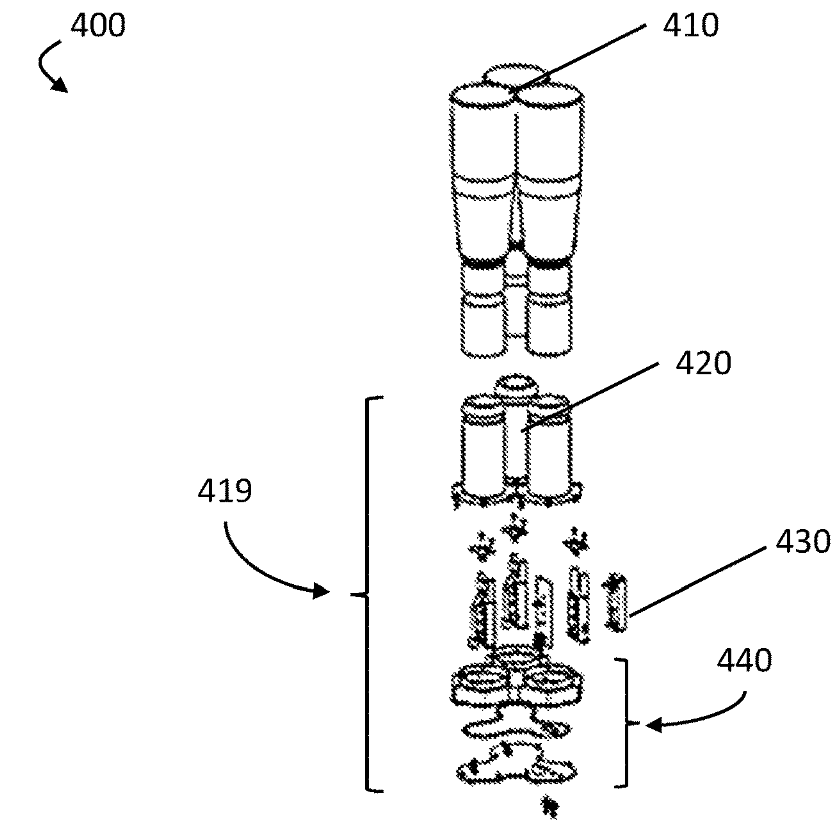
FIGS. 4A-4B are illustrations that schematically depict views of a complete cell with three bladders a common support base acting as a common pressure manifold for the three bladders, where the base comprises separate height sensors associated with each bladder to measure the height of each bladder, a pressure sensor, and a proportional valve, according to some embodiments
Figure 4B:
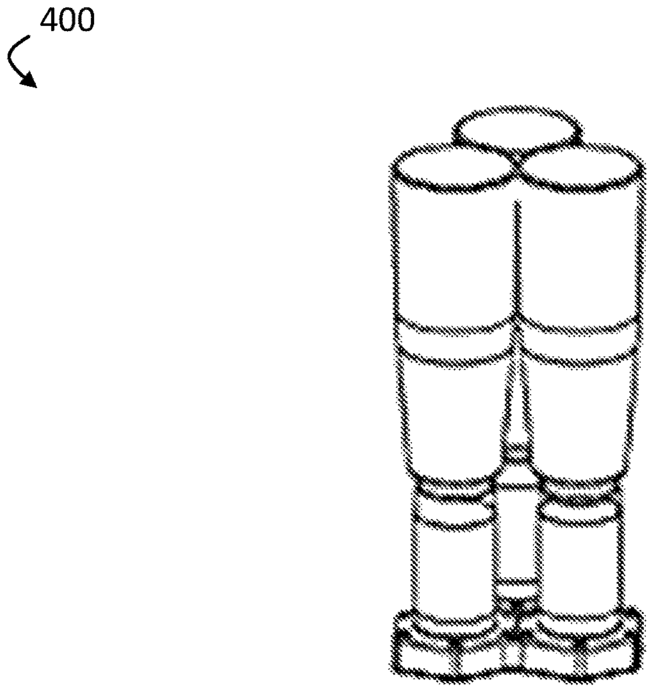

For example, in FIG. 4A, an embodiment of a three-bladder cell 400 is shown. Cell 400 includes three rolling bladders 410 combined to form triple bladder arrangement. The three bladders 410 are associate with a common base 419 that can contain or be functionally associated with one or more sensors (e.g., a pressure sensor, a height sensor) and inlet/outlet valve(s) for controlling pressure within the cell and three bladders. In preferred embodiments (but optional), separate height sensors, such as sensors 430, are associated with and able to independently measure the height of each individual bladder associated with the cell. The common base 419 can comprising a bladder mounting portion 420, and manifold/housing portions 440, which can allow the base to be connected to a manifold/plenum that provides the pressurization fluid (e.g., compressed air) to the cell and all three bladders. FIG. 4B shows the assembled cell. In some embodiments, the triple-bladder cell arrangement can be operated in tandem, such that the height and/or pressure of the bladders can be controlled in tandem (i.e. as a unit). Grouping a set of multiple bladders in tandem into a single cell can be beneficial for example for reasons described above without substantially compromising overall performance, particularly when such cells are positioned adjacent to a portion of the user's body (e.g., the legs, arms) that may not require a high degree of resolution of pressure points against the body of the user or positioned in areas of the support surface less frequently occupied by a user (e.g., peripheral areas). Such grouping of multiple bladders into a single cell can reduce the number of valves required for a support system by grouping bladders together such that they can share a valve, rather than each bladder having its own valve. In certain embodiments, in areas of the support surface normally adjacent to more sensitive portions of a user's body (e.g., head, Torso, buttocks, etc.) cells associated with individual bladders (e.g., as shown in FIGS. 2D and 3C)—i.e. allowing pressure and/or height control at the resolution level of individual bladders—can be employed.

In alternative embodiments, a common base associated with two or more bladders, rather than having the bladders grouped under common pressure control to result in a single controllable cell, could be configured to enable fluidic isolation and independent pressure measurement and control of each bladder, such that the common base with its associated two or more bladders would act as two or more (i.e., equal to the number of bladders) separately controllable cells of the support surface.

As mentioned above, in certain embodiments, a plurality of cells may be functionally associated with one or more pressure sensors adapted and arranged to measure a pressure of a fluid (e.g., a compressible fluid within) the bladders of the plurality of cells, and may, in certain embodiments include one or more height sensors configured to measure the height of each bladder of one or more cells of the plurality of cells over a majority of its range of motion (e.g., in some cases over substantially the entirety of its range of motion). While in certain embodiments all bladders of the plurality of cells may be fluidically connected to all, many, some, or at least one other bladder of the plurality, such that the interconnected bladders are not independently controllable with respect to other bladders in terms of pressure and/or height set point, in preferred embodiments, the support device will include a plurality of cells in which each cell (i.e., each individual cell) within the plurality of cells is associated with a single bladder whose height and pressure is independently controllable from the others. In some cases, such individually controllable single bladder cells form all the total number of cells making up a support surface. In other embodiments, the plurality of independently controllable single bladder cells may be segregated into one or more sections of the support device where more precise spatial control of pressure and/or height is desirable (e.g. in a region over which the torso, head, pelvis, heels, etc. of a patient lies when in use), while other regions of the support device (e.g. peripheral regions, lower legs, etc.) where less spatially precise control is needed and/or where it may be desirable to control multiple bladders precisely and instantaneously as a unit, an additional cell or additional pluralities of cells each containing multiple bladders in unrestricted fluidic interconnection and subjected to a common pressure control may be provided. As opposed to separate pressure sensors, height sensors, and fluid control valves being provided as part of or otherwise in functional association with controllable cells each individually associated with a single bladder as described below, for cells associated with a plurality of bladders that are under common control and in unrestricted fluidic communication with each other, fewer or only a single pressure sensor and control valve(e) for each cell may be provided that measure the pressure and control inflation and deflation of such ganged bladders as a unit. In certain embodiments, such ganged bladders may not include any height sensors, or may include only a single such sensor as representative of the group or may have individual height sensors associated with each individual bladder.

As mentioned, in preferred embodiments, the support device will include a plurality of cells, where each cell of the plurality is individually controllable and fluidically isolatable—e.g. via provision of a separate inlet/outlet valve(s)) from other cells of the plurality. In certain embodiments, the support device will include a plurality of individually controllable cells, each of which is associated with and controls the height and pressure of a single inflatable bladder and may include additional cell(s) (e.g. with multiple ganged bladders) in the overall device. In certain embodiments, and particularly preferred for individually controllable and fluidically isolatable cells, each cell of a plurality can include either integrated into the cell (e.g. as part of the support base as described and illustrated below) or be otherwise functionally associated with a pressure sensor adapted and arranged to measure the pressure of a fluid (e.g., the compressible fluid within a bladder), and a height sensor configured to measure the height of the bladder(s) above the base (or equivalently the depth below a height of maximum inflation) over a majority of its range of motion. That is to say, each cell of the plurality of cells may comprise a pressure sensor and height sensor in order to determine the pressure of a compressible fluid within the bladder(s) and the height of the such bladder(s) (e.g., the height of the bladder(s) above the base).

For example, referring back to FIG. 2D, individually controllable cell 200 includes a single bladder 210 and has a base 220 that comprises a height sensor 205 and a pressure sensor 207 for measuring the height and pressure, respectively, of the bladder. By contrast, typical conventional systems may only provide a pressure sensor and may provide only a pressure of a fluid within the cell. In certain known systems, a proximity sensor may be included to detect complete or near complete deflation of the bladder but is not able to measure the height of the bladder over a majority of its range of motion. In addition, unlike conventional systems that only provide pressure sensors associated with large groups of bladders, certain embodiments disclosed include both a pressure sensor and a height sensor associated with each individual bladder (or small groups of commonly controlled bladders, e.g. 2, 3, 4, 5, 6, 7, 8, 9, 10, 16, 20, between 2-20, between 2-16, or between 2-5, in some cases 3, 8, or 16 bladders) for each cell of a plurality of cells. One advantage of providing both a height sensor and pressure sensor associated with each individual cell, and its associated bladder(s), as described for some embodiments of this disclosure, is that such arrangement can provide a user (e.g., a patient) or an external operator with a real-time pressure and height measurement of each of the bladder(s) of each cell, which can be useful in identifying with fine resolution areas of the patient's body that are experiencing higher or lower pressure and allow for readjustment of the height and/or pressure in order to meet the specific needs of a patient—as described in further detail below. Another advantage is that data provided by the height and pressure sensors of an individual cell can be used by various automated controllers and control systems to provide programmable and/or self-automation control of the device or system, to facilitate various control schemes and algorithms and programmed therapeutic treatment methods, as described below. Furthermore, in certain embodiments, data provided by the height and pressure sensors of an individual cell can be collected, recorded, processed, displayed, and/or transmitted for various purposes, such as to monitor patient positioning/repositioning, confirm compliance with standard of care protocols, provide a full record of pressure-position-time information for patient assessment and diagnostic purposes. A separate inlet/outlet valve (e.g. proportional valve 209) may be provided for each individual cell of a plurality of cells to facilitate individualized inflation and deflation control for each such cell to control, for example, pressure applied to the body of a user and/or height independently of other cells.

While in some embodiments, a pressure sensor and/or height sensor and/or control valve(s) can be positioned within a cell, e.g. integrated into base 220 as shown in FIG. 2D, other positions or locations of a pressure sensor and/or a height sensor and/or control valve(s) either within the cell or remote to the cell are possible. In some embodiments, the pressure sensor and/or control valve(s) can be positioned remote of the cell but be fluidically connected to the cell to provide the same function as when part of the cell itself. For example, the sensors and valves could be grouped together in a common housing that is easily accessible to a user or service technician for servicing or replacement. The pressure sensor and/or control valves could be functionally associated with a particular cell(s) via fluidic tubing, for example. In some embodiments, the height sensor or at least a portion of the height sensor may also be able to be positioned remote of the cell or the base of the cell. In such instances, light may be transmitted to and from the cell to facilitate height measurement by, for example, optical fiber conduits. In some embodiments, both the pressure sensor and the height sensor may be positioned remotely of the cell or the base of the cell, and in particular embodiments, each of a pressure sensor and height sensor and control valve(s) may be positioned remotely of the cell or the base of the cell while being functionally associated with the cell.

Figure 5A:
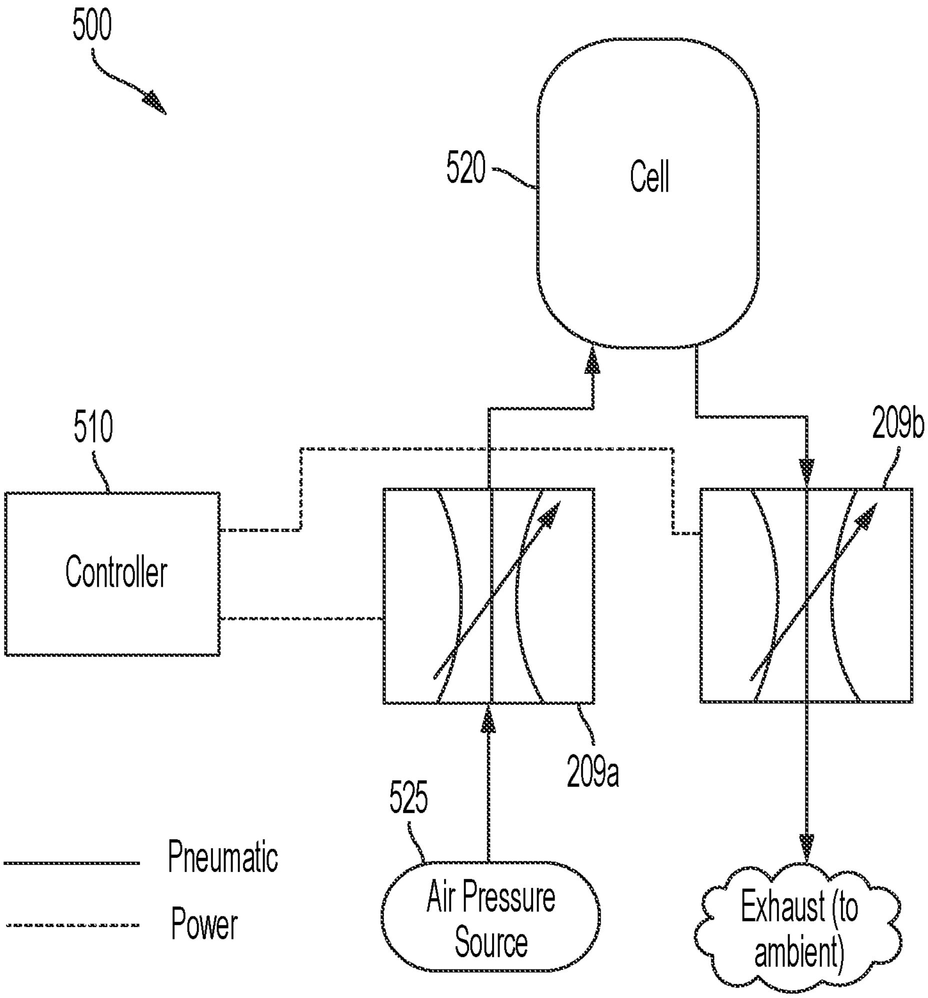
FIG. 5A is a schematic diagram of a control system configured to control the air pressure in a cell, according to some embodiments.

As mentioned, and as discussed in more detail below, a controller can be provided as part of an overall support system that is configured to receive, display, transform, and/or transmit data and/or control the cells of the device. For example, as shown in FIG. 5A, system 500 includes a controller 510 is associated with a representative cell 520 and an air pressure source 525 which supplies a pressurized air to the cell. In some embodiments, controller 510 can be operatively associated with each of the cells within the plurality of the cells, and the height and pressure sensors can provide height and pressure measurements, respectively, to the controller. In such embodiments, the controller can receive height and pressure data from the height and pressure sensors, respectively, and can relay this information to a user, an external operator, or an external processor.

In some embodiments, the controller may comprise a computer processor, and the processor can be used to control the bladder height and/or the pressure of an individual cell or a subset of cells within the plurality of cells based, at least in part, on data received from the pressure and height sensors. Referring again to FIG. 5A, controller 510 can, for example, be configured and programmed to control the bladder height and/or pressure of cell 520 responsive to measured pressure and/or height data received from a pressure and/or height sensor functionally associated with cell 520 via opening inlet valve 209*a* to inflate the bladder with pressurized air from source 525 (with outlet valve 209*b* closed), and to deflate the bladder by opening outlet valve 209*b* (with inlet valve 209*a* closed) to exhaust air pressure from cell 520 to the surrounding atmosphere or vacuum source (collectively shown as 527). Air source can be one or more of any suitable air fluid pressurizing system or pressurized air source able to supply air at a pressure sufficient to fill the bladder, such as an air compressor, a fan, a pump, a pressurized tank, etc. Some of the embodiments utilize air as the fluid within the bladder. It is also contemplated that other gases may also be employed. It should also be recognized that the fluid may be temperature controlled.

Figure 5B:
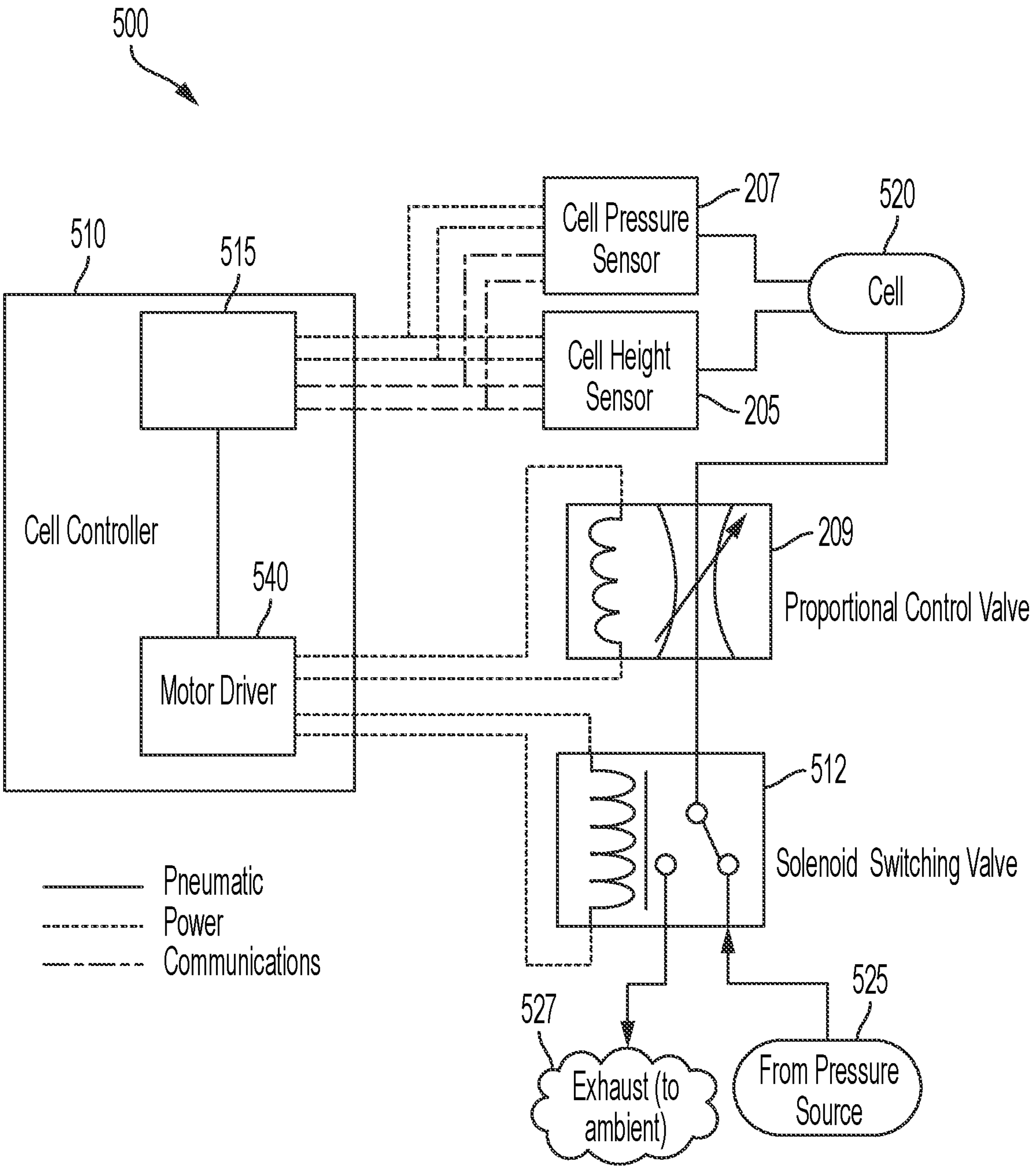
FIG. 5B is a schematic diagram of a control system comprising a microprocessor configured to electronically communicate with a pressure sensor, height sensor, and a proportional valve to control the air pressure and/or height of a cell, according to certain embodiments.

A system control schematic that is an alternative to that illustrated in FIG. 5A is illustrated in FIG. 5B. Referring to FIG. 5B, system 550 includes a cell controller 510 comprising a processor 515 that is electrically connected to a pressure sensor 207 and height sensor 205, which controls operation of a motor driver 540 which in electrical communication with and operates a proportional valve 209 and a solenoid switching valve 512 that selective places proportional valve 209 in fluidic communication with either pressurized air source 527 for inflation or ambient pressure (vent) 527 for deflation. Controller 510 is configured and processor 515 is programmed to enable controller 510 to measure and control the bladder height and pressure of cell 520. This can allow the user, an external operator, and/or a remote clinician with communications access to the controller to access pressure and height information related to, and adjust a setting (e.g., a bladder height, a pressure) of, a cell, multiple cells, each cell or the plurality of cells and/or all cells of the support, and/or input or change an operating mode, therapy protocol, or physically intervene to reposition or otherwise assist the patient, etc. executed by processor 515 in response to the measured bladder height and/or pressure provided by the height sensor(s) and the pressure sensor of an individual cell and/or other patient related pertinent information—e.g. pulse, heart rate, respiration rate, temperature, movement history, blood oxygen level, etc., which may, for example, be measured by the system or input into the system.

In cells functionally associated with one or more height sensors, the height sensors may in certain embodiments be selected and/or configured to provide a higher degree of measurement accuracy and reduce the need for a reference light emitter when compared to typical conventional light intensity measurement light sensors that have been used to measure bladder height in pneumatic bladder support systems. In some embodiments, each cell of a plurality of cells comprises a height sensor, and in certain embodiments with cell that comprise with multiple bladders, each such cell comprises a separate height sensor for independently measuring the height of each bladder of the cell. In some embodiments, the height sensor is configured to measure the height of the bladder over a majority of its range of motion (e.g., over 50%, 60%, 70%, 80%, 90%, 95%, 99%, or a full range of motion of the height of the bladder). Typical dimensions and fully inflated heights (i.e. defining a maximum range of motion) for bladders of certain support surface embodiments are discussed in more detail below. For some embodiments, the height sensor is configured to measure the height of the bladder within an accuracy of +/−100 mm, +/−50 mm, +/−30 mm, +/−20 mm, +/−10 mm, +/−7 mm, +/−5 mm, +/−4 mm, +/−3 mm, +/−2 mm, or less. For example, in such an embodiment, a height of a bladder can be set (e.g., by a user, by an external operator, by the controller) to a value of 16 mm and the true value of the height of the bladder could be controlled to be no greater than 20 mm and at least 12 mm. By providing a high degree of accuracy, the height sensor can permit the plurality of cells to be controlled to provide a precisely controlled surface topology which can enhance the comfort and protection of the user, such as a patient in a clinical or home care setting, compared with existing support systems. As is described in more detail elsewhere herein, accurate bladder height sensing of an individual cell within the plurality of cells can advantageously allow one or more cells to have the height of their associated bladder(s) to be controlled to a different height (e.g., a lower height) relative to immediately adjacent/surrounding cells within the plurality of cells providing the user relief in certain areas of the body, such as an ulcer, a sore, burn, post-surgical site or a protrusion and/or providing clearance/access for medical devices or comfort devices such as orthopedic stabilizers, catheters, arterial/venous ports, colostomy bags, CPAP masks, bedpans, NPWT device, dressings, etc.

According to some embodiments, each cell within a plurality of cells of the support device, and in some cases all of the cells of the support device will include or otherwise be functionally associated with at least one optical sensor, and in preferred embodiments, a separate optical sensor for each bladder associated with such cell. In some embodiments, a support base of each cell comprises integrated into or functionally associated therewith such optical sensor(s). The optical sensor can function as a height sensor to determine the height of the top of the bladder(s) above the base and/or the degree of depression of the bladder(s) in response to an applied force (e.g. from the body of a user). In some embodiments, the height sensor could be an inductance or capacitance-based sensor as opposed to an optical sensor, but optical sensors are preferred. A preferred optical sensor is configured to determine a height of the bladder independent of reflected light intensity. While optical sensors may be suitable for some embodiments, they have certain disadvantages in that they lose accuracy over time as the emitter ages and the emitted light becomes less intense, thereby requiring frequent calibration and/or the inclusion of a reference emitter. A preferred light sensor that does not suffer the above-described disadvantages that has been discovered to be suitable in the context of the present disclosure is based on time of flight (TOF) measurements. For example, with a TOF optical sensor, light may travel from an initial position starting at position of the optical sensor in the base of a cell to the top of a bladder where the light is reflected back to the optical sensor, and the time elapsed for the light to return to the optical sensor is measured and used to provide a measurement of the height of the bladder. As alluded to above, while optical sensors that rely on measurement of the change in an intensity of light traveling from the optical sensor and back to determine the height of cell, whereby the height is determined by the intensity of the incident light relative to the initial intensity of the departing light as compared to a calibration standard, become progressively less accurate over time and require frequent recalibration of the of sensor and/or inclusion of a reference sensor, TOF sensors rely on the time of flight and speed of light, which are invariant with intensity and do not require comparison to a calibration standard. Thus, TOF sensors require no or less calibration and can remain accurate even if as intensity of light diminishes over time.

In certain embodiments, the support base of a cell can include or otherwise be functionally associated with at least one TOF optical height sensor configured to determine a height of the bladder(s). As used here a "time-of-flight" (or TOF) sensor describes a sensor that determines the distance of an object from the sensor by measuring the time elapsed for light to travel from a light source of the sensor to a detector of the sensor after the light traveling from the source has reflected off the object whose distance from the source and detector are being measured and back to the detector. A TOF sensor can precisely measure the time that light (e.g., infrared light (IR) or visible light) takes to travel to the nearest object and reflect back to the sensor. The TOF sensor may be positioned at the base of a bladder and positioned to direct light so that it travels from the base to an inside surface of the top of the bladder which reflects the light back to the detector in the base, and the height of the bladder can be determined from a measure of the time it takes for light to travel from the base of bladder, to the top of the bladder, and back to the detector. By contrast, intensity-based measurement systems that estimate the distance by measuring the amount of light reflected back from an object, in addition to the drift and calibration disadvantages mentioned above, can also be more significantly influenced by the color, reflectivity, and surface texture of the bladder interior surface than certain TOF sensors. In some embodiments, the TOF sensor comprises an IR emitter, a range sensor, and an ambient light sensor. The IR emitter can emit infrared light to the top of the bladder, while the range sensor can detect the time it takes for the IR light to reach a surface of the bladder (e.g., a top surface of the bladder) and be reflected back in order to measure the height of the bladder. The ambient light sensor can subtract the influence of stray light from the measurement in order to decrease noise received by the range sensor. In certain embodiments, the TOF sensor will utilize a VCSEL (vertical-cavity surface-emitting laser) for the emitter. One example of a suitable TOF sensor is the model VL6180X TOF sensor by STMicroelectronics®.

The time required for the TOF sensor to measure the height of a bladder can depend on the distance of the emitter (e.g., an emitter at the base of the bladder) to the furthest point (from the emitter) of the bladder portion off of which the light is incident and reflects (typically an interior surface of the top of the bladder, e.g. surface 211 in FIG. 2D) and also the reflectivity this portion of the bladder. The inventors have recognized and appreciated in the context of the present disclosure the benefits of using TOF optical sensors to improve the accuracy and reliability of determining the height of a bladder of a support surface. In some embodiments, TOF sensors emit a short infrared light pulse and the TOF sensor measures the return time of the infrared light after reflecting off a surface (e.g., a surface of the bladder). It should be understood, however, that a TOF optical sensor may also measure light intensity, in addition to measuring the time elapsed of the light traveling from the sensor and back. As another advantage, as mentioned above, a time-of-flight optical sensor may be used in tandem with a pressure sensor and/or inlet/outlet valve(s) to enable measurement and control of both the height and pressure of a cell or a plurality of cells, in certain embodiments independently of other cells of the support device. Suitable Pressure sensors and valves are described in more detail below and elsewhere herein.

The time required for the TOF sensor to measure the height of the bladder depends on several factors including the distance being measured, optical conditions, and the degree of accuracy required. Some TOF sensors do not base a distance/height determination on a single measurement, but rather can emit many light pulses and make many measurements in rapid succession until the degree of deviation from measure to measure is less than a set level for the particular degree of accuracy desired. In some embodiments, the TOF sensor can provide a height measurement of a bladder within a relatively short amount of time when compared to certain existing systems (e.g., within 250 milliseconds (ms) or less per height measurement). In some embodiments, the time-of-flight sensor determines a height of a bladder in a time of as short as 5 ms or less, 10 ms or less, 20 ms or less, 30 ms or less, 40 ms or less, 50 ms or less, 75 ms or less, 100 ms or less, 150 ms or less, 200 ms or less, or 250 ms or less. In some embodiments, the time-of-flight sensor determines a height of a bladder in a time between 5 ms and 250 ms, between 10 ms and 150 ms, between 20 ms and 150 ms, between 30 ms and 150 ms, between 40 ms and 150 ms, between 50 ms and 150 ms, between 75 ms and 150 ms, or about 100 ms. Other ranges are possible (e.g., between about 100 nanoseconds and 1 second) depending on desired measurement speed and accuracy.

A controller can be configured to receive height data from a TOF sensor. In some embodiments, the controller may be configured and programmed to receive height data from a TOF in, or otherwise functionally associated with, each cell of a plurality of cells, and preferably each bladder of each cell of the plurality of cells. For example, a plurality of cells (e.g., a subset of cells) can be configured such that each cell of the plurality of cells is associated with a TOF sensor associated with each of the one or more bladders of the cell, and a controller can be configured and programmed to receive height data from each TOF of at least some of the cells (e.g., all of the cells). Because each TOF sensor as noted above may require an interval of time over which to determine the height of its corresponding bladder, the controller can be programmed to interrogate the TOF sensors and collect height data from the TOF sensors at time intervals time (interrogation time) of sufficient duration to allow the TOF sensors to determine a height measurement to a desired degree of accuracy. As each TOF sensor determines height data of its associated bladder within the above-described ranges, an interrogation time of a duration at least as great as the sensor determination time allows the TOF sensors being interrogated sufficient time to complete the height measurement. This interrogation time thus can advantageously be longer than the time a TOF sensor requires to determine the height of an individual bladder. For example, in some embodiments, the interrogation time is at least 250 ms, at least 300 ms, or greater, and in an exemplary embodiment the interrogation time is 330 ms. In some embodiments, the interrogation time is no greater than 1 second, no greater than 800 ms, no greater than 600 ms, no greater than 400 ms, no greater than 330 ms, no greater than 300 ms, no greater than 250 ms, or less. In some embodiments, the interrogation time is at least 1 millisecond, at least 10 ms, at least 50 ms, at least, 100 ms, at least 200 ms, at least 200 ms, at least 400 ms, at least 600 ms, at least 800 ms, at least 1 second, or greater. Other ranges are possible (e.g., between about 250 ms and 500 ms) depending on the desired measurement accuracy, processor speed, power consumption, data storage capacity, data display refresh rates desired, etc. In selecting an interrogation time, non-limiting considerations such as the desire for real-time data/adjustments, controller and/or processor capability, power consumption, among other considerations can be considered.

As mentioned above, in accordance with some embodiments, the base of a cell that is individually controllable can include or be functionally associated with at least one valve in fluidic communication with the bladder(s) and configured to control inflow and/or outflow of a fluid (e.g., to allow compressed air to enter the bladder(s) for inflation and to release air from the bladder(s) for deflation). As illustrated above and described in the context of FIGS. 5A and 5B, single or multiple valves in parallel or series can be used, as would be understood by those of ordinary skill in the field. For example, the embodiment shown in FIG. 5A uses two proportional valves per cell—209*a* and 209*b*—in parallel, with a first 209*a* acting as an inlet valve and a second 209*b* acting as an outlet valve. Alternatively, in the embodiment of FIG. 5B, a single proportional valve 209 is used in series with a solenoid switching valve 512 which selectively places the proportional valve 209 in fluidic communication with the pressurized air source 525 or exhaust 527.

Figure 6:
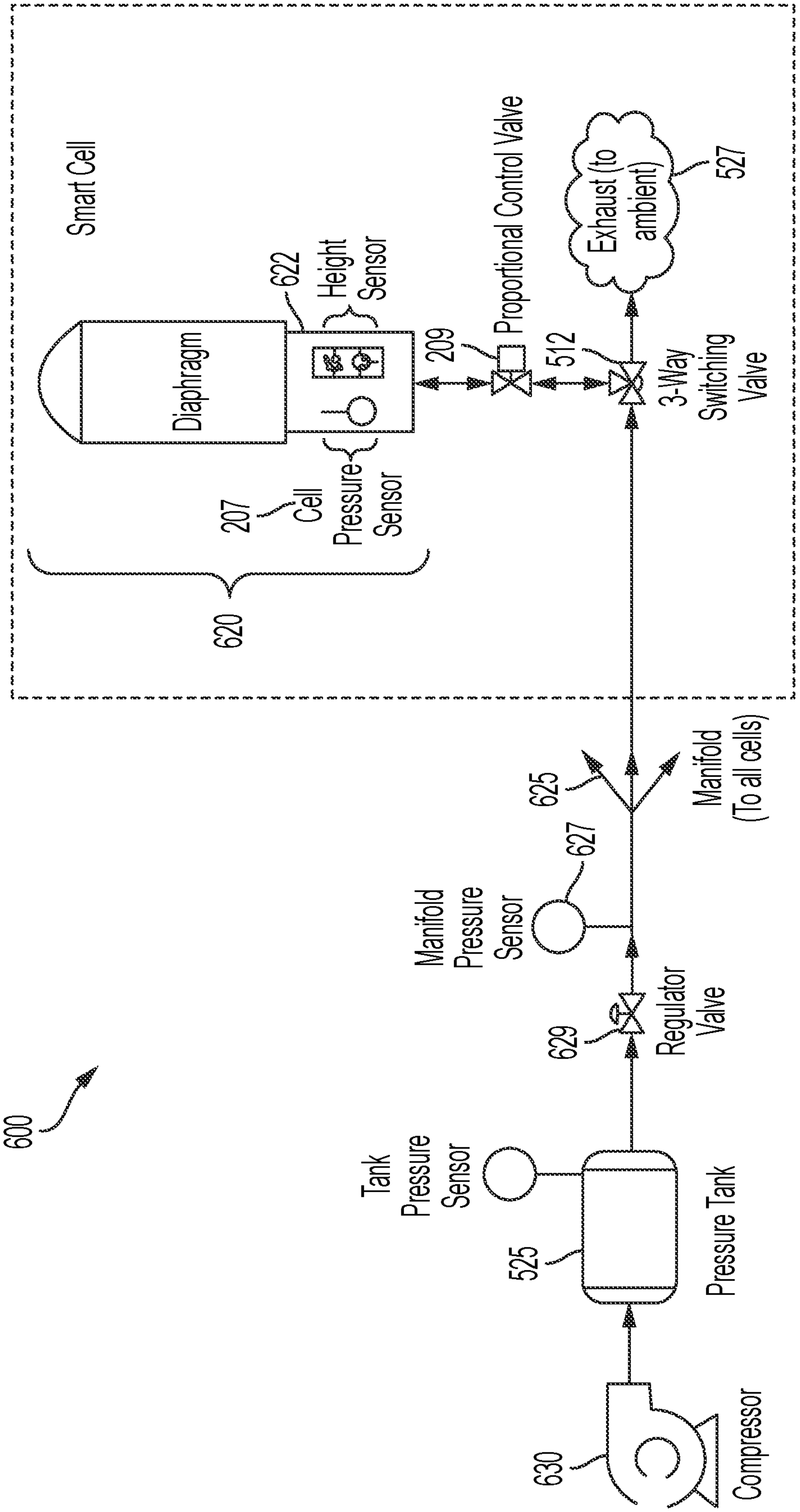
FIG. 6 is schematic diagram of a pneumatic supply and control system for supplying pressurized air to a cell with a proportional valve connected to a manifold, according to some embodiments.

Similarly, FIG. 6 depicts a cell embodiment configured with a proportional control valve 209 associated with cell 620 through the bottom portion of base 622. Proportional valve 209 is in series fluidic communication with a 3-way switching valve 512 in fluidic communication with and exhaust line 527 and a manifold 625 supplying pressurized air to all of the cells and in turn in fluidic communication with a manifold pressure sensor 627, a regulator 629, s pressure tank 525, and a compressor 630 ultimately providing the pressurized air to system 600. The base 622 comprises a pressure sensor 207 and a height sensor 205. Based off a signal from the pressure sensor 207 and/or height sensor 205, the manifold 625 may provide more pressure to the cell, such as through pressure tank 525, or release fluid from the cell through the exhaust 527 in order to reduce the pressure and/or bladder height of the cell to a controlled set point, through appropriate controlled operation of valves 209 and 512. Valves 209 and 512, and indeed any of the other valves of any of the systems described and illustrated herein in some embodiments, can be independently controllable with respect to one another. Valves 209 and/or 512 can comprise electronically controllable valves, such as to be adjusted automatically or semi-automatically such as via a controller such as controller 510 of FIGS. 5A and 5B.

While the various controllable and electronically actuatable valves of the system can be any of a variety of known valve types including but not limited to solenoid valves that may be proportional or non-proportional including, for example sliding stem valves, rotary valves, pinch valves, diaphragm valves, etc., in some preferred embodiments, control valve(s) included as part of a cell or functionally associated with a cell are piezoelectric valves. Such piezoelectric valves have certain advantages recognized by the inventors in the context of the present disclosure that make them particularly attractive for use in certain embodiments of the support devices and systems described herein. For example, such valves can have a rapid response time, enhanced proportionality, low power consumption, low wear, low maintenance requirements, and long life, and also can be exceptionally quiet compared to conventional valve types used for similar applications, which can be particularly advantageous for use in hospital or other clinical care or home use settings. As but one example of an advantage, using typical non-piezo-proportional valves on the market, power surges upon the valves opening or closing can be in excess 15 Amp. With piezo vales, for an example of a 500 cell/valve containing bed, surges can be kept below 15 amps, making such a bed useable for home healthcare and typical home power circuit load limits. As used herein, "piezoelectric" describes an object (e.g., a component of a valve) that generates electric charge in response to applied mechanical force and vice versa—i.e. undergoes a mechanical deflection or deformation in response and proportional to a voltage applied to the piezoelectric element—this is known as the "inverse piezoelectric effect" and is the principle of operation of a piezo electric valve. Accordingly, piezoelectric valves described herein can respond to a voltage applied to the piezoelectric element of the valve such that the element deflects proportionally within the valve body allowing an inflow or an outflow proportional to the voltage applied. In some embodiments, a controller operatively associated with each of the cells within the plurality of the cells can be in electrical communication with the piezoelectric valve such that the controller sends a voltage signal to the piezoelectric valve to operate the valve to adjust the height and/or the pressure of the bladder in response to a force applied by a user to the bladder in order to maintain or achieve a desired pressure and/or height set point for a particular cell. In this way, the piezoelectric valve can advantageously provide a low cost, low noise, reliable and quiet solution amenable and responsive to a degree of automation and response time desirable for certain embodiments of the support system.

The ability to independently control the height and/or pressure of the bladder(s) of individual cells of support surfaces and devices according to certain embodiments permits the ability, through automated control and/or programmed and user customizable control algorithms in certain embodiments to achieve functionality not possible with typical conventional devices for supporting medical patients and other users. Further description of exemplary embodiments of such control and functionality are described below. But it should be understood that the examples discussed are only a small subset of the many ways the design features and control capabilities described in the present disclosure could be exploited for patient or other user benefit. A key feature of certain embodiments that can facilitate such functionality is that plurality of cells (or all cells in some cases) of a support device can be configured such that one or more cells of the plurality of cells can be controlled to have a different bladder height and/or different applied pressure/force on the body of the user than any of the neighboring adjacent cells, and that the pressure and/or height control can take place at the level of individual cells (for example, with a resolution as fine as the level of individual bladders for cells that include a single bladder associated therewith).

Figure 7:
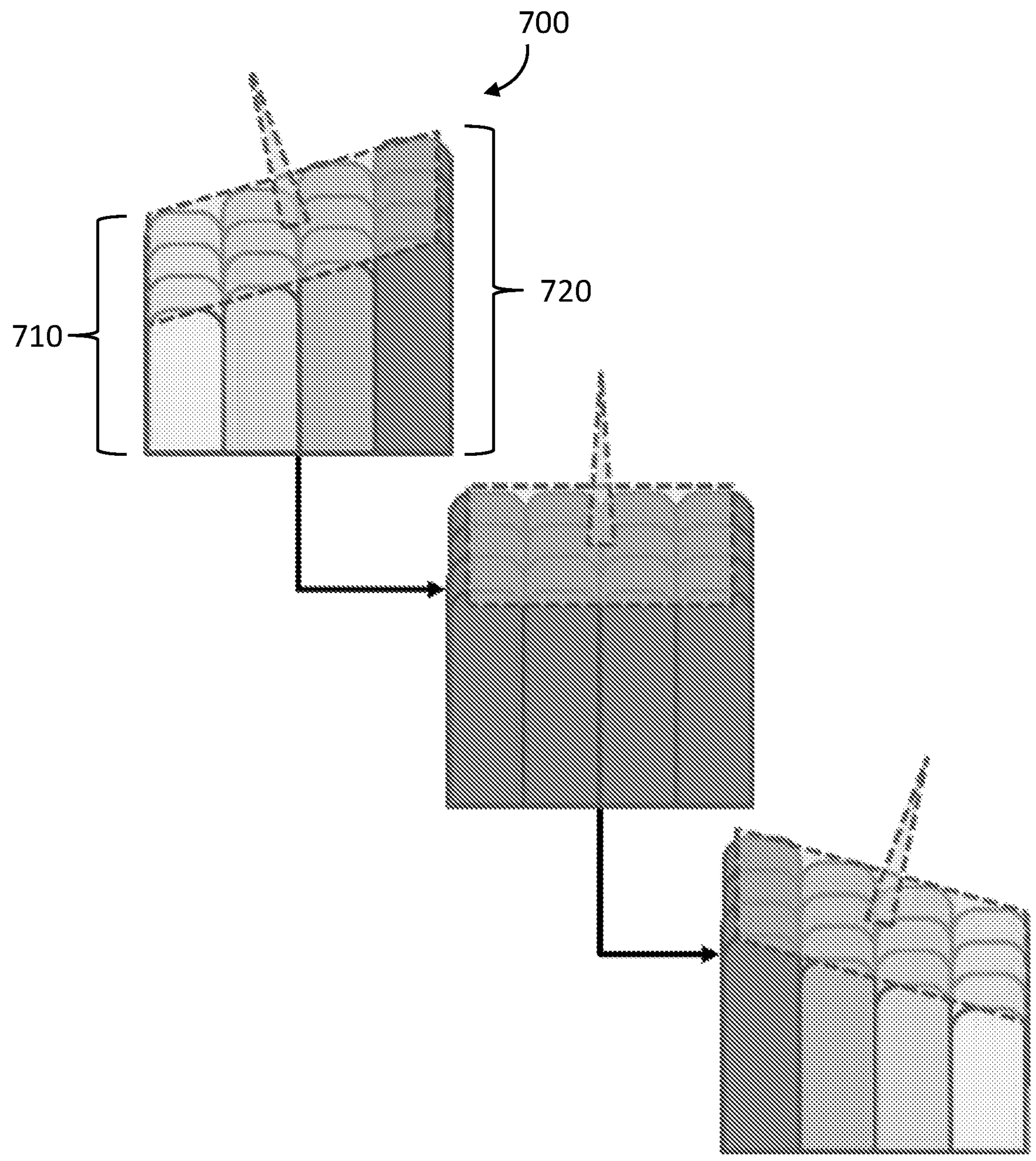
FIG. 7 schematically depicts several zones of cells controlled at different heights to provide differently oriented support surfaces, according to one set of embodiments.

For example, FIG. 7 shows a plurality of bladders of cells 700 representing a subset of the cells of an embodiment of a support device. As illustrated, each cell is associated with a single bladder so that each bladder can be controlled to have a different height than those of neighboring cells. For example, bladders of a first subset of cells 710 are at a different height than bladders of a second subset of cells 720 in a first state (top) to provide an angled surface, whereas in the middle panel, bladders of all the cells are maintained at the same height, and in the bottom panel, the relative bladder heights of cells 710 and 720 are reversed to present the surface on which a patient or user would be in contact at an angle that differs from the top panel. Such manipulation could, for example, be used to facilitate rolling or repositioning of the patient or facilitating ingress or egress of the user from the bed, seat, or other configuration of the support device. In addition, such manipulation could be used to achieve “micro repositioning,” the type used for patients whose condition is too fragile to tolerate larger repositioning adjustments.

Figure 10:
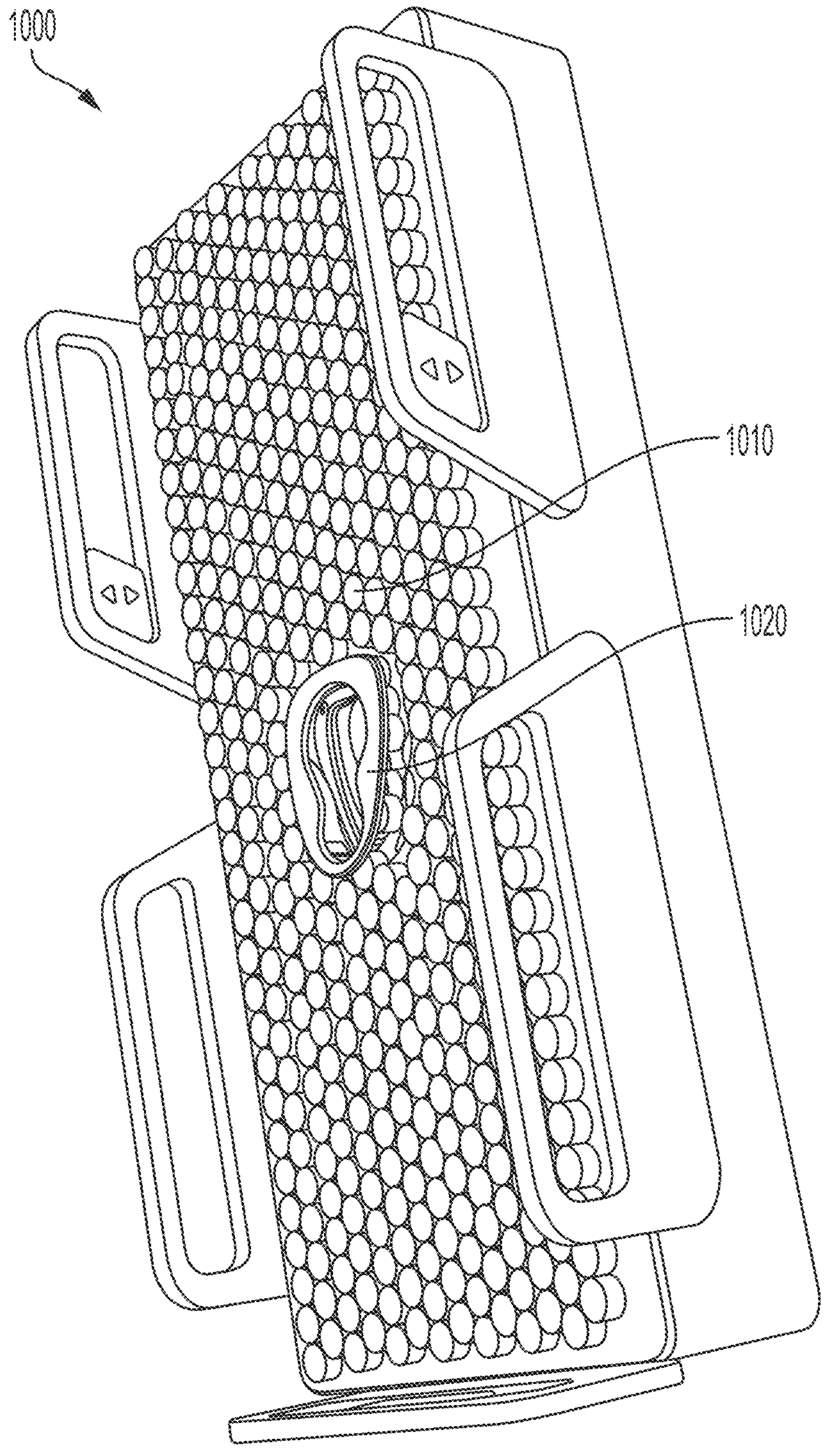
FIG. 10 schematically depicts a support system having a bedpan resting in a void created by the controller of depressured cells while the neighboring adjacent cells remain pressurized for support, according to one embodiment.

In some embodiments, the plurality of cells is configured to permit an operator of the system to, for example when at least a first set of bladders of the plurality are fully inflated, manually depress at least one or a subset of the first set of bladders to a specific height/depression desired and to initiate a height control set point of the controller (e.g. via a GUI) to control the cells with depressed bladders at the set point height, and maintain such height of the subset of bladders until such command is cancelled by the operator. This can be advantageous, for example, when a portion of the body of a user has, for example, a protrusion, a sore, or an ulcer, burn, surgical site, delicate skin graft, where contact would be uncomfortable or undesirable. Such functionality can also permit the ability to set and control precise degrees of depression in any desired area of the surface to facilitate clearance for medical devices attached to the patient, placement and lifting of a bedpan (See, e.g., FIG. 10), and access to areas of the body of a patient for injections, cleaning, etc. without the need for removing the patient from the device or repositioning the entire body. Of course, while manual depression is one possible means for triggering a height or pressure reduction set point, other means may also be included in certain embodiments, such as inputting a desired bladder height and/or pressure for a desired cell(s) on a GUI of the controller or other user interface, as would be understood by those skilled in the art.

Figure 8A:
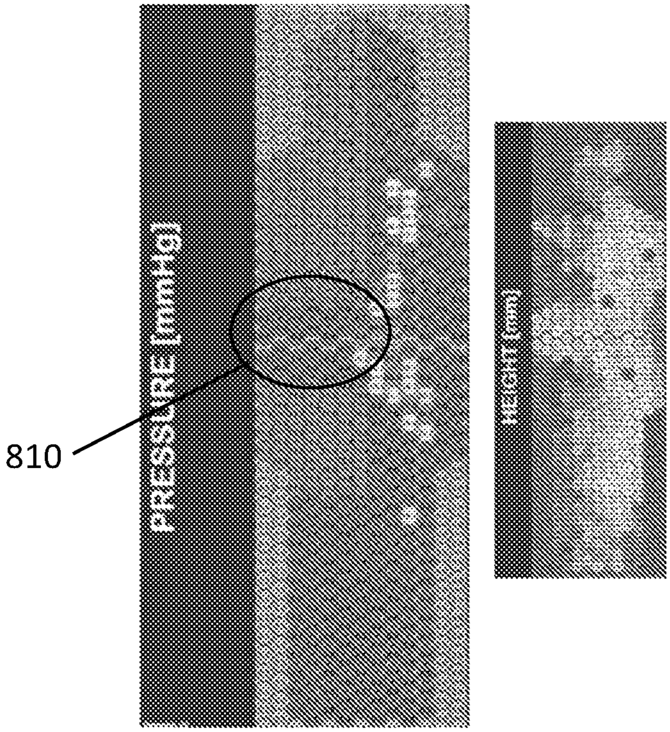
FIG. 8A shows an image of a display of a graphical user interface of a system displaying color-coded height depictions of a plurality of cells in which at least a portion of the cells have been depressed to provide an area of clearance near the user, according to one set of embodiments.
Figure 8B:
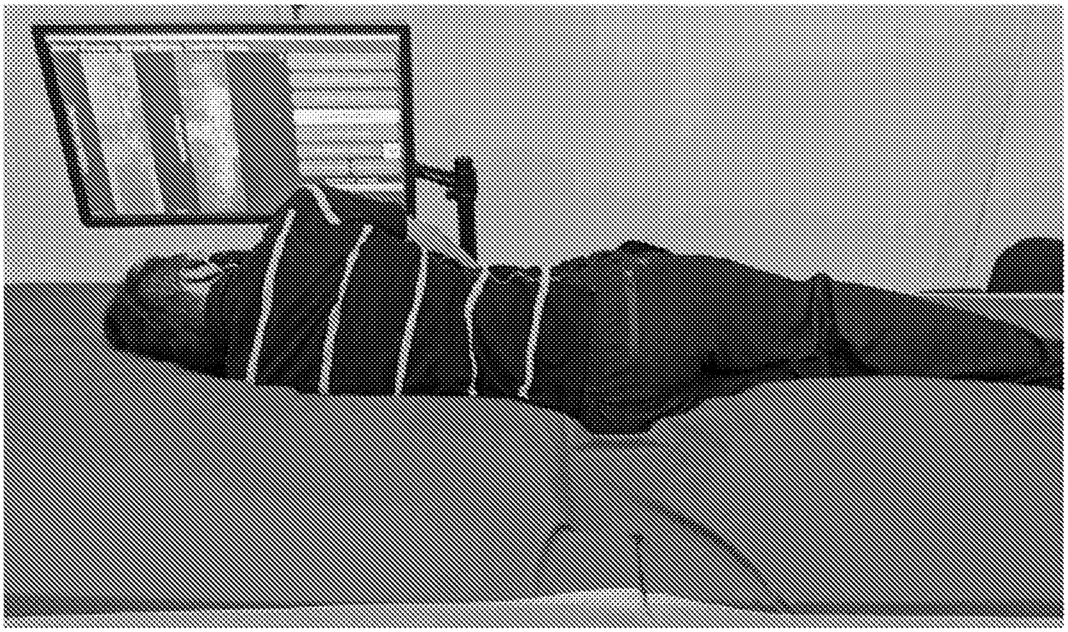
FIG. 8B is a photographic image of a user lying on a support system pf the invention in which the support surface topology and cell heights correspond to the color-coded display depicted in FIG. 8A.

As another example, manually depressing the bladders of one or more cells to a specific height/depression can be used to create a custom surface. For example, FIG. 8A shows bladder height and pressure GUI images where bladders of a subset 810 of cells have been manually depressed to create a custom depression in the surface. The depression may be useful to provide, for example, clearance for a health care provider to perform a procedure on a patient, such as a debridement or lavage procedure and/or for positioning a basin to collect irrigation applied to the body of a user adjacent to the one or more cells whose bladders have been depressed. FIG. 8B shows a photograph of a user positioned on the custom surface corresponding to the GUI images of FIG. 8A. While the bladders of the cells may be manually depressed to create an operator defined setpoint in certain embodiments, it should be noted that in some cases, the bladders of the cells may in addition or instead be depressed via operator input to the controller via the GUI or other means.

Figure 9:
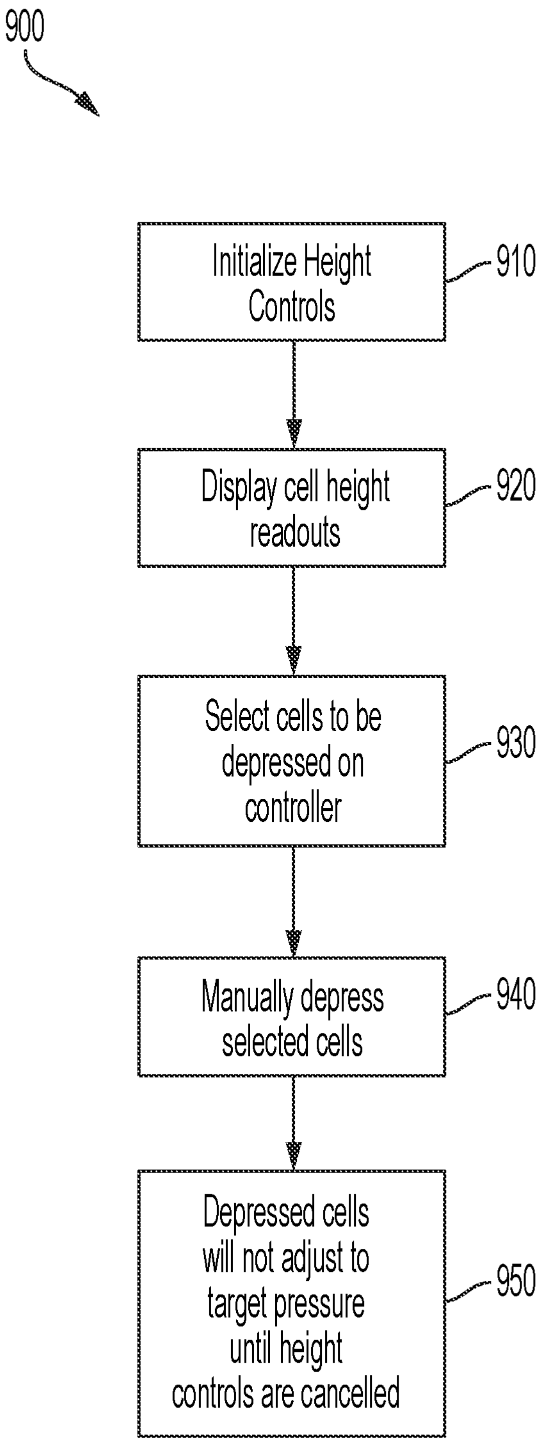
FIG. 9 is a flow chart showing a cell height control and display process under control of a controller configured to allow manual depression of cells to be controlled at a lower pressure and/or height that a displayed overall set point pressure or height for surrounding cells, according to some embodiments.

FIG. 9 shows a flowchart 900 of an exemplary control algorithm for a controller implementing the above-described height/pressure control method configured to provide manual depression of bladders of cells to create a set point. The bladder(s) of one or more cells of the plurality of cells can be depressed to a desired degree such that the bladder does not contact an area of the patient where contact is undesired, while still maintaining support of the patient generally via the surrounding undepressed bladders. In step 910, the controller initializes height controls, e.g. at the prompt of an operator. In step 920, the control reads and displays the current heights of bladders of all cells or a selected group/region of cells. In step 930, selected cells to be subject to the local control are identified and selected by the operator, e.g. via the GUI or by touch activation. In step 940, the operator manually depresses the bladder(s) of selected cells to a desired degree to create the control set point. Finally, in step 950, the controller maintains the target pressure of the cells with depressed bladders at the level required to maintain the control set point until the command is cancelled by the operator or another cancellation trigger occurs (e.g. the termination of a timer if the operator set a specific duration for the control, etc.). For some embodiments, a controller can be used to depress bladder(s) of a cell or a zone within the plurality of cells so that a user or an external operator can provide clearance without the need to provide direct physical contact in order to depress a bladder(s). However, in other embodiments, as described above, the user or an external operator may physically provide force to the bladder(s) to be depressed such that the desired bladder(s) can be manually depressed.

In some embodiments, a controller can be used to control the bladder height of each individual cell within the plurality of cells, such that the bladder(s) an individual cell, or any subset of cells, is at a maintained at lower height and/or lower pressure than bladder(s) of neighboring adjacent cells. That is to say, in some embodiments, a controller operatively associated with each of the cells within the plurality of the cells, may comprise a processor configured and programmed to control the bladder height of a first set of bladders within the plurality of cells, the first set comprising at least one bladder, wherein the first set is configured to support the body of the user, and control the height of a second set of bladders within the plurality of cells, the second set comprising at least one bladder, to maintain a height of the second set beneath the height of the first set to provide a clearance between the bladders of the second set and the body of the user. The clearance may be selected and set as described above by the user (e.g. patient) or other operator (e.g. clinician). This clearance, for example, can provide relief to a protrusion, a sore, an ulcer, burn, or surgical site of the user's body. In some embodiments, the clearance is at least 1 mm separated from contact with the body of the user up to, in some cases the full distance of travel of the bladder or minimum allowable height of the bladder(s) of a cell, while the bladder(s) of neighboring adjacent cells extend to their full support height, such that these bladder(s) of neighboring adjacent cells still support the body of a user.

In some embodiments, depressed bladders can provide clearance for an object. For example, in FIG. 10, cells 1010 of bed device 1000 are a maintained at a pressure and bladder height to support the body of a patient, while the cells underneath bed pan 1020 are controlled a depressed bladder height (or completely deflated in some cases), to accommodate the placement of the bed pan. The difference in height (e.g., the clearance) has been made to provide a space for bed pan 1020. In certain embodiments, the cells under bed pan 1020 could be operated to raise and lower the bed pan to further assist the process of use of the bedpan while avoiding spillage and the need to reposition the patient or discontinue support of the patient's body by cells 1010.

In some embodiments, each bladder of each cell may form part of an overall support surface of the device for the patient/user, and such overall support surface can, in certain embodiments, have a topology that is able to be measured and displayed (e.g. via a GUI) and controlled (e.g. display and control of a body support surface topology). In other words, in some embodiments, a body support surface topology of the plurality of bladders of the cells making up the device can be defined, collectively, by the height of the top surface of and/or pressure of each of the bladders of the plurality of cells making up the support surface.

Figure 11A:
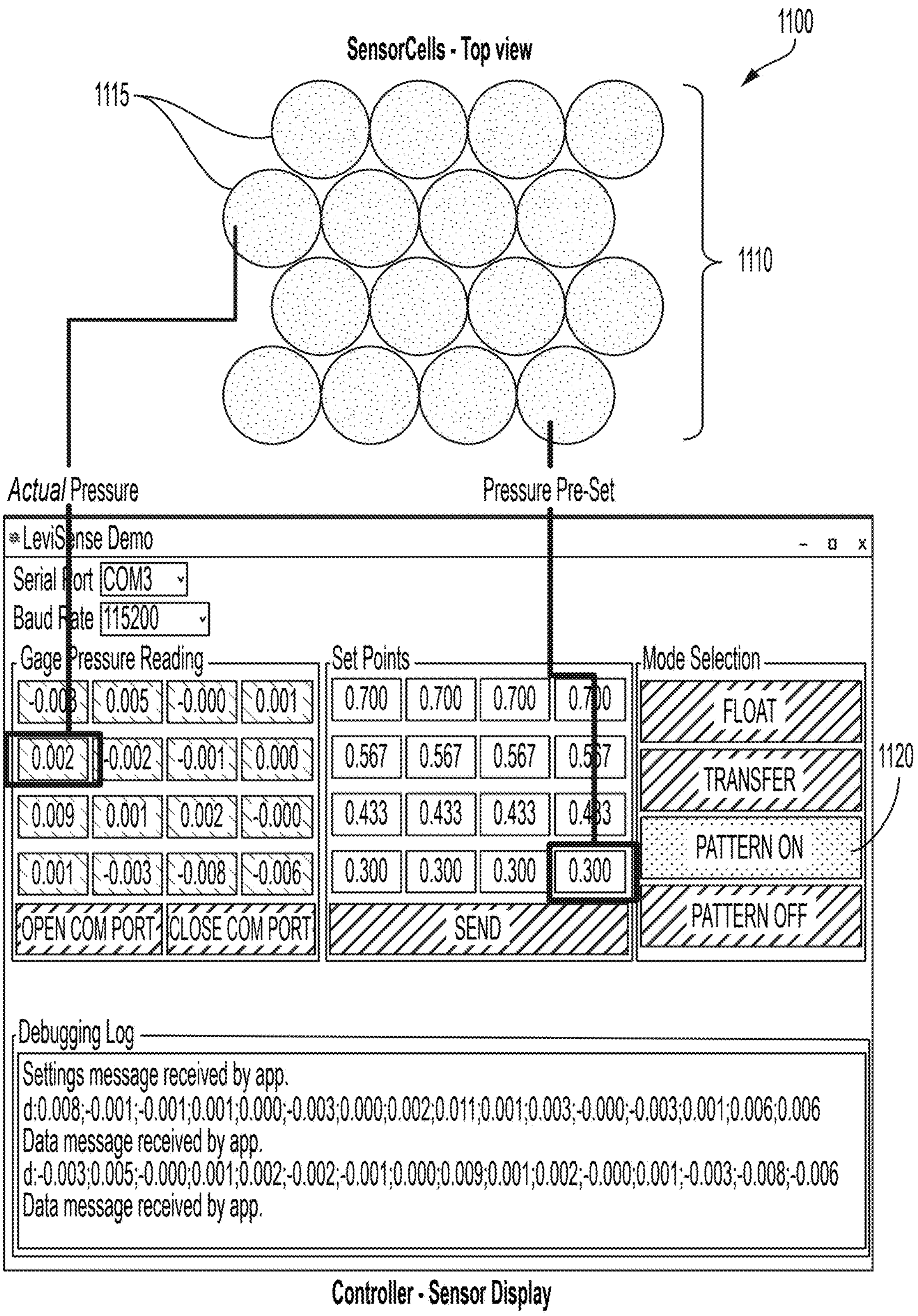
FIG. 11A schematically depicts (top) the top surface of support cells and (bottom) a graphical user interface (GUI) displaying the pressure of each cell, according to one embodiment.

For example, FIG. 11A shows a representative portion 1100 of top surfaces of a plurality 1100 of bladders of cells 1115. Also illustrated is a controller GUI 1120 of a controller configured for displaying information regarding the cells and controlling the cells. Pressure readout from each cell is displayed in this read out on the GUI, but other views may display, for example height data for the bladder of each cell. Cells of different bladder heights and/or pressures can then be mapped and displayed accordingly, and the set points for each may be input by an operator. The controller may provide a read out to a user interface, which can display information, such as the pressure and/or bladder height of a cell and can also display a tissue-interface pressure (TIP). In some embodiments, the controller (e.g., a processor within the controlled) may be configured to maintain a maximum or a minimum TIP of most therapeutic benefit for the patient/user.

Figure 11B:
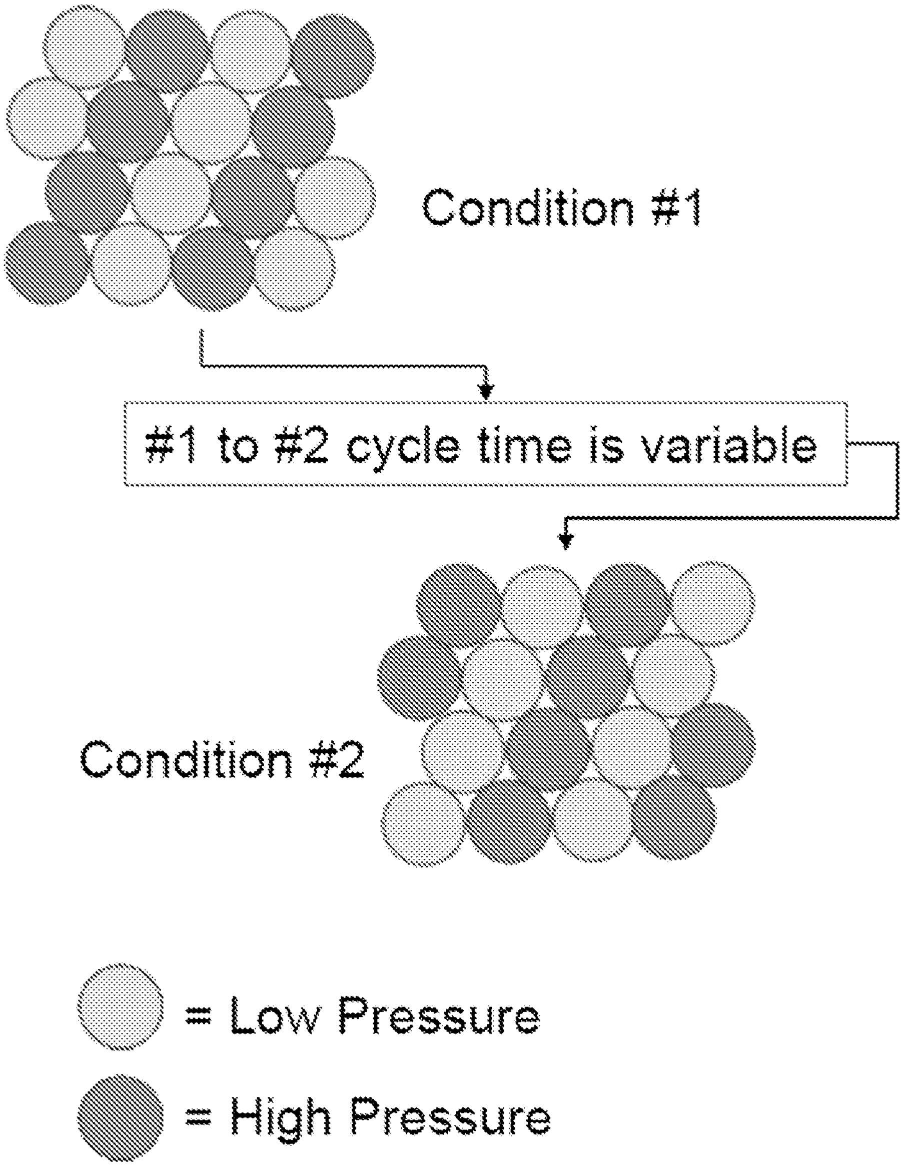
FIGS. 11B-11C schematically illustrates a zone of cells controlled at a lower pressure than the neighboring adjacent cells according to a time-varying cycle (FIG. 11B) and to maintain a regional pressure relief area (FIG. 11C), according to some embodiments.
Figure 11C:
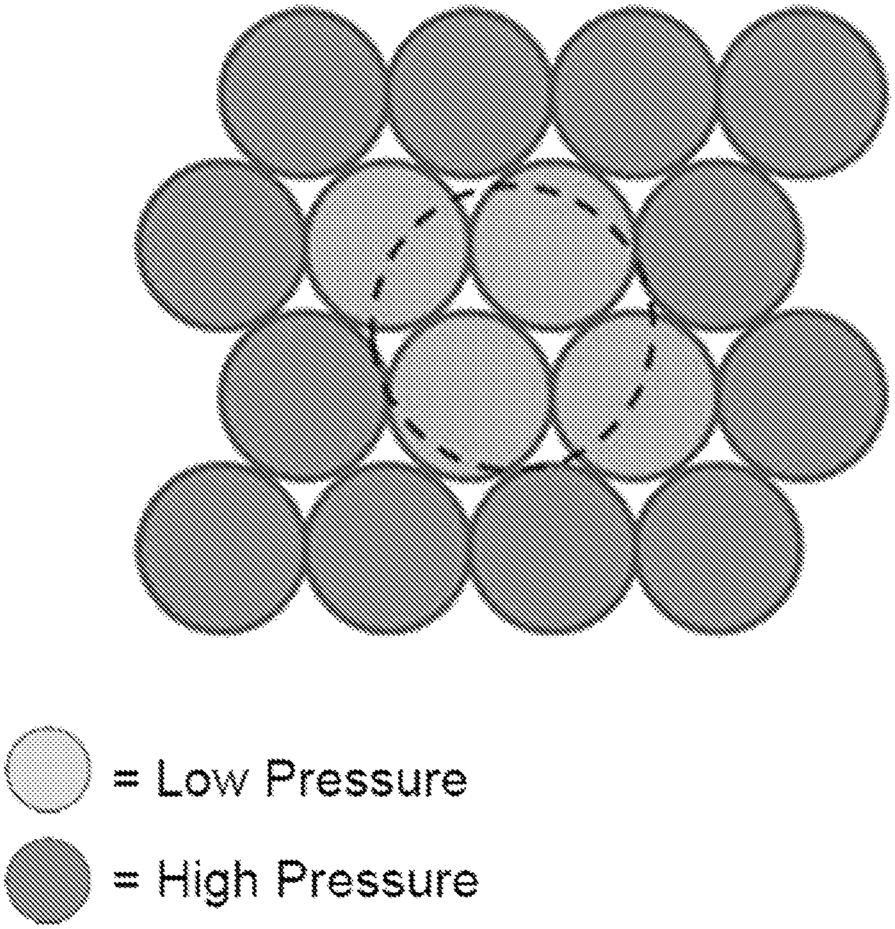
Figure 12:
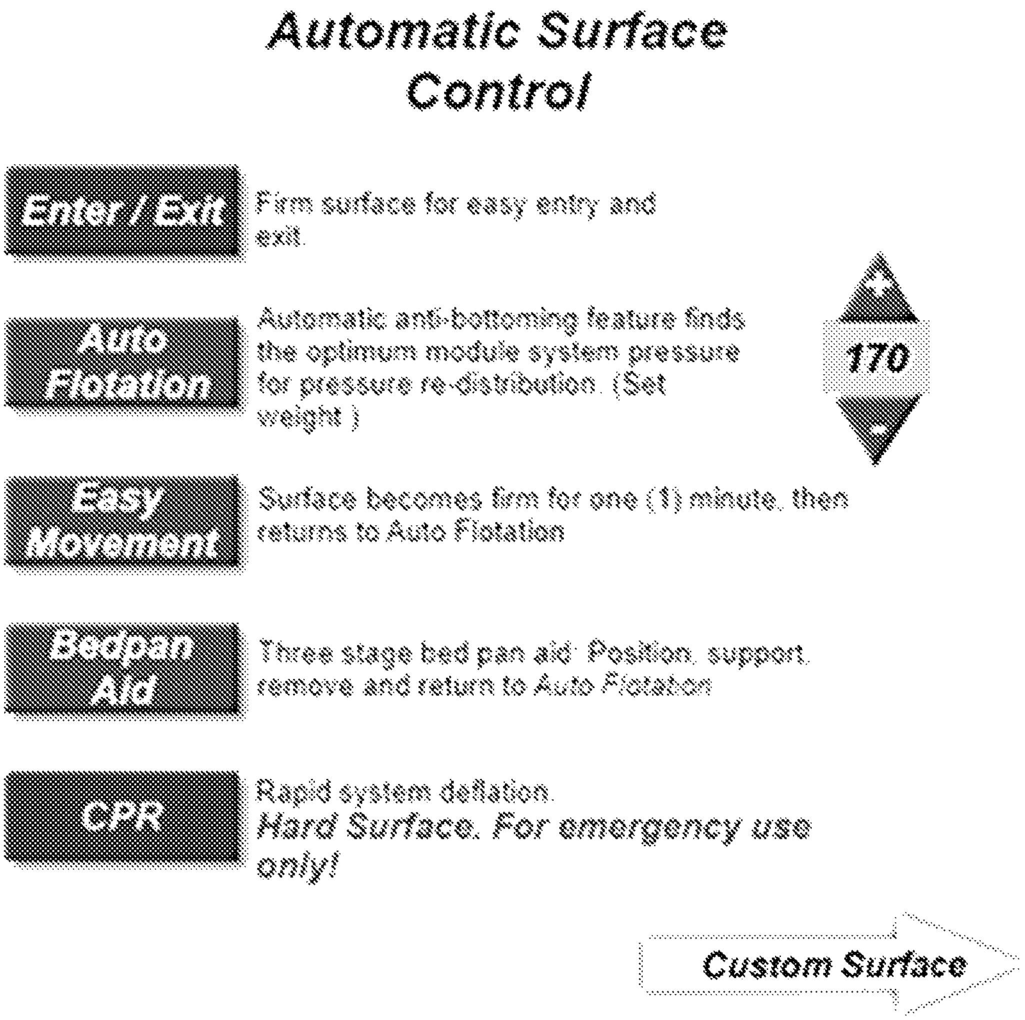
FIG. 12 shows several control mode options for Graphical User Interface (GUI) of a controller of a support device, according to some embodiments.

As shown in FIGS. 11B-11C, various control algorithms and time variant and automated adjustment of cell pressure and/or bladder height that may be programmed into the controller and selectable (e.g. via a GUI) for deployment by an operator in certain embodiments. FIG. 11B illustrates a massage or time variable pressure function that may benefit, for example, temporary cyclical reduction of pressure, user comfort or improved circulation. In Condition #1, certain cells (light) are controller at a lower pressure and/or bladder height than other cells (dark). In Condition #2, the pattern is inverted. The inversion time for the cycle may be fixes at a selected frequency/duration and/or variable in a determined or random pattern, depending on user/operator preference. In FIG. 11C, a central group of cells (light) is maintained at a lower pressure to provide a selected reduced TIP to an area of the body of a patient/user—e.g. an area of protrusion or sensitivity as described above. Various additional modes may be programmed into and executed by the controller. These modes may direct certain cells to maintain certain pressures and/or bladder heights in certain areas or at certain times, and may adjust pressure and/or bladder height to facilitate certain patient manipulation, safety, or emergency protocols For example, referring to FIG. 12 various operating modes can include an enter/exit mode, where cells are maintained at a pressure providing a firm, relatively non-compliant surface, an auto flotation mode which is a standard support mode for a user where cell pressure is controlled to provide a desired TIP based on for example the weight of the user, an easy movement mode with mirrors the enter/exit mode except for only a fixed, short time interval (e.g. one minute), a bedpan aid mode discussed above in the context of FIG. 10, a CPR mode where all cells are commanded to a rapidly inflate to a maximum permissible pressure providing a hard, non-compliant surface allowing for CPR to be safely applied to the user, and custom surface modes programmable by an operator.

In one set of embodiments, custom and/or pre-set/pre-determined modes can be implemented by the controller that are configured to provide the user with a particular degree of immersion or envelopment and/or a particular orientation and/or a particular position and/or a particular relative motion with respect to the surface defined by the cells. In some embodiments, a patient-independent calibration and set-point determination may be used to provide enhanced immersion to the body of the user while also minimizing pressure applied to certain portions of the body of the user, without the need for detailed information to be input related to the size/weight or position of the user. For example, the body of the user may be placed adjacent (e.g., directly adjacent) to and supported by bladders of the plurality of cells comprising the support surface, and the pressure of the bladders of the supporting cells can be reduced under control of the controller to allow the body of the user to move towards the base of the supporting cells to a limit, predetermined degree of immersion to set a minimum bladder height/pressure setpoint. Based on the minimum pressure applied to the supporting cells to avoid moving below this particular point, a set point or a reference impression is established. The system (e.g., a controller of the system) may then use an algorithm to determine the pressure for the depressed cells and other cells of the surface to provide an additional uniform increase to the minimum height according to a desired user immersion degree, or to fix a bladder height/pressure set point to transform the reference impression to provide a desired surface support topology and position specific degree of immersion for the user. In some embodiments, the desired degree of immersion/immersion profile results in the ability to better minimize the required pressure to support the patient while maintaining the desired fixed or position-specific bladder height determined by the controller by applying a mathematical transform (e.g. a simple pressure addition function in an embodiment where the goal is to create a uniform increase in the minimum bladder height to provide a specific level of immersion) to the pressure and/or bladder height readings taken in the reference impression. Advantageously, minimizing the applied pressure can reduce or eliminate the risk pressure injuries (e.g., bed sores, pressure ulcers) on the user.

In some embodiments, a reference impression referred to as a form capture, can take the form of the impression created by the body of a user as determined by measuring the bladder height and/or pressure of the plurality of the cells when the body of the user is placed upon the support surface and allowed to sink to the point where bladder(s) of at least one cell reach the minimum height/pressure setpoint. The form capture of the user may be determined by reading and recording the bladder heights and/or pressures at a particular point in time (e.g., after at a particular set point or reference point has been reached—e.g. the point where bladder(s) of at least one cell reach the minimum height/pressure setpoint). For example, the user may be placed on the support surface, and the bladder heights of the cells can be determined at a given set pressure of one or more of the cells supporting the user. In some embodiments, one or more individual bladder heights or heights of a set of ganged bladders of one or more cells supporting the user may then be used as to define a position-specific set point or a to establish a position-specific reference, the totality of which comprise the above-described form capture. That is to say, the form capture may be used to define reference/initial points to which a mathematical transform is applied. In some embodiments, the form capture can be viewed by the user via a display receiving information from the control system. The system may also include processors, storage, and/or communications capability to record and transmit data related to the form capture, the mathematically transformed form capture, and the resulting surface topology and/or position-specific pressure distribution over a treatment period of a user. In some embodiments, a controller (e.g., a processor of the controller) can read and record the bladder heights and/or pressures by using the height and/or pressure sensor(s) of a cell or set of cells or all cells of the support surface of a device.

In some embodiments, the controller can be used to change the position of the body of the user relative to the form capture by adding or subtracting an increment of height (e.g., to/from the form capture heights and/or from any other desired reference point), uniformly to at least some (e.g., all) of the cells, up to the maximum or minimum range of motion of the bladder(s) of the cells. In some embodiments, the controller may increase or decrease the pressure in the cells until the desired bladder height of the cells is achieved, thereby adjusting the position of the body of the user and changing the effective degree of immersion of the user. The effective immersion resulting from applying the mathematical transform to the form capture heights/pressures.

In some embodiments, the mathematical transform is more complex than a uniform add/subtract function and can take, for example the form of a linear, non-linear, trigonometric, etc. function. In some embodiments, the mathematical transform applies a trigonometric function to the form capture that adds or subtracts an increment of height to the bladders in a position-specific manner that maintains a partial outline of a recorded transverse plane of the user. In some such embodiments, via application of an appropriate transform, the partial form capture position can be rotated, thereby adjusting the position of the user and changing the effective angle of the user along the vertical or craniocaudal axis.

Figure 13A:
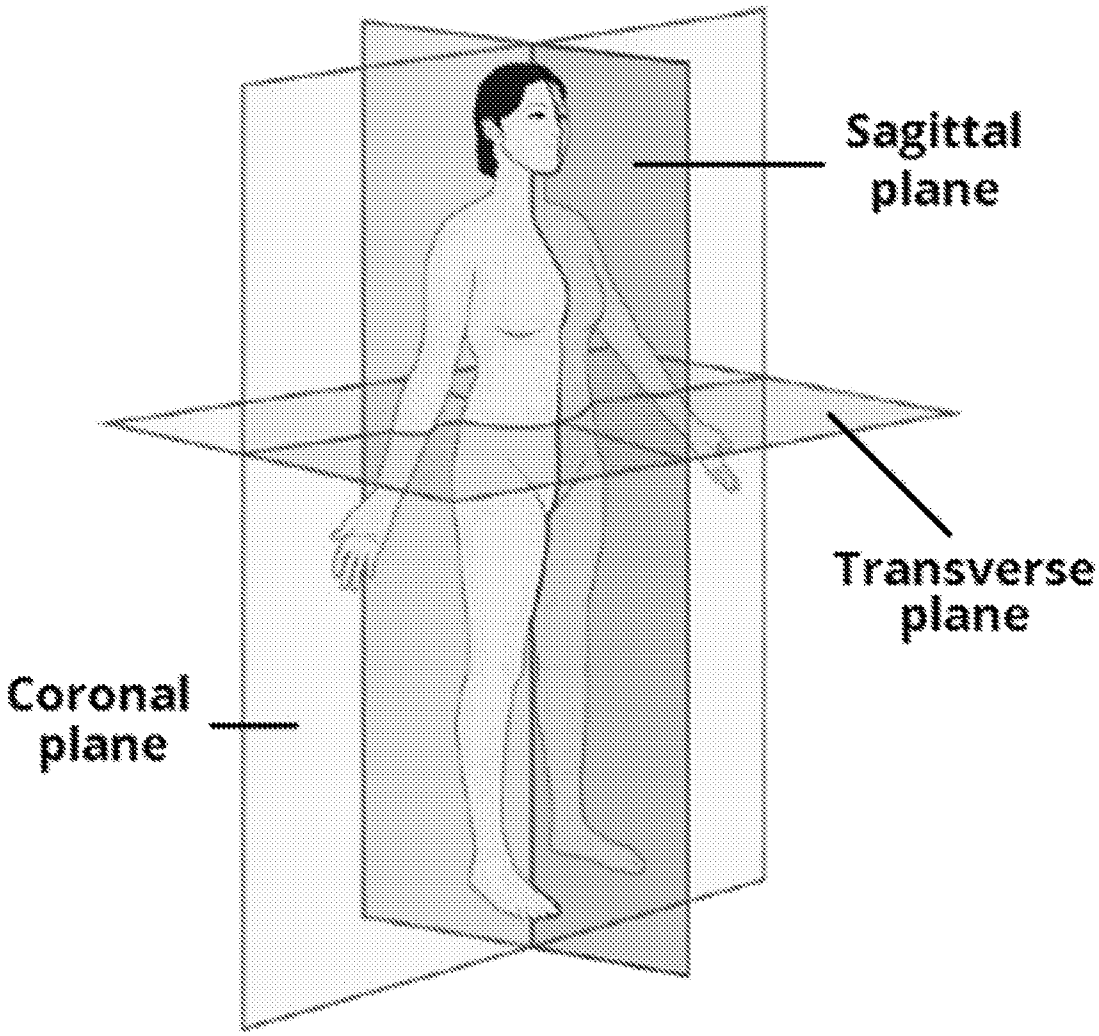
FIG. 13A is a schematic diagram showing a transverse plane, a coronal plane, and a sagittal plane relative to the user corresponding to the graphical data presented in FIGS. 14-14C, according to some embodiments.

FIG. 13A illustrates the nomenclature used to describe certain planes relative to the body of a user in the discussion below of FIGS. 13B-13D. In FIG. 13A, the plane that is coplanar to the plane of user-contacting surface of the support cells when bladders are fully inflated is referred to as the coronal plane. While there is no translation or rotation about the coronal plane per se, the relative height of the bladders of the various cells making up the support surface in response to translational and rotational adjustments made in the other two planes about their axes (as explained below), as described and illustrated elsewhere herein, result in a pressure/height topography over the coronal plane that can be displayed and/or recorded, for example to confirm compliance with therapy/patient management protocols dictated for particular indications for particular patient/users. The transverse plane transects the body of the user laterally, while the sagittal plane (or equivalently the craniocaudal plane) transects the body of the user longitudinally (i.e. in the head-to-toe direction). Adjustments to the user position tending to rotate the body laterally (e.g. from a back-sleeping/stomach-sleeping position to/from a side sleeping position) involve rotation in the transverse plane about an axis parallel to the sagittal (craniocaudal) plane (see FIGS. 13B and 13C). Head-to-toe position adjustments (e.g. elevating head with respect to toe or vice versa) involve rotation in the sagittal plane about an axis parallel to the transverse plane (FIG. 13D).

Figure 13B:
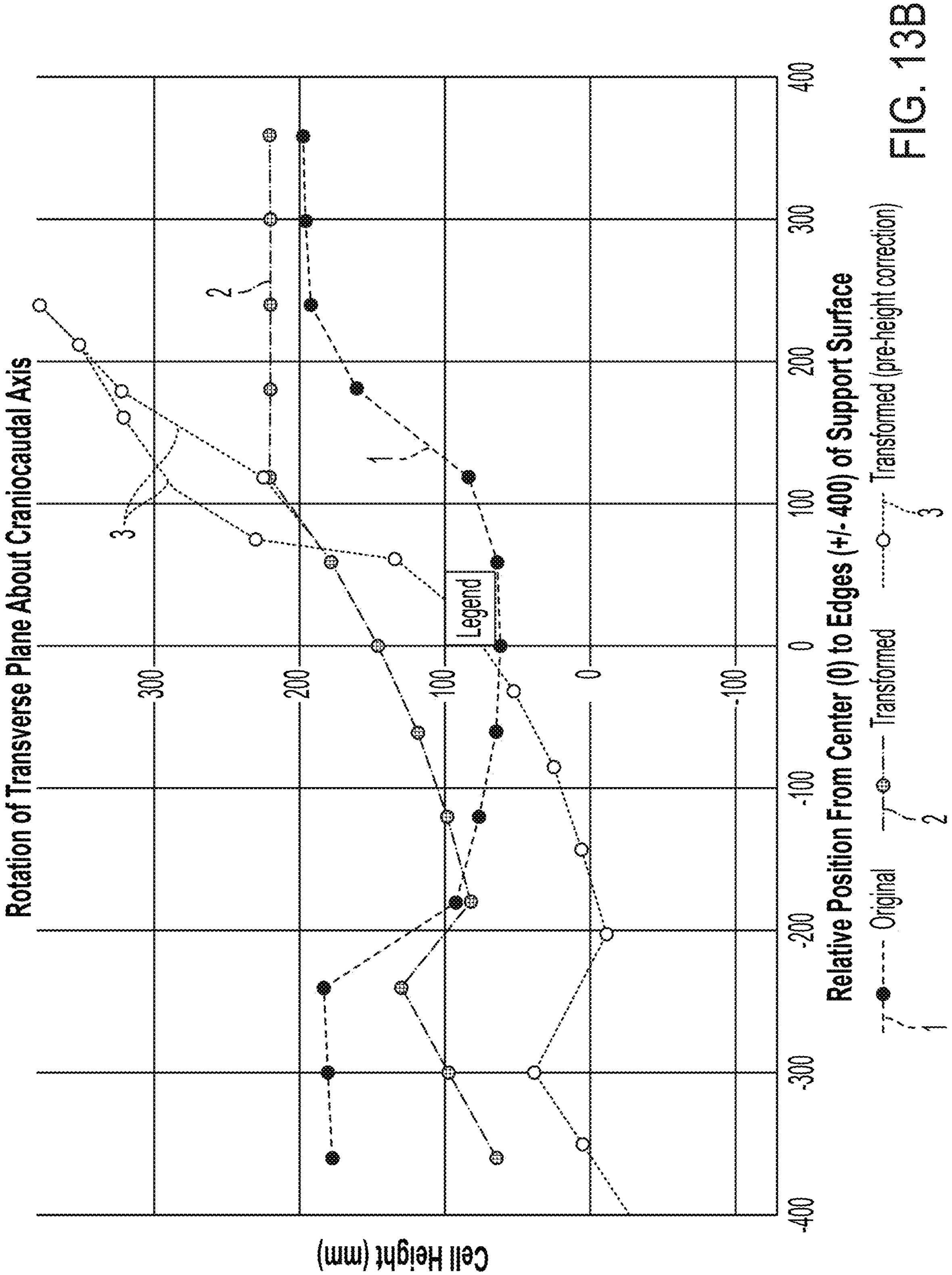
FIGS. 13B-13D are graphs depicting bladder height contours for rows of cells comprising cross-sections of the overall support surface taken in the transverse plane (FIGS. 13B and 13C) or sagittal plane (FIG. 13D) depicting the result of the application of mathematical transforms used to modify an increment of height in one or more cells, according to some embodiments.
Figure 13C:
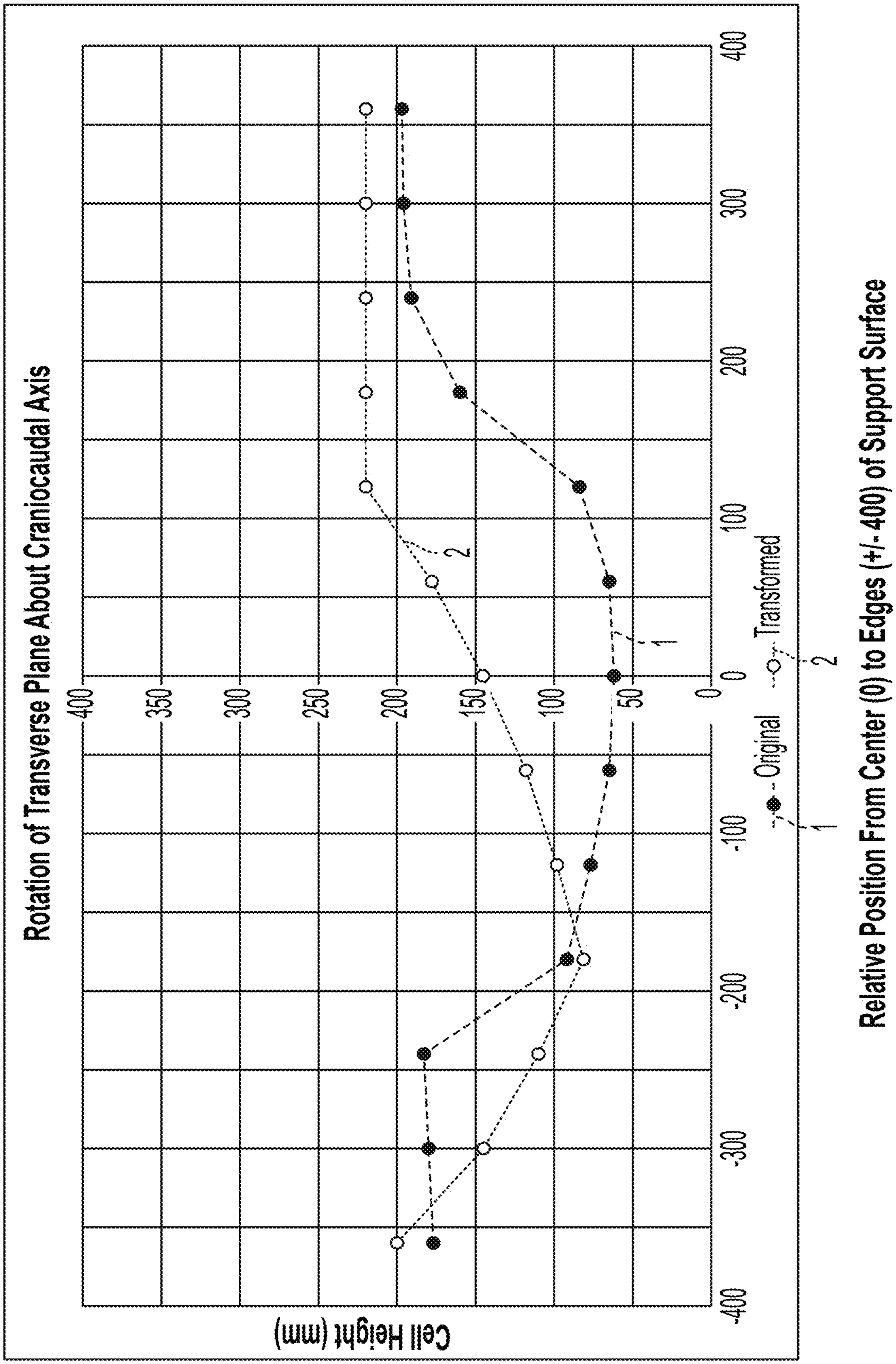
Figure 13D:
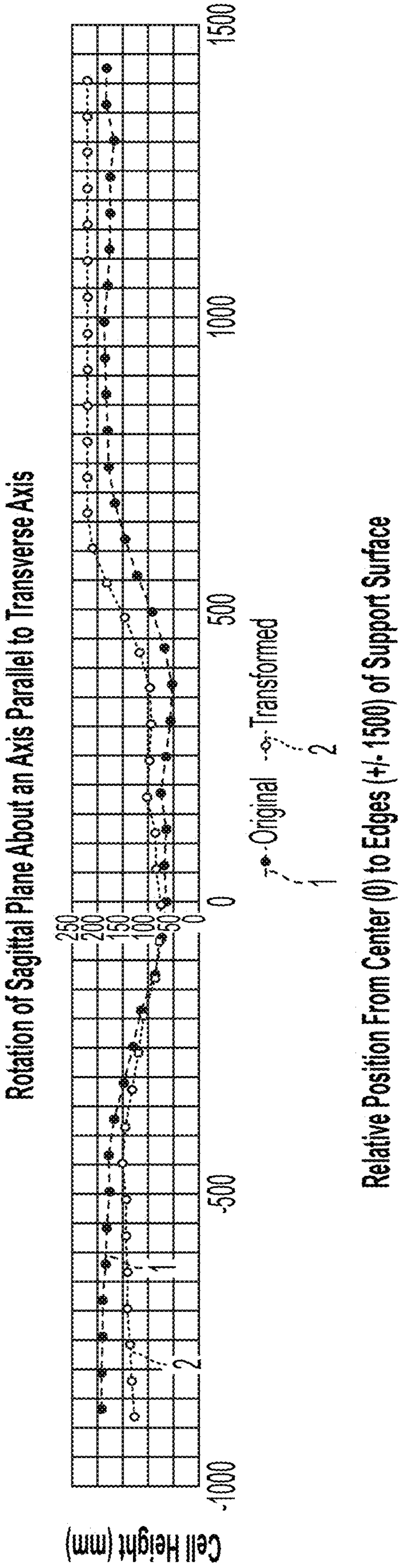
Figure 13E:
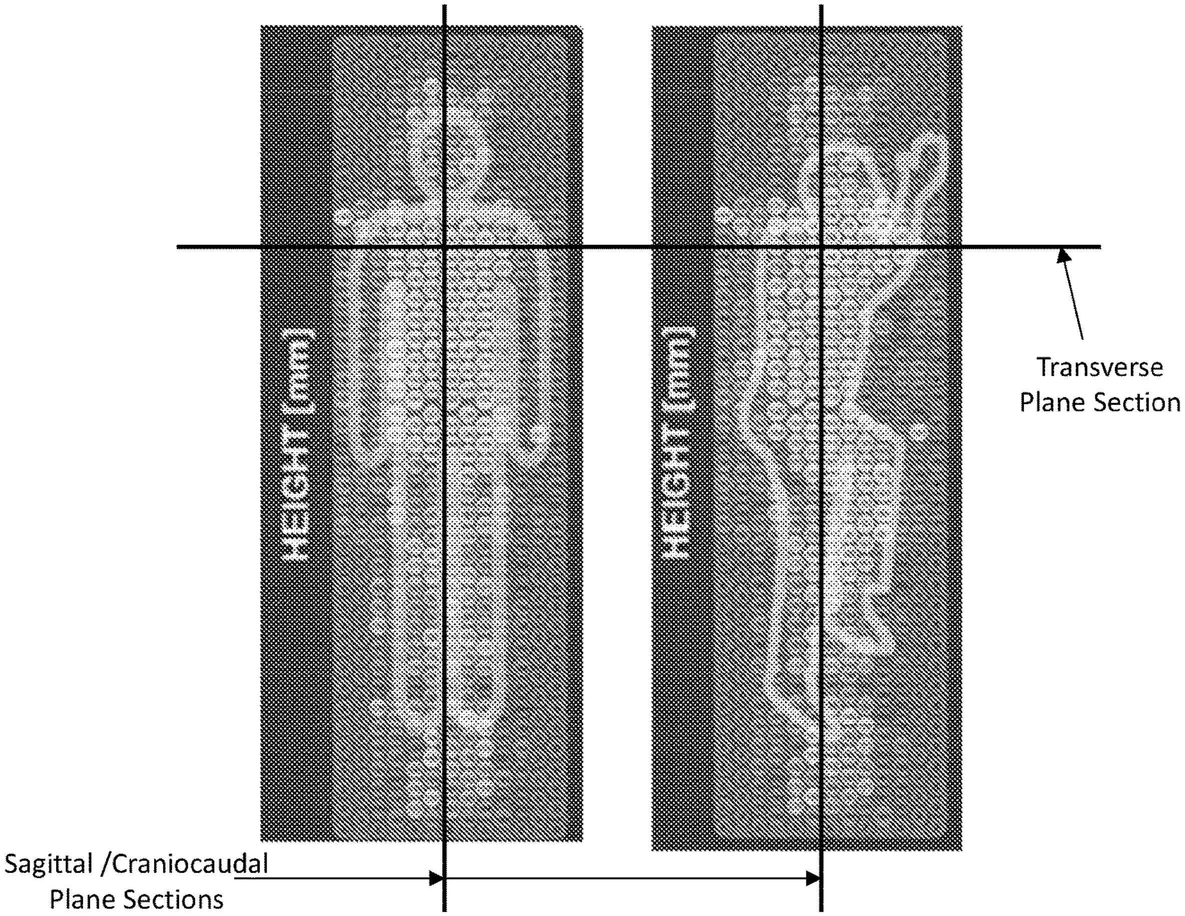
FIG. 13E depicts a cell height map view of the coronal plane of a support surface depicted by an embodiment of a display associated with an embodiment of the control/display system with an overlay showing a transverse plan section and a sagittal/craniocaudal plane section for use in explaining the graphs of FIGS. 13B-13D.

An exemplary depiction of such a control scheme is illustrated in FIGS. 13B-13D, which show, for a given transverse or sagittal plane section (see FIG. 13E) plots of the relative position from the center point of the support surface to the edge of the support surface (x-axis) versus the bladder height of the cells as measured by height sensors within or associated with the cells (y-axis).

FIG. 13B is a plot of the bladder heights of a row of cells of the support surface, for a section taken in the transverse plane, which defines a partial outline of the user in the transverse plane at a specific position along the craniocaudal axis. The control system may measure and record bladder heights and pressures for multiple such transverse sections along the craniocaudal axis to describe a form capture to "cradle" the user. For example, other cell height/pressures could be measured and recorded to capture a partial outline of the user in other transverse plane sections along the axis parallel to the sagittal plane to build an overall topographical map of the surface with respect to the coronal plane (i.e. the reading produced of the outline of the user's body for all of the displayed bladder height readings of the cells).

Figure 14:
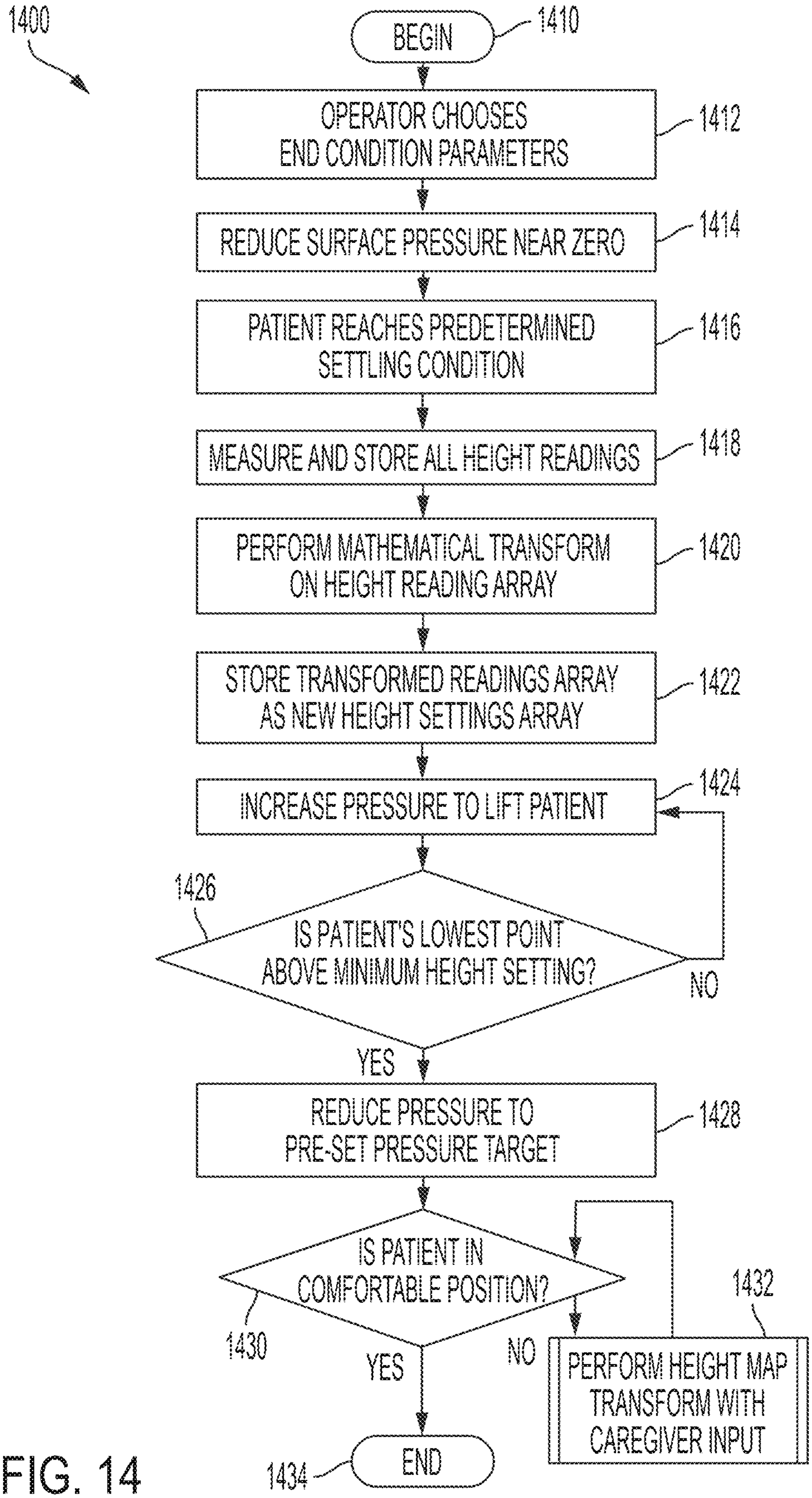
FIG. 14 is a flowchart describing a controller-mediated control algorithm for controlling immersion of a user by adjusting the height by applying by a mathematical transformation to achieve a user or operator selected support profile or objective, according to one set of embodiments.

FIGS. 13B-13D also illustrate the application of a mathematical transform employing (at least in part) a trigonometric function that adds or subtracts an increment of height to the bladder(s) of the cells, based upon their position, to maintain the partial outline of the controller-recorded transverse plane (FIG. 13B and FIG. 13C) or the sagittal plane (FIG. 13D) of the user during position adjustment dictated by the mathematical transform. In some such embodiments, the partial outline can be rotated, thereby adjusting the position of the user and changing the effective angle of the user. For example, referring to FIGS. 13B and 13C, a mathematical transform is depicted that results in maintaining a similar relative lateral immersion profile and lateral pressure distribution while rotating the user in a counter-clockwise direction toward more of a side sleeping position (lines 2 and 3) from an initial back sleeping position (line 1). FIG. 14 below and the associated description describe one control scheme for making such adjustments using mathematical transform(s) of initial bladder height-pressure-position data.

FIG. 13C depicts a situation where a user is initially positioned with her weight relatively evenly distributed in the transverse plane about the centerline of the support surface, the centerline being an axis of rotation parallel to the sagittal plane (trace 1). An operator then selects (e.g. via a GUI) a manipulation to rotate the user towards her left side (e.g. by about 25 degrees). Following a programmed algorithm employing a mathematical transform (e.g., see FIG. 14 and associated description below), the control system determines (using one or more mathematical functions such as additive, trigonometric, etc. or combinations of such functions) for each row of cells (defining transverse planes) along the sagittal axis, the height of each cell bladder that will cause the desired rotation while maintaining to the extent possible (see description of FIG. 13B below) the same distribution of support on the body of the user. In the example depicted in FIG. 13C, after the calculation and adjustment is completed, the resulting cell bladder height versus position trace is as shown by trace 2.

In certain cases, a desired manipulation may result in certain cells having a bladder height after application of the mathematical transform that is beyond a control or safety set point (e.g. zero or negative height or a height exceeding the height of maximum inflation of the bladder). In certain embodiments, the control system may be programmed to recognize when such a condition has occurred and to apply an additive or subtractive correction to any cells whose transformed bladder height would be outside the operating range to assure limits of travel are not exceeded. For example, the algorithm of FIG. 14 includes such a correction in step 1428 (which depicts a minimum height check/adjustment but could just as readily be applied to a maximum height deviation, although in the event of a post-adjustment height/pressure calculated by the transform exceeding maximum limits, it is advantageous to program the controller to flag such condition at step 22 in FIG. 14 and to utilize a correction process (e.g. by subtracting a height sufficient to prevent over inflation and possible damage to implicated bladder(s)) prior to pressurization in step 24. FIG. 13 depicts a similar manipulation as depicted in FIG. 13C, except that the operator selected adjustment results in a transformed set of bladder heights that would cause the user to "bottom out" on her left side (trace 2—see zero and negative height values) and to require a bladder height supporting her right side that would exceed the maximum operating height (225 mm) (trace 3). In this situation, the control system has superimposed additive (left side) and subtractive (right side) transforms that result in a trace 2 that achieves the desired manipulation to the extent possible within the design limits of travel of the bladders.

FIG. 13D depicts a similar manipulative transform for adjusting the position of the user in the sagittal plane via rotation about an axis of rotation (transverse axis) parallel to the transverse plane. In this case, the user is manipulated to angle her with higher head and lower feet position that for her original position, while otherwise maintaining a similar overall distribution of support pressure. Combinations of manipulations about both the transverse and sagittal axes simultaneously are also possible to permit, in aggregate, the ability of the control system to accommodate complex movements and rotations about axes of rotation that are not strictly parallel to either the transverse or sagittal plane.

The control system thus may be programmed to effect a "hands-free" repositioning and/or rotation of the user's body, useful as part of the care plan to unload various body parts in order to promote good tissue health and/or blood perfusion. The rotation of different cross-sections does not need to be the same. For example, in certain embodiments, the manipulation may rotate the upper torso more than the leg section. These and similar manipulations could be applied to the original coronal plane height/depth control setpoints for purposes other than unloading, such as providing better comfort by adapting to patient position preferences. In general, from an "original" measured bladder height, target bladder heights may be calculated, and corresponding pressure to the cells applied, to achieve a "transformed" bladder height to provide a more uniform or other desired profile of immersion, a patient-specific off-loading or a movement/repositioning of the patient, etc.

In some cases, mathematical transforms can be applied uniformly or to a chosen plane to cause the user's position to be adjusted in any desired plane or around a chosen axis of rotation. The mathematical transform may be applied to the entire length or width of the patient or applied only to sections of the surface. Sections may be defined horizontally across the surface or vertically or a combination thereof.

FIG. 14 shows a flowchart 1400 of an exemplary control algorithm executed by a controller implementing the above-described immersion control strategy using a mathematical transform of a form capture. In step 1410, the controller initializes, e.g., at prompt of an operator. In step 1412, the operator chooses an end condition parameter, e.g. a desired degree of immersion and/or final position of the user and/or cell-specific bladder height-pressure topographical surface map, etc. In step 1414, the controller reduces the surface pressure, e.g., near zero. In step 1416, the user (e.g., a patient) reaches a predetermined settling condition (e.g., a minimum operating pressure or reference point or a maximum operating pressure or reference point). In step 1418, the controller measures and stores the bladder height for at least some of the cells (e.g., all the cells). In step 1420, a mathematical transformation on the measured bladder heights and/or pressures is performed by the controller, e.g. as described above in the context of FIGS. 13B-13E. In step 1422, the controller stores the transformed bladder heights and/or pressures and generates a new set of bladder heights and/or pressures based on the mathematical transformation. In step 1424, the controller increases (or decreases as appropriate) the pressure of the cells to lift (or reduce height of as appropriate) the patient to achieve the transformed bladder height/pressure setpoints for the cells. In certain embodiments additional adjustment and optimization steps 1426-1432 may be performed. In step 1426, the controller can verify that the user is at a height at or above the minimum set height (e.g., as selected in step 1414) and, if not, repeat step 1424. If the minimum height measured in step 1426 is above the minimum set height (e.g., by a set or user-defined degree), in step 1428, the pressures can be reduced to, for example, the pre-set pressures to achieve the transformed height/pressure setpoints. In step 1430, the comfort of the user can be accessed via, for example a query to the user via the GUI and or a determination based on changes in the user's position indicative of discomfort (e.g., as determined from input from the user or the operator). If discomfort or distress is indicated, in step 1432, the existing height/pressure mathematical transform may, optionally, be recalibrated/redetermined by returning to step 1410 or a new height/pressure mathematical transform may be applied.

Figure 15:
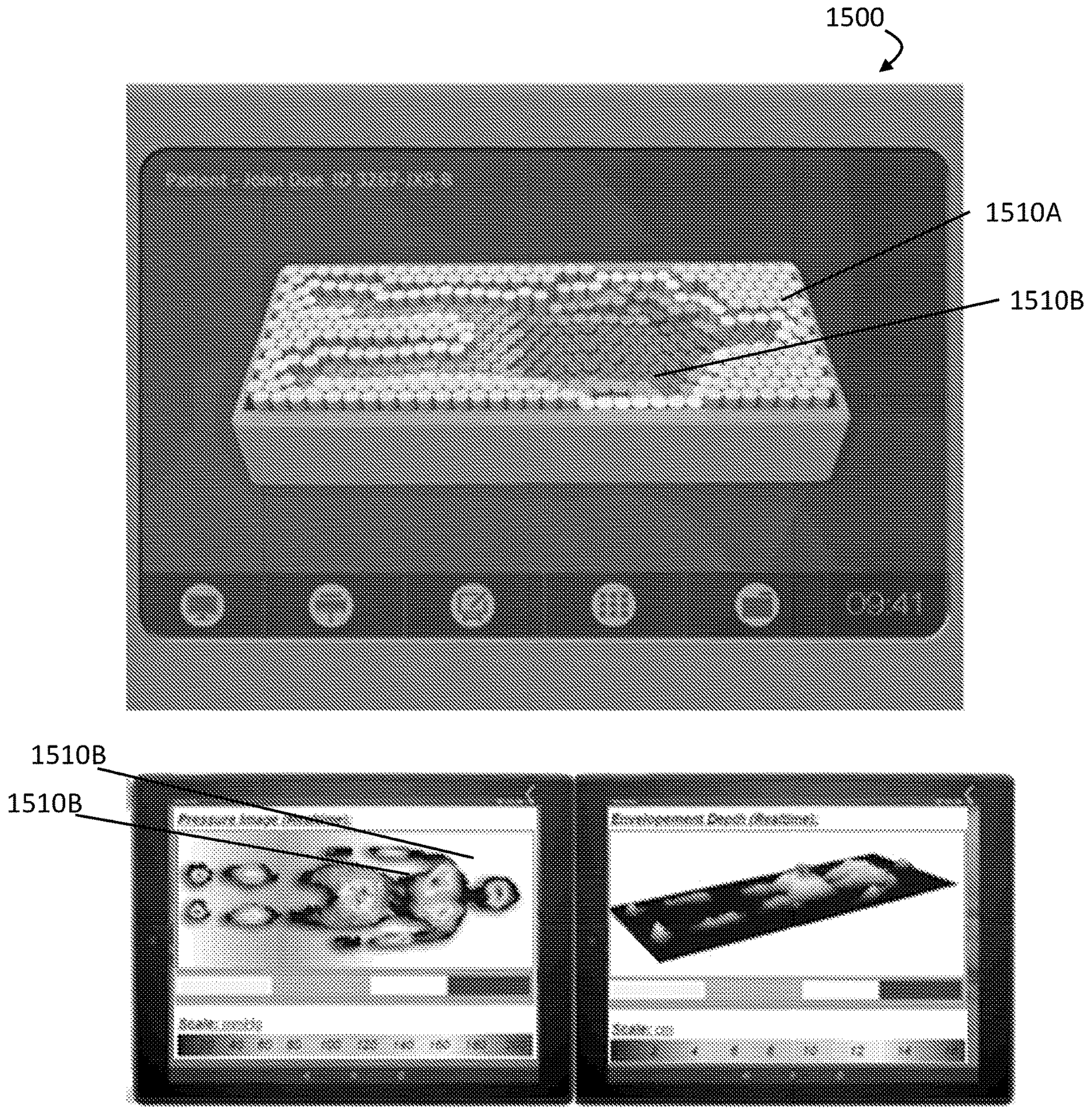
FIG. 15 is an image of a display illustrating three variations of providing a body support topology map of the support surface of a support device showing the heights and pressures of each cell of the plurality of cells making up the support surface, according to one embodiment.

For some embodiments, a controller in electronic communication and operatively associated with each of the cells within a plurality of cells, or all of cells, of a support device can comprise a processor configured and programmed to measure, record, display, and/or control the body support surface topology formed by the top surface of the bladders of the plurality of cells. For example, FIG. 15 schematically depicts a GUI 1500 of a controller configured and programmed to display three different views of color-coded pressure and height maps of the overall support surface representing the body support topology. Cells 1510A and 1510B are at different heights and could be at different pressures as well and are represented in the top display at different heights and colors, which could represent pressure levels or immersion depths). The bottom left display shows the data translated into a pressure map displaying the distribution of TIP applied to the body of the user, while the bottom right view displays the topographical mapping of the immersion depth. The processor can also be programmed to store and/or transmit such data in real time for particular patients facilitating medical record keeping and conformance to care standards. The top portion of bladders of the cells of a support device can collectively define the surface topology. That is to say, in some embodiments, a body support surface topology of the plurality of cells is defined, collectively, by the height of the top surface of the bladders of each of the cells of the plurality of cells. The body support surface topology can be used, for example, to monitor a tissue-interface pressure and overall spatially representative distribution of TIP and body immersion depth into the support surface, in certain embodiments.

The bladders of cells of a support device can have a variety of sizes. For example, in some embodiments bladder has a cross-sectional diameter of at least 25 mm, 50 mm or about 100 mm or more. In one specific embodiment, the bladder has a cross-sectional diameter of 65 mm. In some embodiments the bladder has a maximum height of at least 5 cm, 10 cm, 20 cm, 30 cm, and in some cases about 50 cm or more. The bladder can also have a conical or tapered shape, e.g. as shown in FIG. 2C. The bladder dimensions above and described in further detail below are suitable generally but particularly for embodiments of support cells utilizing rolling diaphragms. For other embodiments using inflatable bladder supports that are not in the form of a rolling diaphragm—or embodiments of support devices that may include rolling diaphragm cells but may also include areas or sections with non-rolling air chambers, such non-rolling air chambers or diaphragms may be typically larger than the rolling diaphragm bladders; for example 120 cm×20 cm×15 cm in an exemplary embodiment.

Referring back to FIGS. 2A-2D, in one embodiment, the bladder 210 may have a cross-sectional width 202 of about 50 mm, so that 800 bladders in an array of 20×40 bladders would have a surface about 40 inches wide and 80 inches long, similar to a conventional mattress. Other sizes of bladders are also possible, and different sizes of bladders may be placed in the same array. In one mounting system, the bladder 210 may be formed to taper to a cross section width 203 at its mouth that is smaller than the width 202 of the main portion of the bladder and may have a collar region 207 with a rim 201*a* for mounting to a post 219 of the base 220. The support device can comprise one or more sections where each section can comprise a plurality of bladders where a bladder material and/or size and/or shape varies from one section to a second, different section. In some embodiments, each of the plurality of cells can comprise a post 219 configured and sized to support and form a seal with the collar region of the bladder. The post can comprise a lumen 225 in fluid communication with its respective bladder. The post and base generally can be constructed of any suitable structural material such as aluminum, a plastic; a metal (different from aluminum); ceramic; wood; and combinations of these.

Each of the plurality of posts of the base can comprise an indent region 201*b* for forming a pressure-tight seal (e.g. via an O-ring such as O-rings 201 of FIG. 2A), which may also be shaped and configured to initiate rolling of the rolling diaphragm portion 230 of its respective bladder. The indent region 201 can one or more notches such that the rolling diaphragm portion of its respective bladder rests in the one or more notches and can be secured to the indent region 201*b* via, for example, an O-ring(s).

The diameter 202 of bladder 210 in certain embodiments can range from about 1 cm to about 15 cm, for example approximately 6 cm. The wall thickness of bladder 210 can range in certain embodiments from about 250 microns to about 2 mm, depending on the material of construction and anticipated pressure and load. Bladder wall thickness and material can be selected such that bladder 210 does not buckle, collapse, spontaneously inflate and blow up and/or prevent or otherwise hinder rolling at low pressures. The functional length of bladder 210 can in some embodiments range from approximately 5 cm to 50 cm, for example approximately 15 cm. The burst pressure of bladder 210 can be greater than approximately 80 mmHg, for example greater than approximately 300 mmHg. The operating strain of bladder 210 at rolling diaphragm portion 211 can range from approximately 5% to 100%, for example approximately 30%.

Bladder 210 can comprise a conical shape, for example as shown in FIG. 2C, with the cone expanding upwards, for example where bladder 210 comprises taper 212 configured to limit, e.g. reduce or eliminate, the interference between the rolled and unrolled portion of bladder 210. In some embodiments, the diameter 202 of the upper portion of bladder 210 can be greater than the diameter of a lower portion of bladder 210 so as to create a taper ranging from approximately 0.2 degrees to 5.0 degrees, for example a taper of approximately 1.0 degree. Bladder 210 can comprise various cross-sectional shapes including but not limited to: round; oval; square; rectangular; trapezoidal; polygonal; and combinations of these. The size, shape and material of bladders 210 can vary from section to section and/or can vary from cell to cell, for example so as to vary the performance characteristics of support device or to reduce or increase the number of bladders per unit area, for example to create individual areas, zones or containment of other zones of bladders. Bladder 210 may be attached to post 219 via one or more O-rings (such as O-rings 201) that surround bladder 210 at rim portion 201*a* and rest in notches 201*b* of post 219. In certain embodiments, bladder 210 can roll between approximately the fully inflated height to at least half of the total length of the inflated bladder during normal support modes of operation (as opposed to control at reduced heights for bedpan placement etc. as described above. In some embodiments, the total length of bladder 210 can include an additional excess length (e.g. 1 cm to 3 cm) to reduce the tension placed upon bladder 210 when bladder 210 has traveled its maximum distance, i.e. at full compression.

As described above and elsewhere herein, each cell of the plurality of cells can comprise a bladder (i.e. at least one bladder). The bladder is configured to contain and be inflatable by a compressible fluid, such as air. The bladder can be configured to attach and form a pressure-tight seal with a support base and configured to form a rolling diaphragm portion such that the rolling diaphragm portion can roll along the base decreasing the volume and the height of the bladder, when a force is applied to the bladder. The bladder can roll over a range of motion. For example, the bladder may have a maximum inflatable volume, and the height of the top of the bladder measured above the top of the support base may define its maximum range of motion, while the height when the bladder is fully deflated may define the minimum range of motion. In some embodiments, the bladder will have a maximum range of motion as just described, while having a second range of motion within the maximum range of motion when operating in a user body support mode (as opposed to a deflated or depressed clearance mode). In some embodiments, a height sensor is configured to measure the height of the bladder over a majority of its range of motion, and in some cases, over most or over its full range of motion.

In some embodiments, while rolling along the base, the width or a diameter of a bladder can stay substantially constant. Accordingly, in some embodiments, the bladder has a width of at least about 1 cm to about 15 cm, for example approximately 6 cm. In a specific embodiment, the bladder has a width of 65 mm. In some embodiments, the bladder has a width or a diameter no greater than 15 cm, no greater than 12 cm, no greater than 10 cm, no greater than 8 cm, no greater than 7 cm, no greater than 6 cm, no greater than 5 cm, no greater than 4 cm, no greater than 3 cm, or no greater than 2 cm. In some embodiments, the width or diameter of a bladder is at least 1 cm, at least 2 cm, at least 3 cm, at least 4 cm, at least 5 cm, at least 6 cm, at least 7 cm, at least 8 cm, at least 10 cm, or at least 12 cm. Combinations of the above referenced-ranges are also possible (e.g., at least 4 cm and no greater than 8 cm). Other ranges are possible.

Bladders can be formed of a variety of deformable materials. For example, a bladder can be made from materials such as, but not limited to various flexible and substantially fluid impermeable material like rubbers and various polymeric materials (e.g., plastic materials). One or more of the plurality of bladders can also comprise a lubricious material coating or incorporated into the bladder material to reduce rolling friction. In some embodiments, a portion of or the entirety of an internal and/or external surface of a bladder may comprise such coating. For example, an inner and/or outer surface of the bladder may comprise a PTFE (polytetrafluoroethylene) coating so that the bladder does not stick upon deflation and re-inflation. Other non-limiting examples of bladder coatings include other, non-PTFE, fluoropolymers, silicone polymers, sol-gels, oils and greases, certain ceramic coatings, etc.

One or more of the plurality of bladders can comprise a material selected from the group consisting of: rubber; plastic; non-latex elastomer such as neoprene or urethane; polyethylene film; polypropylene blends; silicone; urethane laminates; latex laminates; and combinations of these. In some embodiments, the bladder comprises a fabric coated with or molded to an elastomer. In such embodiments, the elastomer can be a natural rubber or a synthetic compound, and may, for example be between approximately shore 30-90 D in hardiness as measured by a durometer. The fabric can be a cotton, polyester (e.g., polyethylene, KEVLAR®). In certain embodiment, the bladder is made from an elastomer, such as neoprene, with a cotton embedded fabric. In some embodiments, the bladder is made from latex, synthetic rubber, and/or a block copolymer. Other materials for the bladder are possible.

The following describes one example of a bladder suitable for at least certain embodiments of the support cells and devices described and associated performance data. This example embodiment is intended to illustrate a useful rolling diaphragm configuration and materials for certain embodiments but does not exemplify the full scope of the bladders potentially suitable for practicing the disclosure. The following example embodiment demonstrates that bladders (e.g., bladders of a cell) can be made by from various elastomer materials using a blow-molding or a dipping process.

Figure 16:
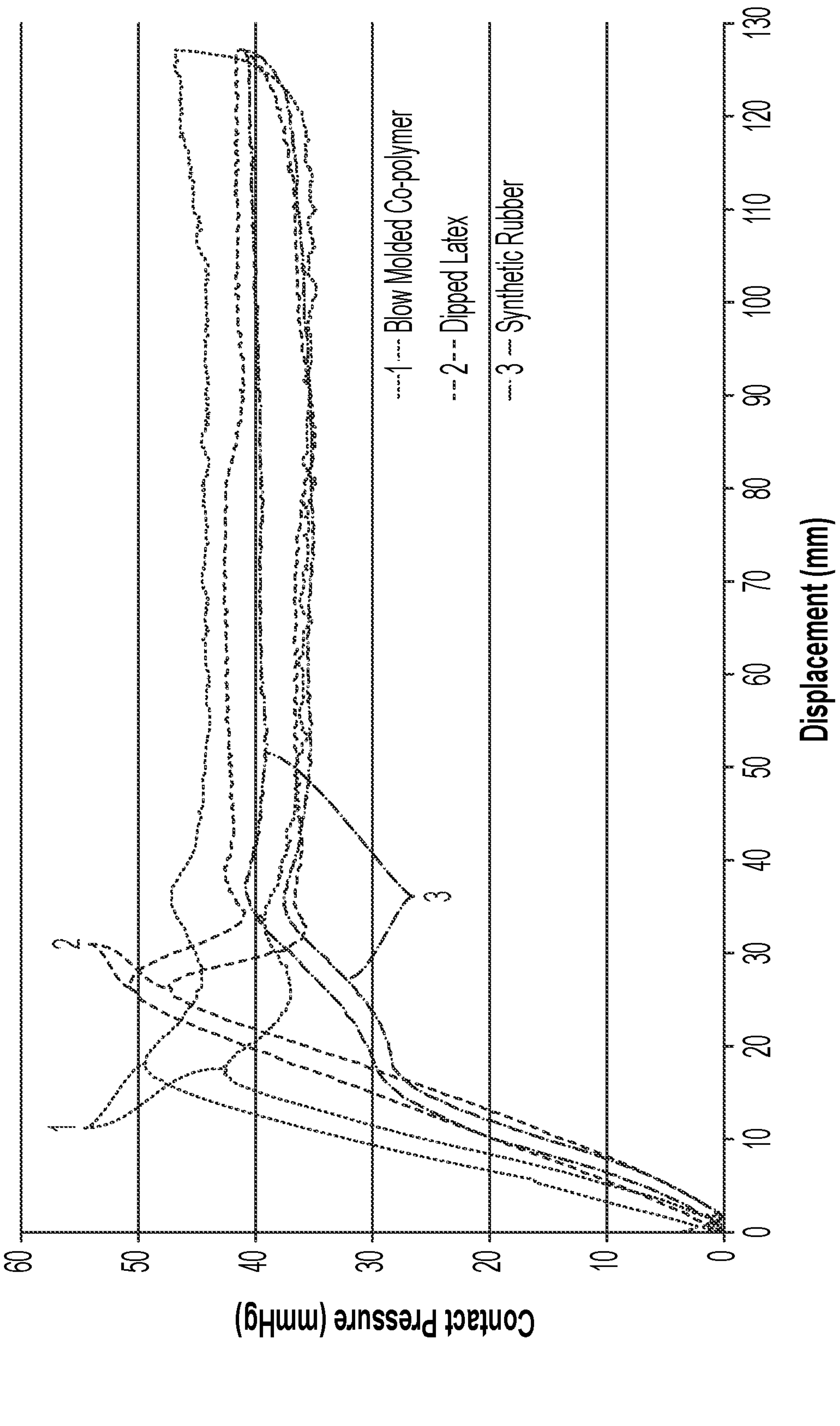
FIG. 16 shows a plot of contact pressure vs. displacement of several cells comprising different materials, according to one set of embodiments.

It has been recognized and appreciated within the context of the present disclosure that the performance of a cell can be improved when rolling friction is reduced or minimized. In some embodiments, the material of the bladder can be selected to reduce rolling friction of the cells (e.g., with respect to adjacent bladders of a cell or bladders of adjacent cells, between the bladder and the base, etc.). For example, in FIG. 16, bladders of cells, such as cell 200 illustrated in FIG. 2D, made with latex formed via a dipping process are compared to bladders made of synthetic rubber formed by a dipping process and with blow-molded polyolefin bladders. While the diaphragms used to produce the data of FIG. 16 have slightly different geometries, the ability of each diaphragm to maintain a reasonably consistent contact pressure over a nearly full range of displacement demonstrate the of diaphragms made from a variety of materials—e.g. latex rubber, synthetic rubber, and polyolefins—using different fabrication techniques—e.g. dip molding and blow molding—are able to achieve desirable functional characteristics of certain embodiments of the support cells and devices disclosed.

Figure 17:
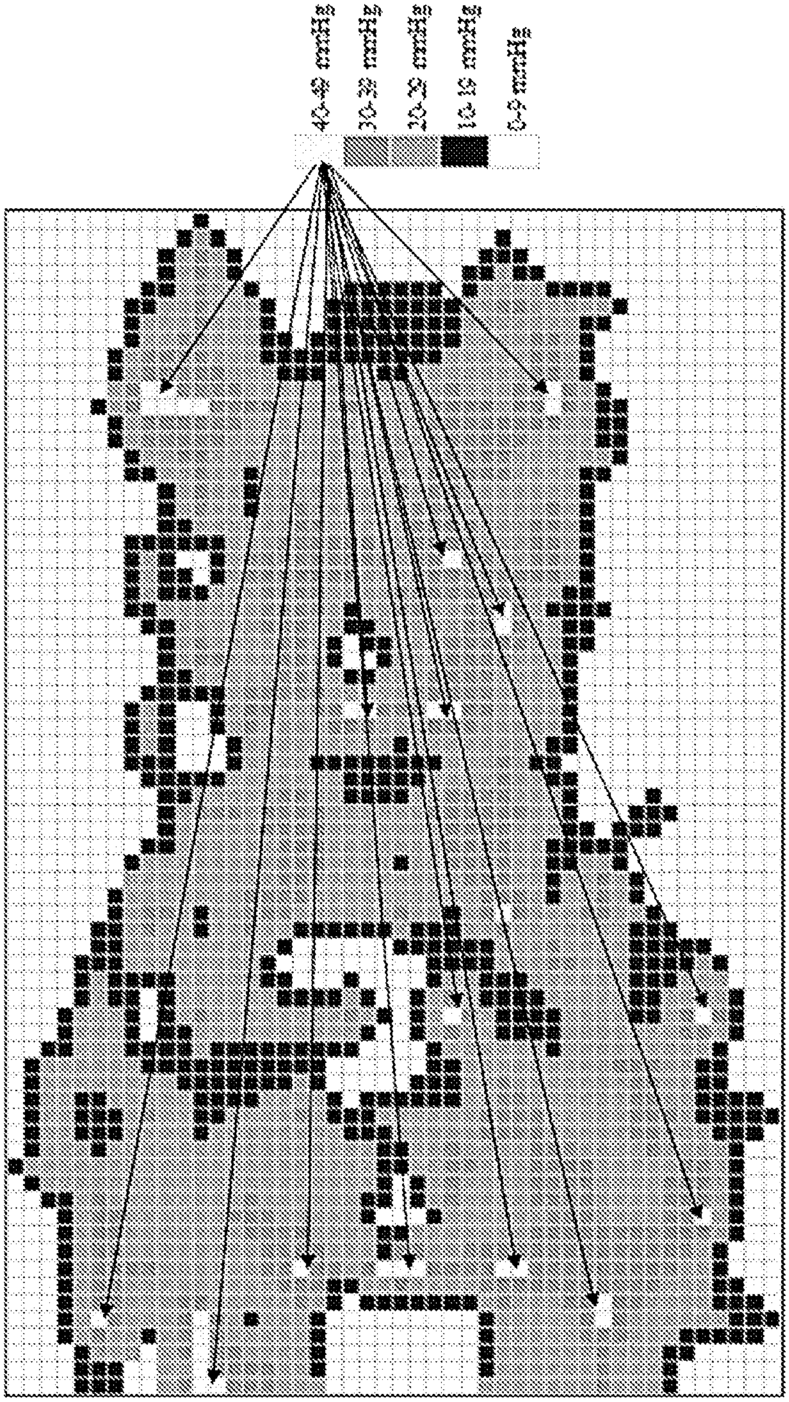
FIG. 17 shows a pressure distribution map for a patient laying on a dipped synthetic rubber rolling diaphragm support surface, according to one set of embodiments.

For example, the synthetic rubber-dipped cell was found to advantageously exhibit very low resistance to rolling friction. Therefore, the contact pressures for loading and unloading are more similar, and the initial peak that is typically observed as rolling is initiated is minimized. FIG. 17 shows the pressure map for a patient lying on his back on a multi-cell support surface with cells having bladders comprising dip-molded rolling diaphragms made from synthetic rubber.

It can be concluded that there are many satisfactory materials and geometric options available to optimize performance and economic considerations for support surfaces described herein. Ultimately, choice of materials, fabrication methods, and/or geometry and other design parameters for the ideal surface will depend on the particular applications in question and the associated clinical needs, functional requirements, and cost and durability objectives.

A bladder may be of a particular thickness, which will depend, as would be understood by persons skilled in the art, upon the strength, elastic and/or bending modulus, and/or burst resistance of the material(s) from which the bladder is constructed. As would be understood, the thickness of the bladder should be selected to enable sufficient deformability for smooth operation and user comfort while being able to withstand inflation pressures and applied forces during operation. The thickness of bladder refers to the thickness of a wall forming the bladder itself. As discussed above, in some embodiments, the thickness of the bladder at least 250 microns, at least 500 microns, at least 1 mm, at least 1.2 mm, or at least 2 mm. In some embodiments, the thickness of the bladder is no greater than 2 mm, no greater than 1.2 mm, no greater than 1 mm, no greater than 500 microns, or no greater than 250 microns. Combinations of the above-reference ranges are also possible (e.g., at least 250 microns and no greater than 1 mm). Other ranges are possible.

As mentioned, the support base and the bladder(s) of a cell can be attached to one and other to form a seal. Preferably, the attachment and bladder and support base design result in the formation of a rolling diaphragm. The base can form a fluid-tight seal with the bladder such that a fluid (e.g., a compressible fluid) does not unduly leak through the seal. The seal may be formed in a variety of conventional ways including through the use of O-rings as described above, adhesives, stretching of the bladder base opening over a larger diameter post of the support base, compression collars, and the like or any combination of such. As described above and elsewhere herein, in embodiments including a rolling diaphragm design, the rolling diaphragm (e.g., a rolling diaphragm portion) is configured to roll along the base as the volume and height of the bladder id decreased, e.g., when a force is applied to the bladder, for example, a force from the body of the user or an external operator creating a height control set point as described previously.

Although a rolling diaphragm can be utilized in some preferred embodiments and provides a number of advantages as described herein, in other embodiments, inflatable bladders, which may be vertically or horizontally oriented within the support device, that are not of a rolling diaphragm type and which in some cases do not include a support base associated with individual bladders or small groups of bladders as described elsewhere herein, could be used, or a mix of rolling and non-rolling bladder types could be used in a single support device, with rolling diaphragm cells used in areas where a higher degree of control of TPI is desired, and non-rolling bladders used in less critical areas—e.g. around the periphery of the support. That is say, in some embodiments, the support device may lack a rolling diaphragm configuration while still benefiting from other components and features presently disclosed. Those of ordinary skill in the art will be capable of arranging cells and other bladder configurations and can combine these configurations with any of the inventive components described herein.

Figure 18:
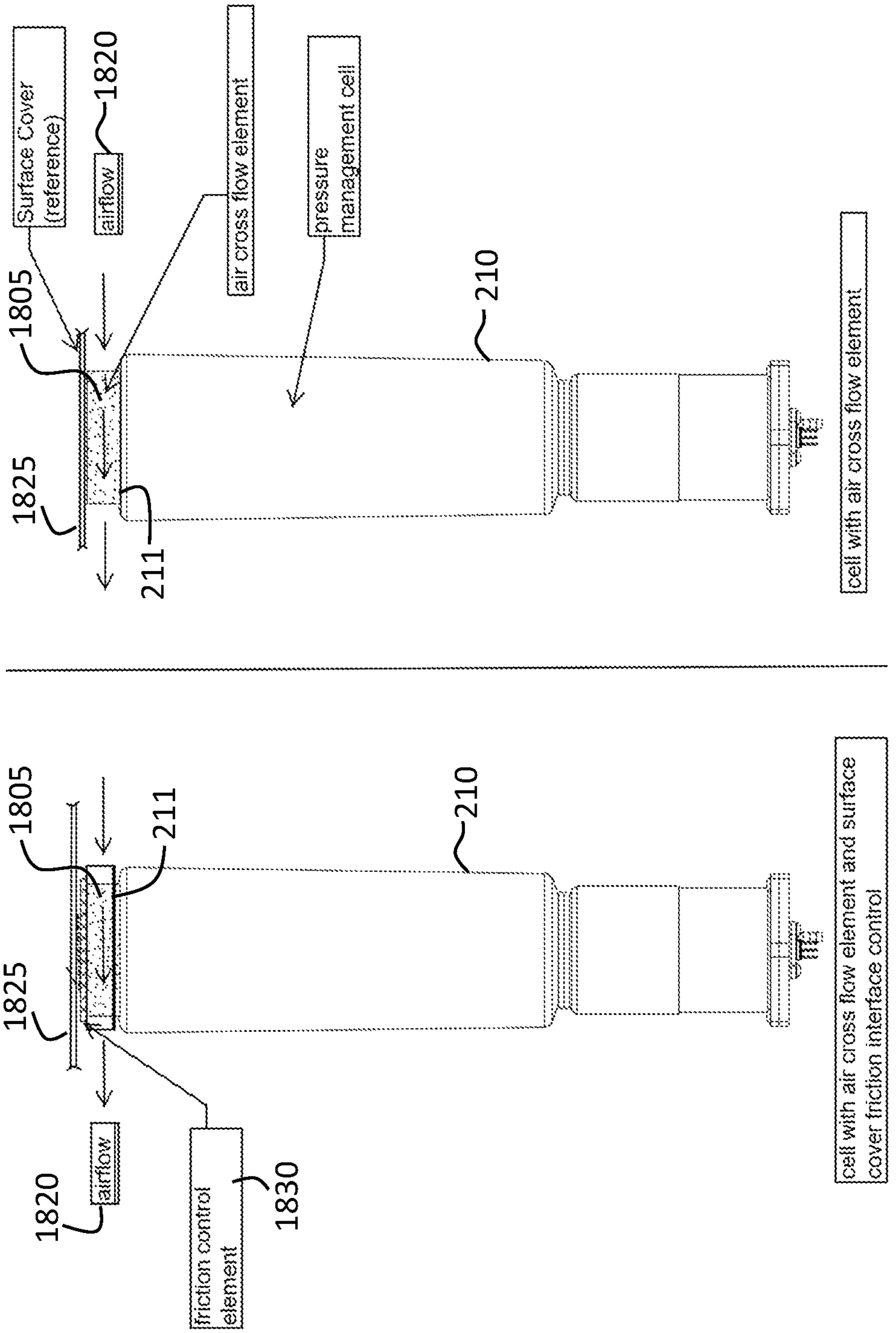
FIG. 18 is a schematic of a cell embodiment configured to facilitate air flow adjacent the bladder in a space between the top of the bladder and the patient contact surface to facilitate ventilation and control the temperature of the patient-cell interface, according to some embodiments.

In some embodiments, bladders may be designed and/or used in combination with a surface cover to facilitate ventilation, for example to assist in control of the temperature of a support device or the surface in contact with a user. In certain cases, instead of a diaphragm being entirely constructed from a gas impermeable material, all or a portion (e.g., a top surface) may be gas permeable so air used to inflate the bladder is able to exit the bladder in such areas to provide ventilation. In another embodiment, e.g., as shown in FIG. 18, a fluid-tight bladder 210 is used, but the top 211 of the bladder is mated with an air porous spacer 1805, which may for example be constructed from an open cell foam material, to facilitate airflow 1820 between the top 211 of bladder 210 and a surface cover 1825 in contact with the user's body. In some such embodiments, a fan and air distribution system may be included in the support device to circulate air within the spaces surrounding the cells and bladders and between the bladders and the support cover. In certain embodiments, to reduce wear and improve performance, a friction control element 1830, e.g. a sheet-like material formed of a low friction plastic like PTFE or similar, may be placed between the porous spacer and the bottom of the surface cover. Air flow can be passing adjacent to the top portion of a bladder may be useful to lower the temperature of the surface cover via convective cooling.

In some embodiments, for example as illustrated in FIGS. 19A-19E, a ventilation system configured to provide ventilation in the space surrounding and between bladders of the plurality of cells may be provided to provide (for example) cooling and/or humidity control to the surface upon which a user is supported by the support system. In some embodiments, the ventilation system may be associated with and/or provide ventilation to one or more cells and associated bladder(s) (e.g., all or a selected set of cells) of a support system. In preferred embodiments and advantageously, the ventilation system may be separate from the system used to supply fluid contained within the bladders, so that the ventilation fluid (typically air) can be supplied as needed or desired in a manner independent of the supply used for inflation of the bladders. This contrasts with conventional bladder support surfaces that provide ventilation above or surrounding the bladders through the use of permeable/leaky bladders. For embodiments where the ventilation system circulates air or other fluid independent of the fluid used to inflate bladders, the system can be programmed and controlled to provide ventilation to all or portions of the support system and/or to the user in a manner that does not impact the operation and control of the pressure/height maintenance of the bladders. In some such embodiments, the ventilation system may advantageously have one or more dedicated blowers or pumps for providing air (or other fluid) for ventilation, while the compressible fluid provided to the cells (i.e., bladders of cells) is provided by a separate pump(s) or supply source. By contrast, certain existing ventilated support systems that use the same pump/supply to provide bladder pressure and ventilation, can create unnecessary hinderances to the user (e.g., noise, degree of ventilation, pressure/height response accuracy or time lag) when ventilation is desired but increased/decreased pressure is not or vice versa. In support systems and methods described herein, it has been discovered that these unnecessary hindrances may be avoided, and enhanced ventilation capabilities can be provided by separating control of the fluids used to provide ventilation from pressurization of the bladders.

A wide variety of suitable gas moving and directing components can be used to fabricate a ventilation system to provide ventilation to the support devices (as well as to a user laying on or adjacent to the support system for embodiments where a cover separating the bladder surfaces facing the user from the user on which the user is positioned is gas permeable to permit the air or other gas supplied in the space between the bladders to escape through the cover to ventilate the areas under/around the user). For example, the ventilation system may be or include one or more fans, ducts, valves/baffles, and/or pumps, or any other component suitable for providing the flow of air (or any suitable fluid) to the device or support system. In some embodiments, the ventilation system may also comprise heating and/or cooling component so as to adjust the temperature, as desired, of the air (or other suitable fluid) within the support system. Also advantageously in certain embodiments, the control system used to control the operation of the support surface as described herein (or alternatively, a separate control system dedicated to only the ventilation system) can include a processor configured and programmed to respond to a user or operator input (e.g. through use of a GUI or other controller/user interface) to control the ventilation system to supply air or other fluid selectively to a plurality of distinct areas of a ventilation space surrounding the bladders of the cells of the support device (e.g., through the use of controllable baffles, partitions, and/or gas flow control valves positioned to supply and direct the air/fluid selectively to particular areas of/adjacent to the support surface. In certain embodiments, temperature and/or humidity sensors may be provided in one, some or all of the ventilated areas of the support device/surface. In such embodiments, the controller of the ventilation system can be configured and programmed to control one or more of the flow rate, flow direction, flow distribution, and/or air/fluid temperature to maintain a desired set of conditions within the device (e.g. temperature/humidity in an area adjacent the patient/user). In certain such embodiments, the controller may be configured and programmed to control such parameters based on one or more of: a user or operator setpoint adjustment (e.g. made via a GUI); a measured temperature of a distinct area of the ventilated space and/or a portion of a support surface adjacent such area; and/or a measured humidity of a distinct area of the ventilated space and/or a portion of a support surface adjacent such area.

Figure 19A:
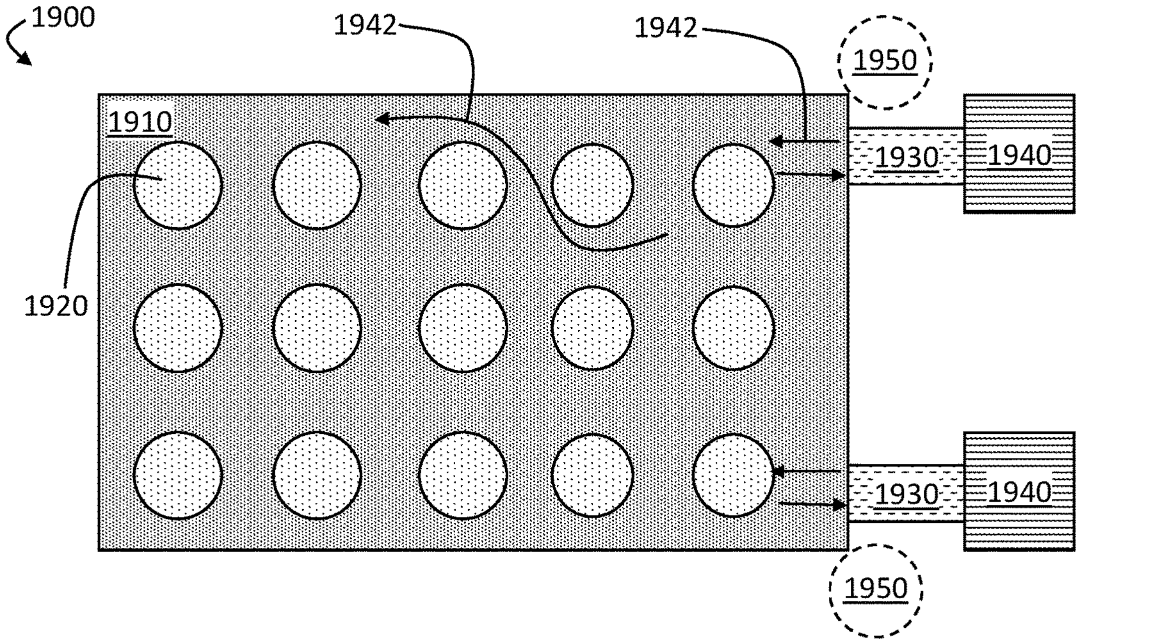
FIG. 19A is a schematic cartoon depicting a top-down view of a support device embodiment that includes a ventilation system for circulating air or another gas in the space between bladders.

FIGS. 19A-19E show examples of a support device that include a ventilation system. FIG. 19A is a cartoon schematic of a basic set-up. System 1900 comprises cells/bladders 1920 and a ventilation space 1910 surrounding the bladders. System 1900 also comprises one or more ducts 1930 connected to one or more fans 1940, wherein the fans 1940 are configured to provide air flow into ventilation space 1910 via ducts 1930. In the figure, air flows 1942 provide ventilation to space 1910 surrounding bladders 1920.

Figure 19B:
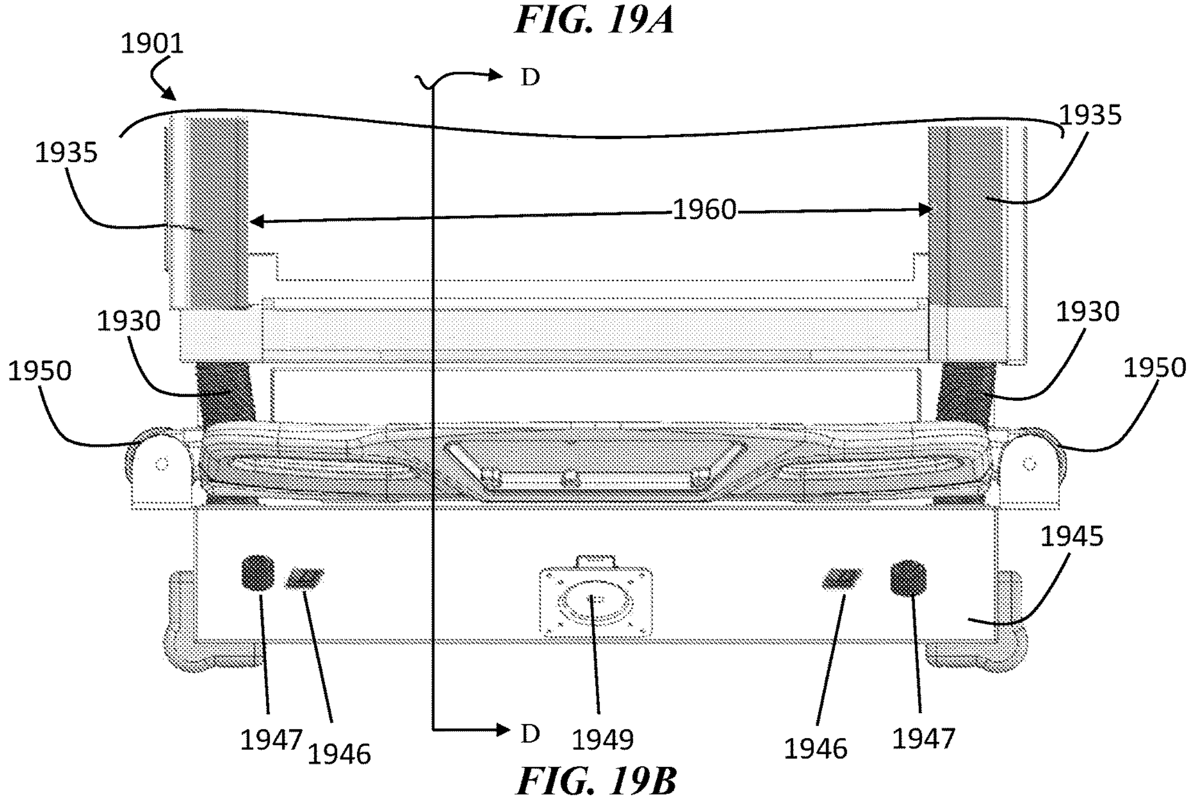
FIG. 19B is a schematic illustration showing a top-down partial view of a portion near the foot of a support device (with bladders and cells removed for clarity) including a ventilation system.

FIGS. 19B-19E show schematic views of an exemplary ventilation of an embodiment of an actual support device 1901. In FIG. 19B, a top-down view of a portion near the foot of support device 1901 is shown, with the bladders/cells that would normally reside in the ventilation space removed for clarity. The ventilation system includes a blower manifold 1945 in which are located two air fans/blowers (not visible but see FIG. 19E). A GUI mount bracket 1949 would normally in operation would normally include the GUI mounted thereto (see FIGS. 19C and 19E), but in this view it has been removed for clarity. As mentioned above, setpoint control of the blowers may be under control of the control system including such a GUI. The blowers each include a manual control set-up comprising an on-off and/or flow direction switch 1946 and a fan speed control dial 1947. The blower manifold 1945 is in fluid communication via flexible hoses 1930 with two distribution ducts 1935 positioned along each lateral side of the ventilation space. Each of distribution ducts 1935 includes a plurality of fluid flow ports/holes 1960 positioned along its length. Also visible are rubber bumpers 1950, which prevent damage due to contact of the bed with surrounding objects when it is moved.

Figure 19C:
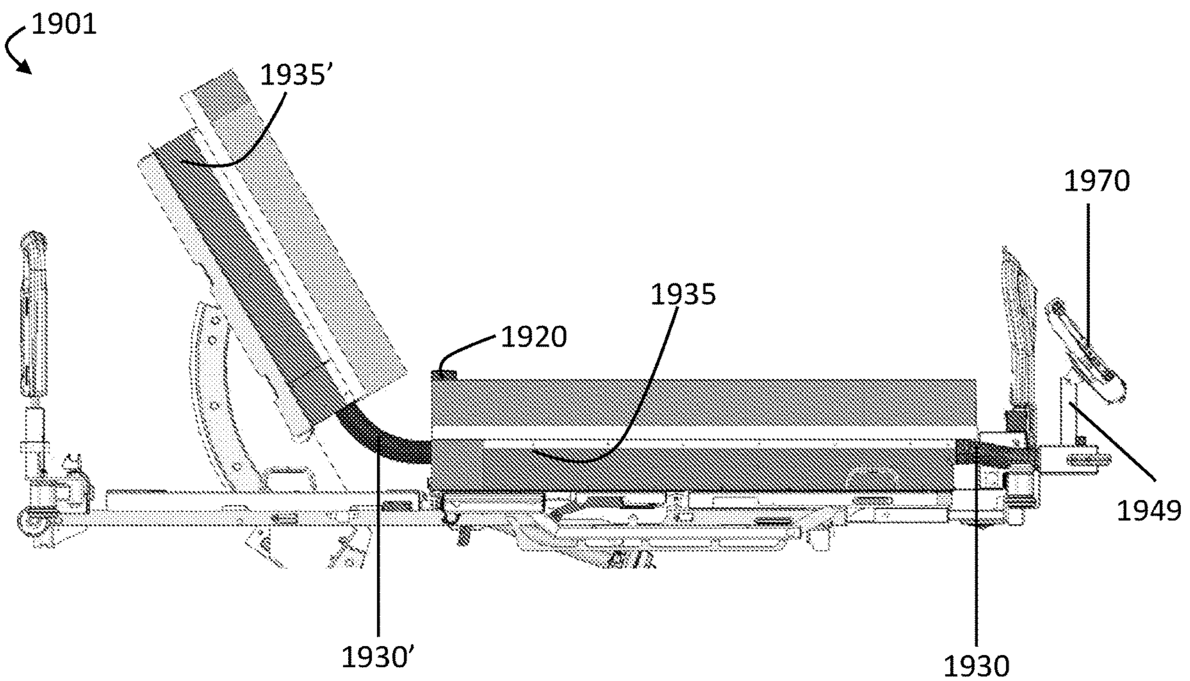
FIG. 19C is a left side partial view of the support device of FIG. 19A with only a single cell/bladder installed for illustrative purposes and with a mounted GUI of a control system illustrated.

FIG. 19C, is a side view of the complete support device (except for the ground-contacting support portions) with the bladders/cells that would normally reside in the ventilation space removed (except for one, 1920) for clarity. Device 1901 includes a an upper-body support portion that can be controllably angled relative to a lower body portion of the support device. To facilitate the relative angular movement of the upper body support portion, a second pair of distribution ducts 1935' are included—which are fluidically connected to lower body portion distribution ducts 1935 via a pair of flexible hoses 1931'—to provide ventilation to the upper-body support portion. As illustrated, GUI 1970 is shown mounted to GUI mount bracket 1949.

Figure 19D:
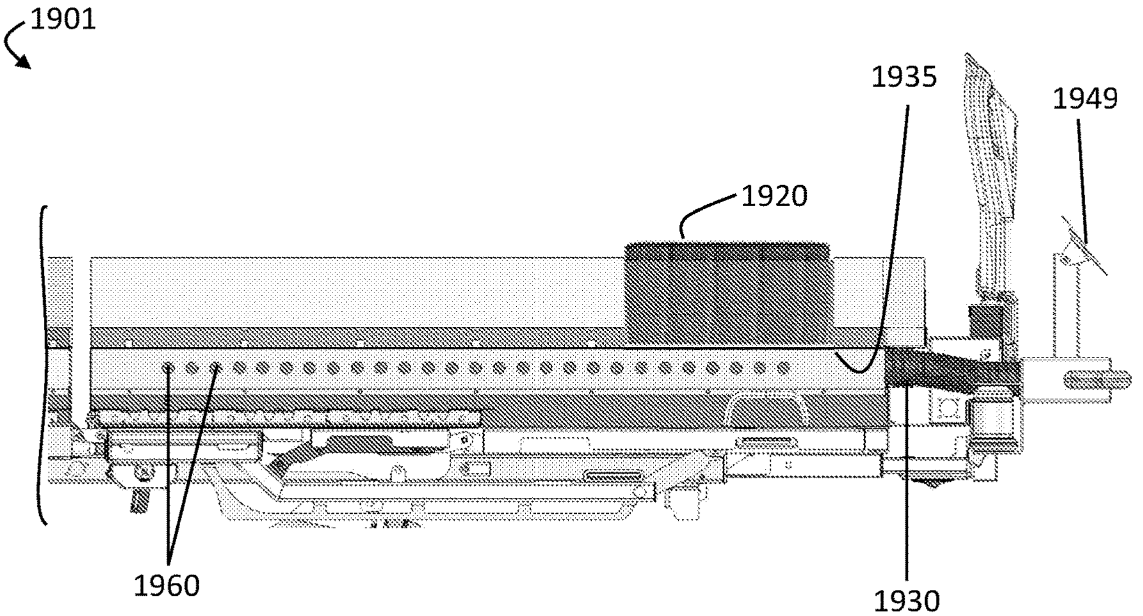
FIG. 19D is a cross-sectional view of the support device of FIG. 19A with five bladders/cells installed for illustrative purposes.

FIG. 19D shows a partial cross-section of support device 1901, with the bladders/cells that would normally reside in the ventilation space removed, except for five, 1920) for clarity. This side view more clearly shows the distribution of fluid flow ports/holes 1960 positioned along the length of the distribution ducts 1935. As mentioned above, typically, a cover or a sheet may be present on or adjacent to the bladders 1920 of the support surface (not pictured) on which the user is in contact, and the fluid flow ports/holes 1960 may provide ventilation or air flow to the user through the sheet or cover in, in certain embodiments, selected controllable locations.

Figure 19E:
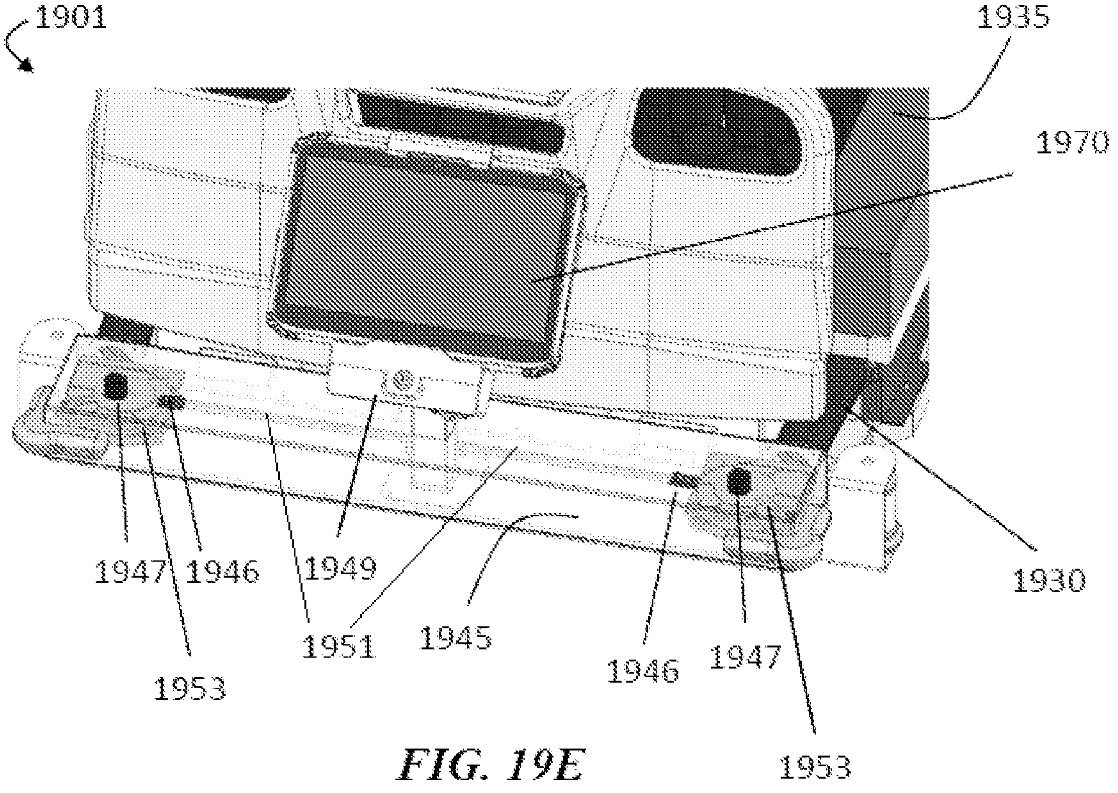
FIG. 19E is a perspective partial view of the portion illustrated in FIG. 19A near the foot of a support device, with the air supply header portion of the ventilation system made transparent to show the blowers contained within the header, and with the GUI installed.

FIG. 19E is a perspective view of the footboard region of device 1901. In this view, GUI 1970 is shown mounted to GUI mount bracket 1949, and the blower manifold 1945 is rendered transparent to show the positioning of blowers 1953, which, as illustrated are in electrical power and data communication with the power supply and control system via electrical connectors 1951.

As described herein a "fluid" is given its ordinary meaning to describe a substance that has no fixed shape and yields easily to external pressure, such as a gas or a liquid. In some embodiments, the fluid comprises an incompressible fluid. An "incompressible fluid" is given its ordinary meaning in the art to refer to a fluid whose density does not substantially change when the pressure changes. By contrast, a compressible fluid, is a fluid in which significant density variations can occur during its flow. In some embodiments, the fluid is a compressible fluid. In some embodiments, the fluid comprises air. However, other fluids are possible. Non-limiting examples of fluids include oxygen gas, $CO_2$, and inert gases such as nitrogen and argon. In some embodiments, the fluid (e.g., the compressible fluid) can be temperature controlled. In some embodiments, the humidity (i.e., the amount of water or water vapor) of the fluid can be controlled.

Each cell of the plurality of cells can comprise a base. The base helps provide mechanical support to the bladder(s) and/or the cell. In addition to providing support, the base can comprise and be functionally associated therewith at least one valve in fluidic communication with the bladder(s), a pressure sensor, and at least one height sensor.

The base of a cell can provide rigidity to the cell and, as such, can comprise materials such as plastics, metals, and wood. In some embodiments, the base comprises acrylonitrile butadiene styrene (ABS), polycarbonate, polyvinyl chloride (PVC), and/or styrene.

A variety of pressure measuring devices such as pressure gauges and pressure sensors may be suitable for use in the cells and devices disclosed. As described, in preferred embodiments, a pressure measuring device is configured and positioned to provide a measurement of the pressure of a fluid within the bladder(s) of one or more cells of the device and/or a gas supply source or gas distribution manifold(s) of the system. In preferred embodiments as described, the support device includes a plurality of cells or all of its cells including or functionally associated with a separate pressure sensor to independently measure and/or control the pressure in the bladder(s) of each such cell. The pressure sensor may be functionally associated with a controller that can provide a readout of the pressure to a user or external operator, such as a map of the tissue-interface pressure of each cell of the plurality of cells and can use the measured pressure to operate a valve(s) to increase or decrease the pressure in the bladder(s) to a desired level, preferable in real time. By providing such measurement, display, and control, the TIP may be maintained by the controller at or below a certain threshold pre-determined for safety and comfort of a user or patient and can adjusted automatically and/or manually by the user or an external operator.

Figure 20A:
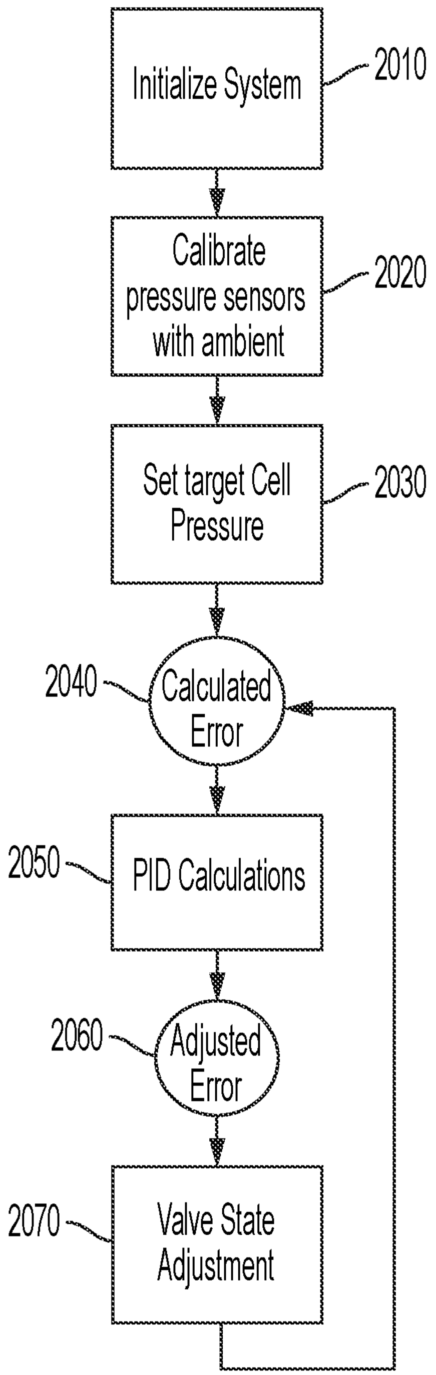
FIG. 20A is a flow chart showing a basic pressure control algorithm for controlling pressure to a set point with a controller of the system including a feedback loop of pressure measurement, calibration of the pressure sensor, and control of a valve state to control the pressure of the fluid in the bladder, according to some embodiments.
Figure 20B:
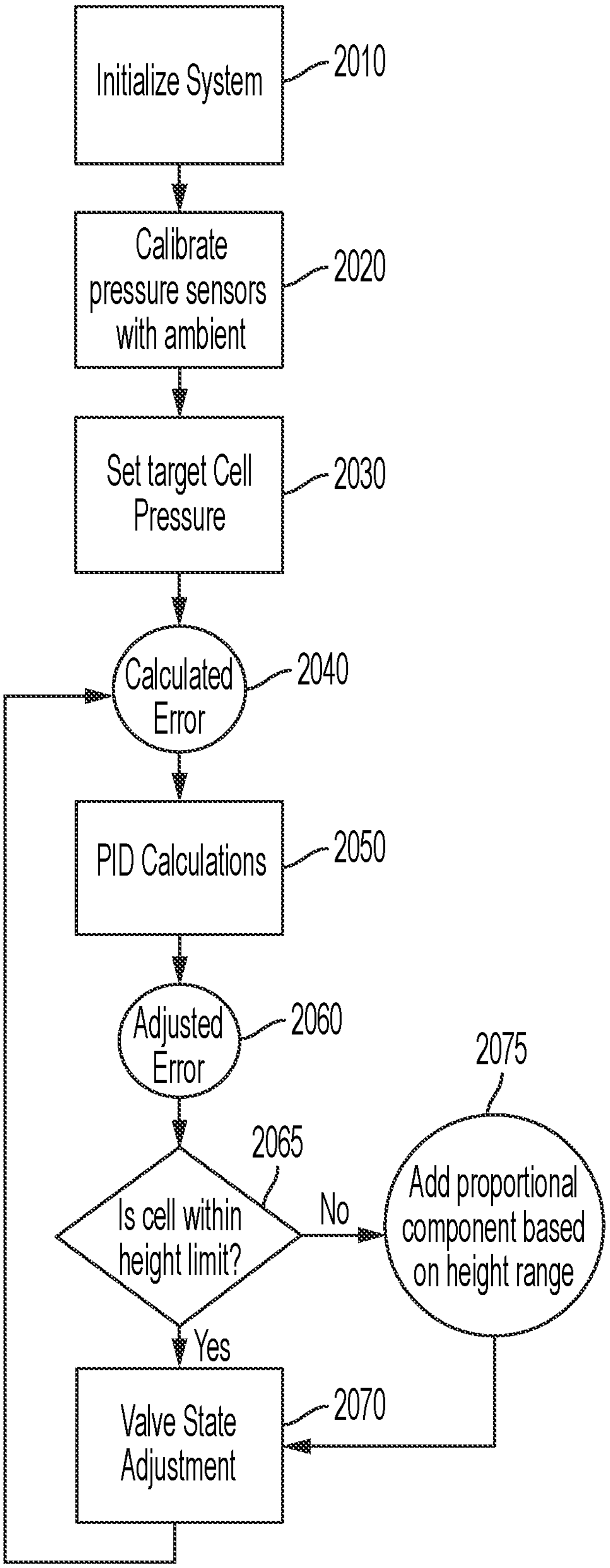
FIG. 20B is a flow chart showing a height control algorithm for controlling cell height in response to an applied pressure to a set point with a controller of the system including a feedback loop of pressure measurement, calibration of the pressure sensor, and control of a valve state to control the pressure of the fluid in the bladder to maintain a cell at a selected cell height set point, according to some embodiments.

In some embodiments, an electronic pressure sensor is configured to calibrate a measured bladder pressure relative to the pressure of the ambient surroundings. FIGS. 20A-20B show flowcharts illustrating control algorithms for calibration and pressure control of a cell.

For example, FIG. 20A shows a calibration and control process performed by the controller that can adjust and control the pressure setting alone. In step 2010, the controller and system are powered up and/or initialized. In step 2020, the pressure sensors are calibrated with reference to the surrounding ambient pressure. In step 2030, a target pressure for each cell being controlled is set—e.g. according to an automated operating mode condition and/or a user/operator input. In step 2040, the pressure of the air in the bladder(s) is measured and compared against the target pressure. In step 2050, the calculated error is compared to past determinations and an adjusted error 2060 is determined using an appropriate mathematical algorithm, such as by applying an algorithm considering proportional, integral, and derivative terms (PID controller). Based on the adjusted error, the controller adjusts the valve(s) state to incrementally increase of decrease the pressure in the bladder(s) until the control set point is reached to within a desired degree of accuracy.

FIG. 20B shows a similar control scheme, but for a system and control program where the cell is also being controlled to a height set point. Extra steps 2065 and 2075 are included which compare the measured bladder height or depth to a set point and adjust the valve state and pressure accordingly.

In some embodiments, the pressure sensors can be piezoresistive pressure sensors. The term "piezoresistive" describes an object (e.g., a pressure sensor measuring element) that undergoes a change in electrical resistivity when mechanical strain is applied. A piezoresistive valve can provide a digital output for reading pressure over a specified full-scale pressure span and temperature range. In some embodiments, the piezoresistive pressure sensor can be calibrated to atmospheric pressure in order to provide an accurate pressure reading. An example of a piezoresistive pressure sensor suitable for use in some embodiments is one selected from the Honeywell© Microprocessor MPR Series or similar. In some embodiments, the piezoelectric valve comprises a commercially available, proportional, two-way or three-way piezo valve.

In some embodiments, a pressure sensor (e.g., a piezoresistive pressure sensor) can determine a gauge pressure over a range of operating pressures anticipated for the support device. For example, in some embodiments, the pressure sensor can determine a gauge pressure of at least 5 mbar, 6 mbar, at least 8 mbar, at least 10 mbar, at least 20 mbar, at least 30 mbar, at least 40 mbar, at least 50 mbar, at least 60 mbar, at least 70 mbar, at least 80 mbar, at least 90 mbar, at least 100 mbar at least 200 mbar, at least 500 mbar. In some embodiments, the pressure sensor can determine a pressure of down to as low as 1 mbar or less, 5 mbar or less, or 10 mbar or less.

The operating pressure can be configured for particular modes. Operating pressures (bladder inflation gauge pressures) for some embodiments can be between about 5 mbar to 50 mbar for flotation modes. In general, operating pressures can be selected to provide sufficient pressure to support a patient of a given weight, and therefore operating pressures for flotation modes will vary with patient weight, positioning, etc. In general, average contact support pressure for a given patient can be determined as: (Body Weight of the patient)÷(Contact area of the body and support cell surface)—for example, for a 200 lb. patient having a contact area of 600 square inches, the average floatation pressure would be 0.333 psig or equivalently 17.2 mmHg or 22.9 mbar. In some embodiments, the operating pressure for flotation mode can be about 10 mmHg (13.3 mbar) to about 32 mmHg (42.7 mbar). In some embodiments, the operating pressure for a safe bed mode can be about 26 mmHg (34.7 mbar). In some embodiments, the operating pressure for a transfer mode can be between about 66 mbar to 140 mbar (50 mmHg to about 100 mmHg). Gauge pressures of 50 mbar to 500 mbar produce more ridged support modes like the above described CPR mode or ingress-egress assist. Other operating pressure ranges are possible.

The pressure sensor (e.g., a piezoresistive pressure sensor) should be able to operate accurately at the temperatures anticipated for use in the support devices. For example, in some embodiments, the pressure sensor is suitable for measuring pressure at a temperature of at least 0° C., at least 5° C., at least 10° C., at least 15° C., at least 20° C., at least 25° C., at least 30° C., at least 40° C., or at least 50° C. In some embodiments, the pressure sensor is suitable for measuring pressure at a temperature of less than 50° C., less than 40° C., less than 30° C., less than 25° C., less than 20° C., less than 15° C., or less than 10° C. Combinations of the above-referenced ranges are also possible (e.g., between 0° C. and 40° C.). Other ranges are possible.

Pressure sensors (e.g., piezoresistive pressure sensors) described herein may provide a pressure within a high degree of accuracy (i.e., a low degree of error). For example, in some embodiments, the error of a pressure measured is within +/−10.00%, +/−5.00%, +/−2.00%, +/−1.00%, or +/−0.50%.

As mentioned above, in certain embodiments, each cell of the support device or at least plurality of cells of the support device can include a height sensor, and preferably a separate height sensor for measuring the height of each bladder of each cell. The height sensor(s) may be contained within the base of a cell or elsewhere within the cell or the device such that it is operable to measure the height of the bladder(s) of the cell. In some embodiments, the height sensor is an optical sensor. In some preferred embodiments, the height sensor comprises a time-of-flight sensor, as previously described. In certain embodiments, cells including optical height sensor(s) may include a bladder(s) where the inside surface, or at least a portion thereof such as the inside surface of the top portion of the bladder(s) that applies force to the user and defines the maximum height, is made of, coated with, etc. a reflective material to improve performance of the optical light sensor.

As mentioned above, in certain embodiments, each cell of the support device or at least plurality of cells of the support device can include at least one valve. The valve may be contained within the base of a cell or elsewhere within the cell or the device such that it is operable to permit inflow and outflow of the fluid contained in the bladder(s) of the cell. The valve can be configured to control the flow of fluid within the cell's bladder(s) and may be located within the base of a cell or adjacent to the base. Each valve may be functionally associated with an individual cell within the plurality of cells. The valves can be associated with a manifold to provide pressure to the plurality of cells. In some embodiments, a valve is positioned such that the flow of fluid can be controlled between a cell and its surrounding environment to allow deflation, or between a cell and a source of vacuum, which can facilitate the ability to decrease the height of the bladder(s) of the cell even in the absence to an external pressure (e.g. via the body of a user being supported or the hand of a user or operator depressing a bladder(s) to create a height control set point). A valve can be positioned to control flow of an inflating fluid between the cell and a pressurized fluid source. In some embodiments, multiple valves are present (e.g. an inlet and an outlet valve or a proportional valve and a switching valve—see FIGS. 5A and 5B) for each cell and can be independently controllable with respect to one another. Preferred valves are electronically controllable, so they can be adjusted automatically or semi-automatically via a controller. A valve or another pressure regulation component can comprise a pump, such as a pump constructed and arranged to pump fluid to and/or from a cell, to independently adjust the pressure maintained within an individual cell or group of cells. In some instances, it may be desirable to maintain the pressure within a bladder at a pressure higher than the pressure of a fluid source, or otherwise change the pressure to a level higher than the source pressure. In such instances, a fluid can be pumped otherwise compressed before introduction into the bladder. Similarly, in certain embodiments, fluid can be removed from a cell bladder via a pumping mechanism. In some embodiments, devices, systems, and methods can include a second, separate system air supply system comprising a controllable pressure regulator and valve(s) and/or pump(s) that can be configured, for example supply pressurized air to one or more gas distribution plenums or manifolds that are configured to supply the pressurized air to selected groups of cells within the support device. In some embodiments, a blow-out valve may be incorporated in each cell or group of cells to allow for a "failure" in the control or sensing system. In the case of a failure, the blow-out valve is configured to release the pressure (i.e., release the fluid in failed cells) to avoid over inflation or harm to the device or user.

As described above and elsewhere herein, a valve can comprise a piezoelectric actuator configured to deflect in response to an applied electrical potential. Piezoelectric valves may provide low cost, lower power consumption, facilitate fail-safe operation (bed stays inflated), and allow for quiet operation. In some embodiments, use of piezoelectric valves provides a more compact design compared to typical existing valve design alternatives. However, other valves types are also suitable. For example, in some embodiments, one or more valves are proportional solenoid valves and/or non-proportional solenoid valves. Combinations of valve types are also possible (e.g., a piezoelectric valve and a non-proportional solenoid valve, etc.). The choice of valve may vary from cell to cell or be different for valve connecting gas supplies to plenums or manifolds supplying individual cells.

Figure 21A:
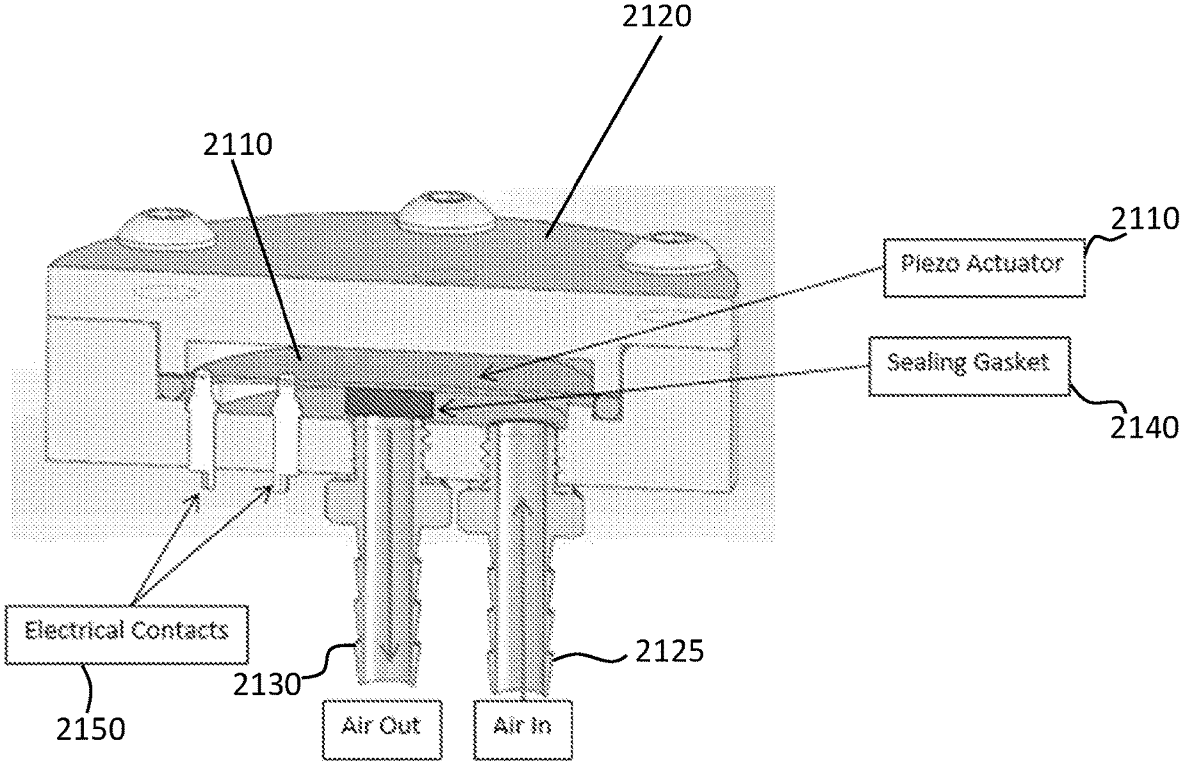
FIGS. 21A-21D are schematic diagrams showing several arrangements of piezoelectric valves for controlling inflation and deflation of the bladder of a cell, according to some embodiments.
Figure 21B:
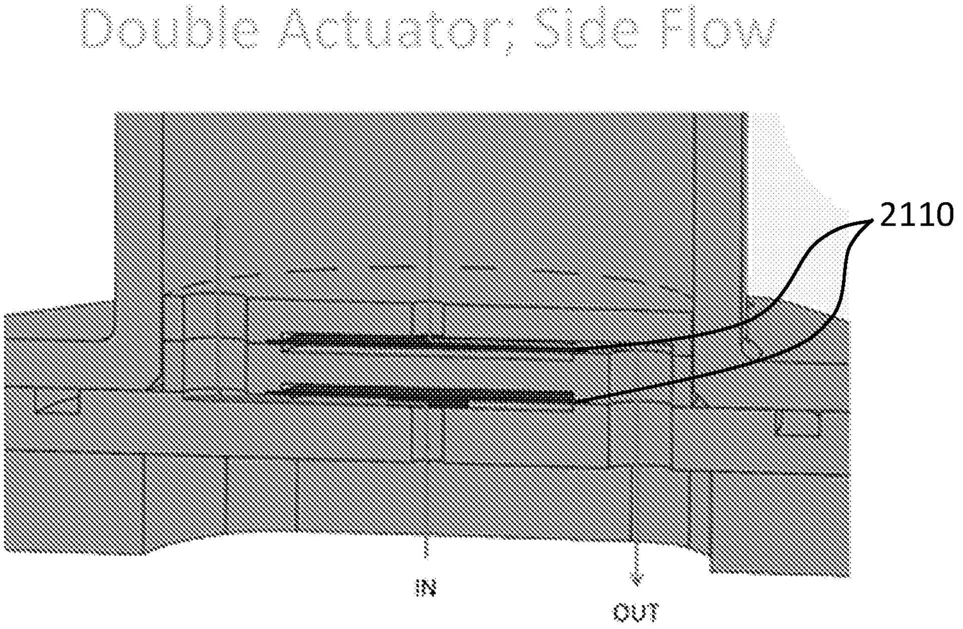
Figure 21C:
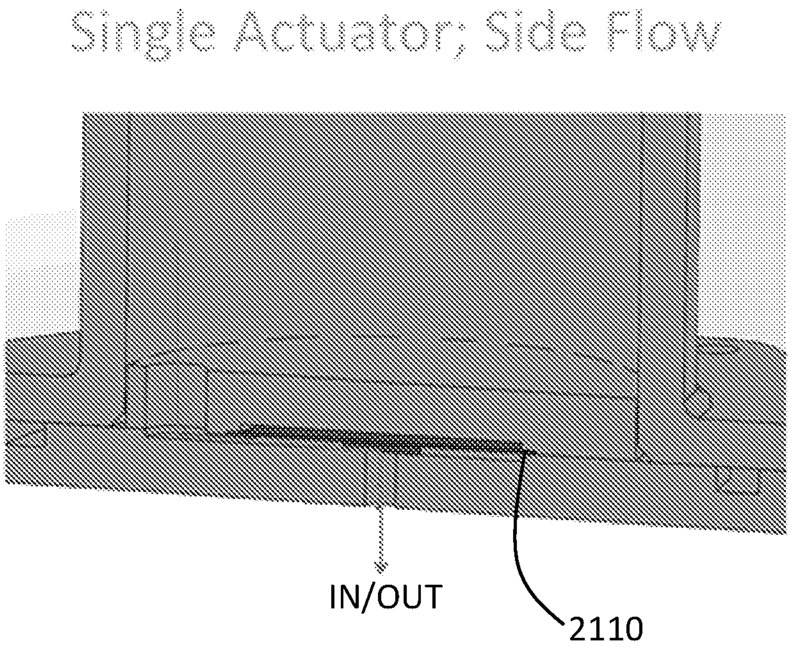
Figure 21D:
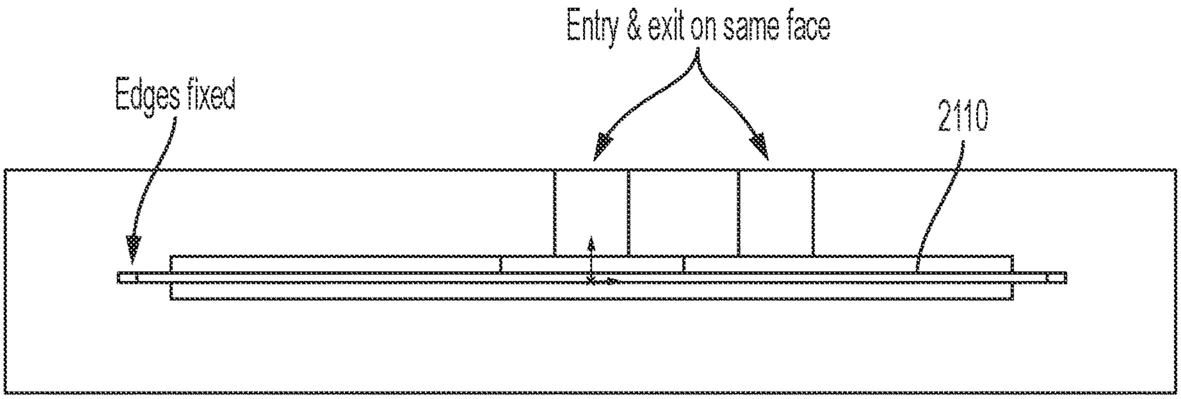

In certain preferred embodiments, a piezoelectric valve is positioned in each cell (e.g., in the base of the cell) or remote from the base of the cell but functionally associated with the cell via fluidic connection to the base of the cell, e.g. through flexible tubing connections. FIGS. 21A-21D illustrate several configurations of piezoelectric valve designs that may be used, with each including one or more deflectable piezoelectric element 2110. For example, in FIG. 21A, the piezoelectric element 2110 of valve body 2120 may be located within a cell or outside of the cell, e.g. adjacent to base of the cell, and fluidically interconnected to the base of the cell via tubing connected to inlet 2125 and outlet 2130. In some embodiments, the valve is located outside of the cell a remote location physically distinct from the surface of the device to which is attached the plurality of cells. In use, the valve is biased in a closed position as shown, with the piezoelectric element 2110 pressing a sealing gasket 2140 against a sealing surface of air outlet line 2130. Upon activation by a controller, an electrical potential is applied to the piezoelectric element 2110 by electrical contacts 2150, which results in an upward deflection of piezoelectric element 2110 resulting in pressurized air being released through outlet 2130. FIG. 21B illustrates a two piezoelectric element design for independent control of both inflow and outflow. FIGS. 21C and 21D show other single piezoelectric element designs.

The devices, systems, and methods described herein can further comprise a manifold configured to fluidically connect each individual cell of the plurality of cells or selected sets of cells within the plurality of cells to a pressure source such that the pressure in each cell can be independently controlled. In certain embodiments involving cells with one or more support bases, each such cell, or a plurality of cells sharing a base, can be independently connected to the manifold via the respective base. Each base can be electrically and/or fluidically connected to the manifold via valved or valve-free connection depending on whether the bases so connected are associated with a single individually controllable cell, in which case the based are ganged together (i.e. via the valve-free connection) for common control, or a plurality of separate individually controllable cells, in which case separate controllable valved connection would be indicated. The manifold can also be configured to provide structural or mechanical support to the bases of the cells directly or via other support elements. The devices, systems, and methods can further include multiple such manifolds where a first grouping of a plurality of bases is connected to the first manifold and a second grouping of a plurality of bases is connected to the second manifold. A grouping can comprise a section; a zone; a subset of a section; one or more rows; one or more columns; and/or a geometric grouping, etc.

The devices, systems, and methods described herein can further comprise one or more sections or subsections having cells affixed via their respective base(s) to a support comprising a mounting plate configured to support each individual base of the plurality of cells or of selected sets of cells within the plurality of cells. Each base associated with one or more cells can be electrically connected to the mounting plate depending on whether the bases so connected are desired to be associated with a single cell that is individually controllable and/or monitored by a controller. The mounting plate can also be configured to provide structural or mechanical support to the bases of the cells directly or via other support elements, fasteners, support brackets, mounting structure, etc. and can be configured as a separate module to facilitate removal for maintenance and/or replacement. The devices, systems, and methods can further comprise multiple such mounting plates where a first grouping of bases of a cell or a plurality of cells is connected to the first mounting plate and a second grouping of bases of a cell or a plurality of cells is connected to the second mounting plate. A grouping can comprise a section; a zone; a subset of a section; one or more rows; one or more columns; and/or a geometric grouping of cells, etc.

Each individual cell of the plurality of cells of a support device may function and be controlled individually. That is to say, an individual cell of the plurality of cells can have a pressure and/or a bladder height controlled to be different than for other cells of the plurality of cells. In certain embodiments, at least some cells or even a majority of the cells (e.g., all of the cells) of a device may comprise multiple bladders that are ganged together so that they can function in tandem and be controlled collectively, such that they have the same pressure and/or bladder height. Accordingly, in some embodiments, groups of cells (e.g., a first set of cells, a subset of cells), or zones, within the plurality of cells may comprise multiple bladders that are ganged and controlled together at a different pressure and/or bladder height from other cells with such ganged groups of bladders (e.g., a cell with second set of ganged bladders). The use of multiple zones (e.g., a first zone, a second zone, a third zone, a fourth zone) that each contain a cell with a plurality of, in some cases many (e.g. greater than 10 or greater than 20) bladders ganged together can facilitate more uniform, simpler and less costly cell designs for cells in such regions and may be useful and cost effective for sections of a support device where discrete and highly granular spatial control and condition display is less critical.

Figure 22:
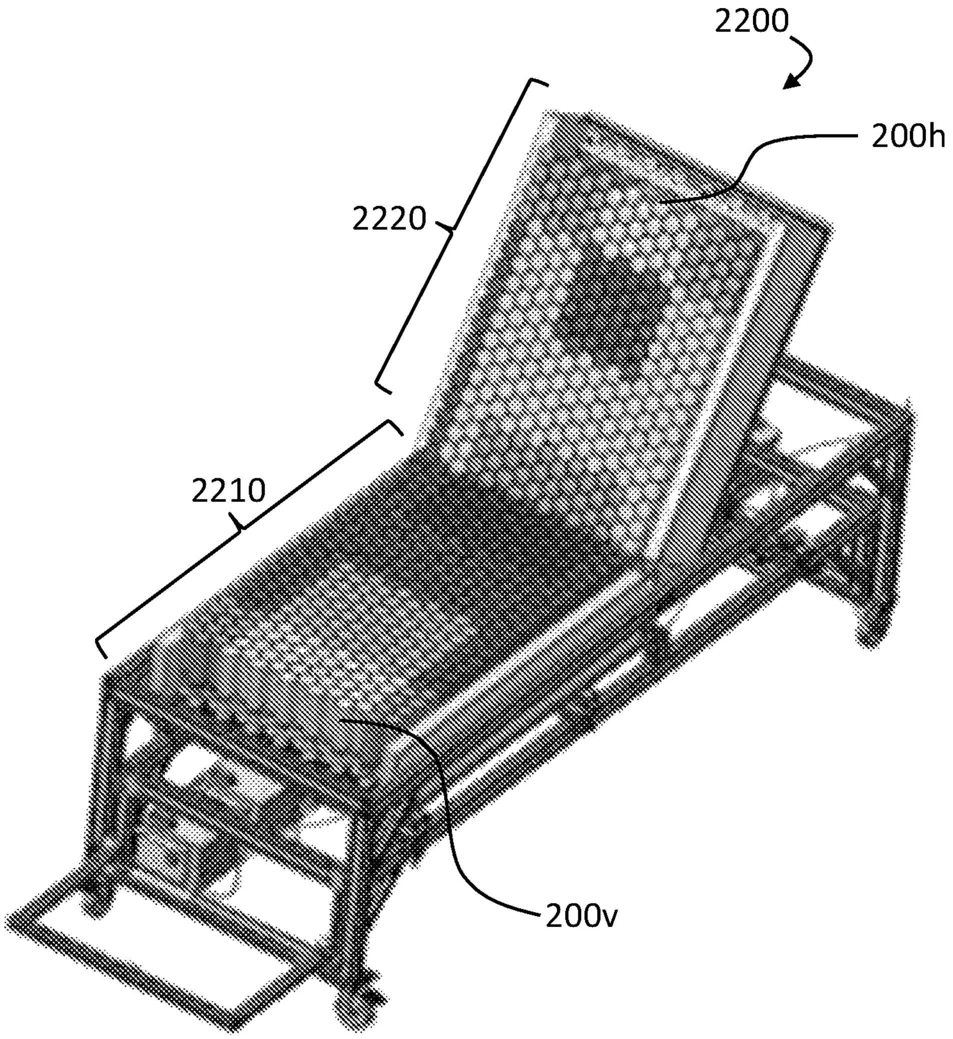
FIG. 22 schematically depicts a support system where the plurality of cells can be both non-horizontally (e.g. vertically)-oriented or otherwise angled relative to vertical, according to one embodiment.

FIG. 22 illustrates an exemplary hospital bed embodiment of a support device. One advantage of the disclosed support device embodiment in FIG. 22 is that while it is able provide precise control of the TIP applied to the patient in discrete areas with a spatial granularity of control at the level of cells with each cell containing an individual bladder—like AFT devices, unlike AFT devices, cells can be positioned to operate to provide non-horizontally oriented support surfaces, e.g. support surfaces oriented at an angle or even vertically. Adjustable bed 2200, for example includes a first horizontal support surface portion 2210 with vertically oriented cells 200*v*, and an adjustable upper body portion 2220 providing a second support surface that may be adjusted from horizontal and coplanar with support surface portion 2210, to substantially vertical as shown with horizontally oriented cells 200*h*.

In general, devices, methods, and systems for supporting at least a portion of the body of a user as disclosed can be used in a variety of settings for a variety of purposes or applications. In some cases, for example, a device can be used to support a patient in hospital setting and the external operator can be a nurse or a caregiver. In some embodiments, devices, methods, or systems can be configured to be used in the context of a bed, mattress, or support cushion for home use or as a seat or arm rest of a chair such as wheelchair. Other applications are possible as the disclosure is not so limited.

Controllers

Devices, systems, and methods can utilize at least one controller (when referred to below as "the controller," or "computer-implemented control system" it should be understood that such description also applied, unless otherwise indicated to at least one or each of a number of separate controllers/computer-implemented control systems for embodiments utilizing separate controllers/computer-implemented control system or distributed control) configured to control one or more components of the device or system. For example, the controller can be configured to independently control each cell of the plurality of cells of the device or system. The devices or systems can comprise one or more sections or zones each containing one or more individually controllable cells, and one or more controllers can be provided and configured to separately and/or independently control each of the one or more sections or zones. At least one section of the one or more sections can comprise one or more subsections, and the same or separate controllers independently or cooperatively can be configured to separately and/or independently control each of the one or more subsets. In some cases, separate controllers or controller components or processors or processing elements may be included in at least one, some, or all cells of a device or system. In some embodiments, the controller can measure, record, and/or display bladder height and/or pressure received from the height sensors and/or the pressure sensors.

The controller can be configured to control a pressure and/or a bladder height within each cell of the plurality of cells at a constant or variable rate. The controller can communicate with a valve (e.g., a piezoelectric valve) or a pressure distributor via a cable or wirelessly.

In some embodiments, the controller may be configured and comprise a processor programmed to measure a duration of time a cell or a set of cells is held at a particular bladder height and/or pressure. For example, in some embodiments, the controller is configured and programmed to measure a duration of time over which a force/pressure is applied to the body of a user by a cell or set of cells as measured by pressure sensors. The controller may also be configured and programmed to measure a duration of time at which a particular cell or set of cells maintains a particular bladder height as measured by one or more height sensors.

Figure 23:
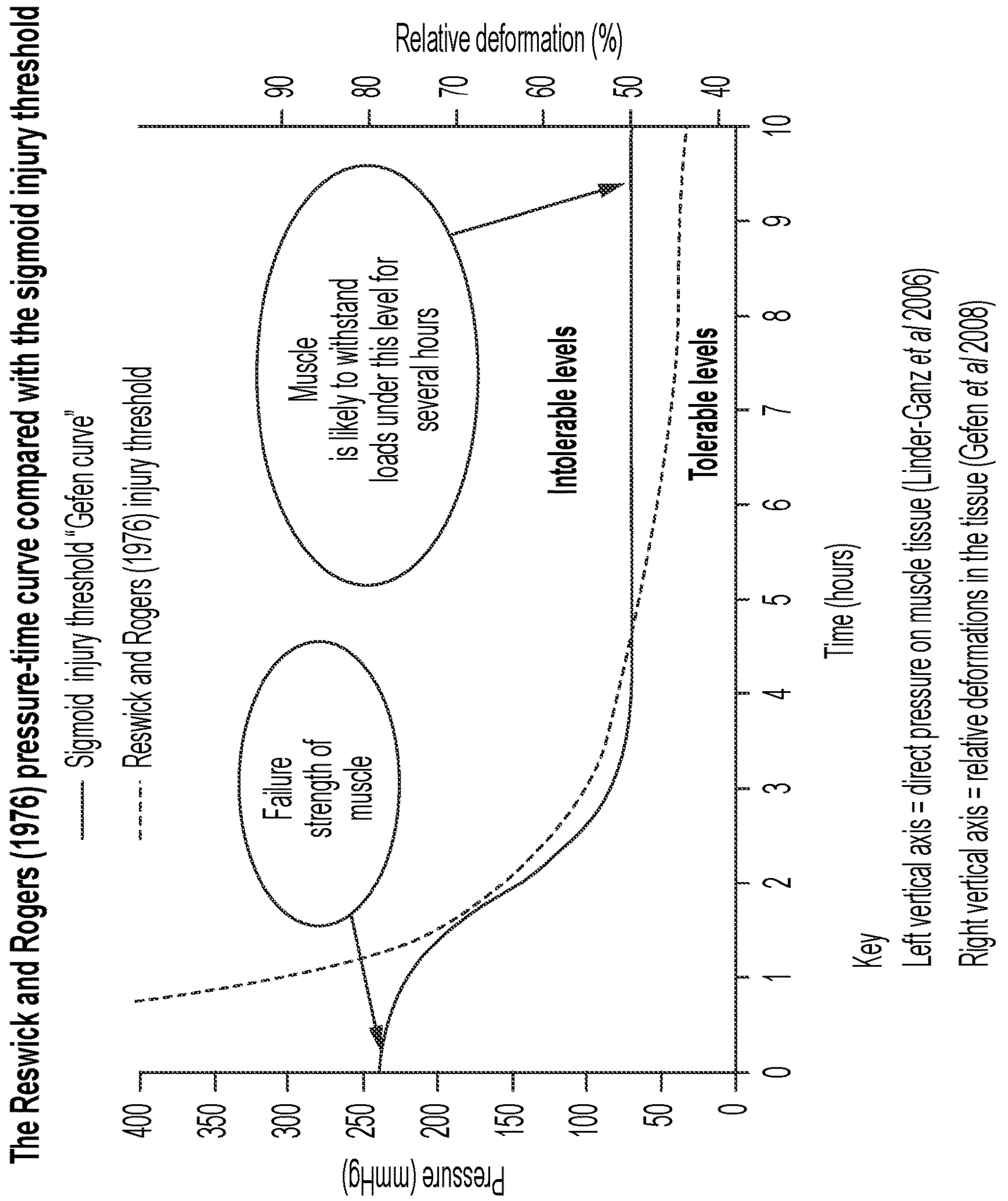
FIG. 23 shows a plot of a Gefen curve and a Reswick & Rogers curve depicting pressure as a function of time in relation to the chance of tissue damage to a patient, according to one set of examples.

The controller measuring a particular duration of time of a bladder height and/or pressure value of a cell or set of cells may advantageously be configured to compare such value to a set-point or injury threshold to predict and avoid injury to a user. For example, typical mattresses and patient support devices can cause pressure sores or bed sores, which result from pressure above certain levels being applied to a portion of the body of a user for an extended period of time. The time of tolerance before injury depends on the applied pressure and vice versa. Advantageously, certain embodiments of devices and systems described herein are configured to measure and optionally record and/or transmit not only cell pressure and bladder height data, but also determine, and optionally record and/or transmit, the duration of time one, a plurality of, or all of the cells are characterized by any particular applied pressure. Such embodiments are configured to monitor how long a particular portion of the body has been experiencing a particular applied force/pressure. Advantageously, in some such embodiments, the controller may be configured and programmed to adjust the bladder height and/or the pressure a cell or set of cells in response to a portion of the body having experienced a particular applied pressure over a particular duration of time. In some embodiments, the controller may be configured to periodically or automatically adjust the pressure applied to one, some, or each point of contact with a cell of the device and the body of the user (e.g., by adjusting the bladder height of one or more cells) at intervals of time to assure that a pressure-time injury threshold is not exceeded. In certain embodiments, the controller and processor can be configured to provide continuous and dynamic pressure-time internal control at the level of individual cells. For example, for each cell in a support surface or subsection(s) thereof, the control system can measure, and optionally record and/or transmit, the duration of time for which each particular cell has applied the measured pressure to the portion of the body of the patient adjacent to the cell, and for each cell where a pressure-time threshold for injury is reached, the control system may do one or more of alerting an operator of the device or adjusting the pressure/bladder height of the cell (and/or surrounding or distant cells) to reduce the pressure applied to below the threshold and/or reposition the patient to redistribute applied forces to achieve a similar effect. In this way, certain devices and systems described herein can advantageously minimize or eliminate pressure injuries (e.g., bed sores, pressure sores) on the user with less disruption and adjustment activity than for situations where only pressure level thresholds without consideration of exposure duration are used a control parameter. As an additional advantage, controllers programmed with pressure-time measurement and adjustment capability can allow a user to be repositioned and/or cell pressure to be adjusted automatically at desired intervals without the intervention of an external operator. In some embodiments, the controller is programmed and configured to alert the user and/or a caregiver when the value of pressure×duration (i.e. the pressure-time measurement or value) on at least a portion of the body exceeds a particular value (e.g., as shown in FIG. 23 and described below).

The duration of time for which a particular measured cell pressure may be tolerated without triggering alarm or readjustment will vary depending on the measured pressure. For example, in some embodiments, the controller can measure a cell pressure, determine a pressure/force applied to the patient body by such cell, and permit a duration of time at such pressure of greater up to 12 hours for pressures applied to the body of up to 20 mmHg, up to 8 hours for pressures applied to the body of up to 50 mmHg, up to 5 hours for pressures applied to the body of up to 75 mmHg, up to 3 hours for pressures applied to the body of up to 90 mmHg, up to 2 hours for pressures applied to the body of up to 125 mmHg, up to 60 minutes for pressures applied to the body of up to 200 mmHg. (note: These values are for illustrative purposes only and are taken from Reswick and Rogers and Gefen curve shown in FIG. 23 based on data published in: Linder-Ganz E, Engelberg S, Scheinowitz M, Gefen A. "Pressure-time cell death threshold for albino rat skeletal muscles as related to pressure sore biomechanics." J Biomech. 2006; 39(14):2725-32, and Gefen A. "Bioengineering models of deep tissue injury." *Adv Skin Wound Care.* 2008 January; 21(1):30-6, each incorporated by reference). The alarms can be adjusted to meet the patient's needs as determined by the treating caregiver's knowledge of the patient's skin health, comfort, and other health considerations).

Durations of time for skin exposure as a function applied pressure/force levels to avoid or reduce risk of tissue damage have been determined and tabulated. For example, pressure-time threshold values that could inform selection of appropriate control parameters for cell pressure-duration can be found in the literature referenced above and depicted in a Gefen Curve or a Reswick & Rogers Curve) (e.g. as depicted in FIG. 23). Such curves and the data they depict can be used as a guide to predict the exposure time for the user to be at risk of bed sore at a particular applied pressure, but as mentioned above, in preferred embodiments, threshold values will be determined for a particular user/condition and be chosen conservatively. Certain controllers may also be programmed and configured not only with the capability to measure, and optionally record and/or transmit, pressure-time data, but may be further programmed with Gefen Curve or a Reswick & Rogers Curve or similar information (e.g. in the form of a best-fit calibration equation of pressure-time tissue damage/comfort data, similar data in a look-up table, etc.) in order to provide a control setpoint defining a permissible duration of time at measured cell pressures to avoid increased risk of a pressure injury, and can be further programmed to adjust the pressure and/or height of any cell exceeding the control setpoint to reduce (e.g., eliminate) the risk to the user. Finally, the time and pressure thresholds may be set to any value that the facility or institution deems appropriate for all patients or classes of patients.

Figure 24:
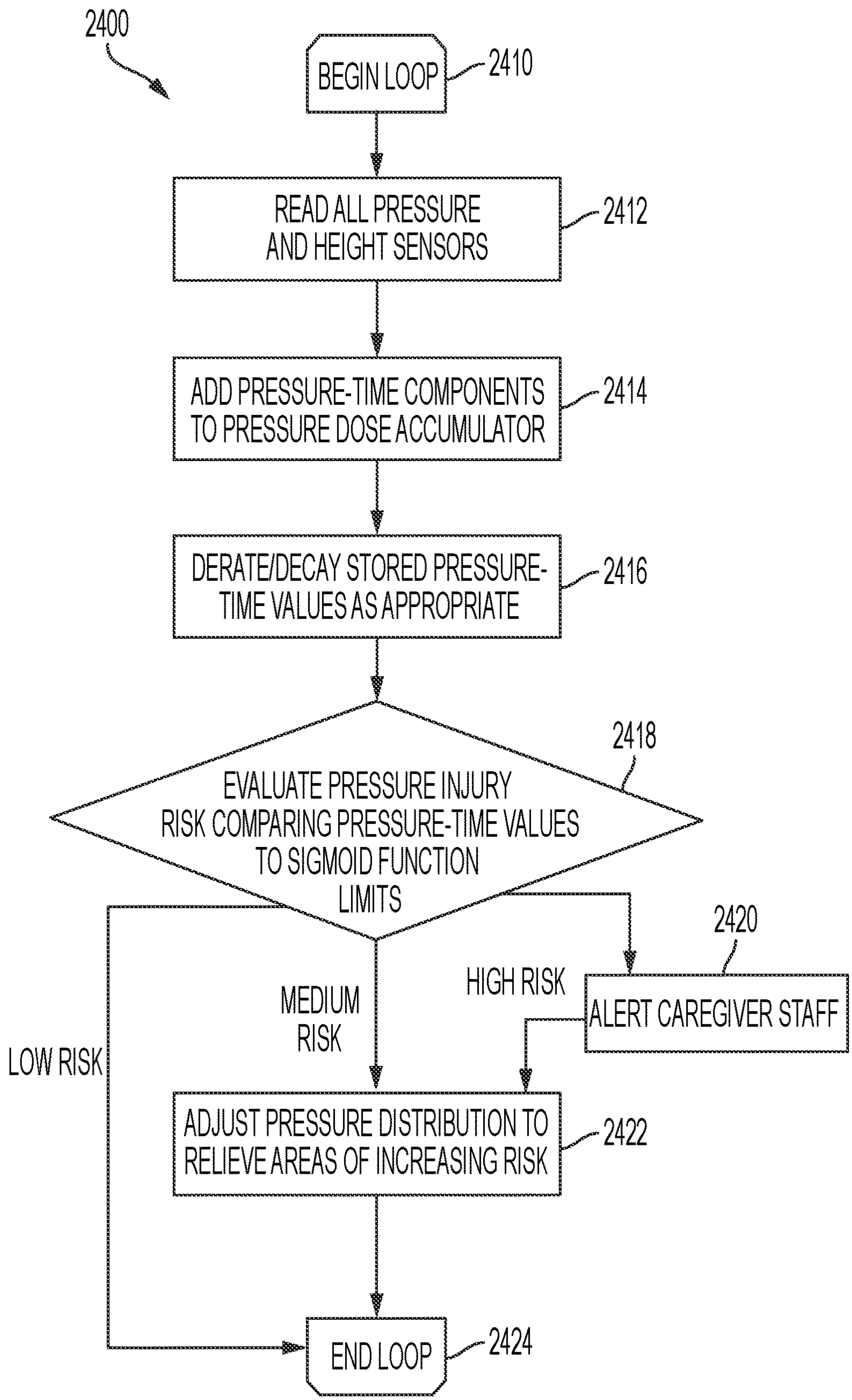
FIG. 24 is a flowchart describing controller-mediated control algorithm for adjusting the pressure of individual cells of a plurality of cells based on pressure-time measurements to reduce the risk of pressure injuries, according to some embodiments.

FIG. 24 shows a flowchart 2400 of exemplary control algorithm for a controller implementing the above-described pressure-time product threshold control method. In step 2410, the controller initializes. In step 2412, the controller at a specified increment of time (e.g. every 10 minutes, 5 minutes, 2 minutes, 1 minute, 30 seconds, or more frequently) reads at least some of the pressures (e.g., all of the pressures) and/or at least some of the bladder heights (e.g., all of the bladder heights) of one or more cells (e.g. all of the cells) by addressing the pressure and/or height sensors of the one or more cells. In step 2414, pressure-time component for the interval since the last interrogation are added to a pressure dose accumulator, e.g. in memory of the processor, and in step 2416, the stored pressure-time values can be derated/decayed, as appropriate. In step 2418, the pressure injury risk can be evaluated (e.g., by comparing pressure-time values/durations to sigmoid function limits—e.g. as stored in a calibration equation, look-up table, etc.) to categorize the risk of injury as low, medium or high considering exposure at such pressure until the time of the next interrogation. In some embodiments, a Gefen curve or a Reswick and Rogers curve can be used as the sigmoid function. When a threshold of medium or high risk of injury is determined, the pressure of the offending cell(s) and/or a wider pressure distribution in these and/or other cells can be adjusted to relieve areas indicating increased (i.e. medium or high) risk, as shown in step 2422. In certain embodiments, if a high injury risk indication is determined, the controller may raise and alarm 2420 to the user and/or caregiver identifying the condition and optionally the specific cells/areas of the user body implicated. In step 2424, the feedback loop ends, and the process may recycle to step 2410 after a cycle time interval for the subsequent interrogation and repeat of s steps 2412-2424.

Regarding components and further configuration of the control systems, controllers and processors, the controller can comprise a user interface comprising a GUI and one or more controls. The controller can be configured to allow a user to enter one or more input parameters via one or more input components. The one or more input components can be touch screens, keyboards, joysticks, electronic mice, audio devices (e.g., audio recorders), remote devices such as a hand-held wired or non-wired device, a phone, and/or a mobile phone. Other input components are possible. The one or more input parameters can be: a pressure and/or a height to be maintained within: each cell of the plurality of cells; a section of cells; one or more zones of cells; one or more rows of cells, or any grouping of cells. Other controllable parameters functions of the controller may include: a control of a degree of clearance of bladders of cells from maximum inflation height to form a depression relative to adjacent cells; setting and control of durations of any pressure and/or height settings; gathering, processing, displaying, storing, and/or transmitting information related to setting and/or controlling various modes; gathering, processing, displaying, storing, and/or transmitting any patient parameter such as patient vital information; providing an alert such as an alert to notify an external operator (e.g., clinician) of a particular user (e.g., patient) activity or adverse condition such as a patient attempting to exit the device without required assistance; providing an alert such as an alert to notify an external operator (e.g., clinician) of an increased site temperature which can be correlated to a potential pressure ulcer site; providing an alert such as an alert to notify an external operator (e.g., clinician) of a pressure change other than a known or expected pressure change; providing an alert such as an alert to notify an external operator (e.g., clinician) of an instance where a bladder has made contact with a portion of its respective base or a manifold; gathering, processing, displaying, storing, and/or transmitting operator specific information such as operator name and/or employee ID, facility specific information, environment specific information such as ambient pressure or humidity, security information such as a lock-out code, user permissions and/or restrictions such as permitted patient controls; and combinations of these. Other input parameters, control functions, and information gathering, processing, displaying, storing, and/or transmitting tasks are possible.

The device can further comprise one or more output components selected from the group consisting of: video displays; liquid crystal displays; alphanumeric displays; audio devices such as speakers; lights such as light emitting diodes; tactile alerts such as assemblies including a vibrating mechanism; and combinations of these.

The controller can be configured to generate one or more output signals configured to be received by one or more external electronic modules. The one or more output signals can be selected from the group consisting of: an electric current; electric signal; telephonic data stream; Bluetooth or other wireless signal; and combinations of these. The one or more external electronics modules can be selected from the group consisting of: an off-site alarm; computer processor; memory; video system; software; and combinations of these.

The controller can be configured to allow a user to initiate, modify and/or cease one or more device functions and/or modes. The user and/or external operator can be selected from the group consisting of a patient; clinician; physician; nurse; surgeon; any staff member of a hospital or health care facility; a family member; caregiver; and combinations of these.

As described above, certain embodiments of the systems and devices include one or more controllers and/or computer implemented control systems for operating various components/subsystems of the system, performing control and data gathering, processing, display, and transmitting functions, etc. (e.g., controller/computer implemented control system 510 shown in FIGS. 5A and 5B. Any calculation methods, steps, simulations, algorithms, systems, and system elements described may be implemented and/or controlled using one or more computer implemented control system(s), such as the embodiments of computer implemented systems described below. The methods, steps, control systems, and control system elements described are not limited in their implementation to any specific computer system described, as many other different machines may be used.

The controller(s) and/or computer implemented control system(s) can be part of or coupled in operative association with support device and/or other automated system components, and, in some embodiments, is configured and/or programmed to control and adjust operational parameters, as well as analyze and calculate values, for example pressure values, heights, TIP, etc. as described above. In some embodiments, the controller(s) and/or computer implemented control system(s) can send and receive reference signals to set and/or control operating parameters of the support device. In some embodiments, controller(s) and/or computer implemented control system(s) may be physically integrated into, physically connected to, or hard-wired with other components of a support device. In embodiments, controller(s) and/or computer implemented control system(s) can be separate from and/or remotely located with respect to the other system components and may be configured to receive data from one or more remote support devices of the disclosure via indirect and/or portable means, such as via portable electronic data storage devices, such as magnetic disks, or via communication over a computer network, such as the Internet or a local intranet.

The controller(s) and/or computer implemented control system(s) may include several known components and circuitry, including a processing unit (i.e., one or more processors), a memory system, input and output devices and interfaces (e.g., an interconnection mechanism), as well as other components, such as transport circuitry (e.g., one or more busses), a video and audio data input/output (I/O) subsystem, special-purpose hardware, as well as other components and circuitry, as described below in more detail. Further, controller(s) and/or computer implemented control system(s) may be a multi-processor computer system or may include multiple computers connected over a computer network.

The controller(s) and/or computer implemented control system(s) may include one or more processors, for example, a commercially available processor such as one of the series x86, Celeron and Pentium processors, available from Intel, similar devices from AMD and Cyrix, the 680X0 series microprocessors available from Motorola, and the PowerPC microprocessor from IBM. Many other processors are available, and the controller(s) and/or computer implemented control system(s) is not limited to a particular processor.

A processor typically executes a program called an operating system, of which WindowsNT, Windows95 or 98, Windows XP, Windows Vista, Windows 7, Windows 10, UNIX, Linux, DOS, VMS, and MacOS and are examples, which controls the execution of other computer programs and provides scheduling, debugging, input/output control, accounting, compilation, storage assignment, data management and memory management, communication control and related services. The processor and operating system together define a computer platform for which application programs in high-level programming languages are written. The controller(s) and/or computer implemented control system(s) is not limited to a particular computer platform.

The controller(s) and/or computer implemented control system(s) may include a memory system, which typically includes a computer readable and writeable non-volatile recording medium, of which a magnetic disk, optical disk, a flash memory and tape are examples. Such a recording medium may be removable, for example, a floppy disk, read/write CD or memory stick, or may be permanent, for example, a hard drive.

Such a recording medium stores signals, typically in binary form (i.e., a form interpreted as a sequence of one and zeros). A disk (e.g., magnetic or optical) has several tracks, on which such signals may be stored, typically in binary form, i.e., a form interpreted as a sequence of ones and zeros. Such signals may define a software program, e.g., an application program, to be executed by the microprocessor, or information to be processed by the application program.

The memory system of controller(s) and/or computer implemented control system(s) also may include an integrated circuit memory element, which typically is a volatile, random access memory such as a dynamic random-access memory (DRAM) or static memory (SRAM). Typically, in operation, the processor causes programs and data to be read from the non-volatile recording medium into the integrated circuit memory element, which typically allows for faster access to the program instructions and data by the processor than does the non-volatile recording medium.

The processor generally manipulates the data within the integrated circuit memory element in accordance with the program instructions and then copies the manipulated data to the non-volatile recording medium after processing is completed. A variety of mechanisms are known for managing data movement between the non-volatile recording medium and the integrated circuit memory element, and the controller(s) and/or computer implemented control system(s) that implements the methods, steps, systems control and system elements control described above is not limited thereto. The controller(s) and/or computer implemented control system(s) is not limited to a particular memory system.

At least part of such a memory system described above may store one or more data structures (e.g., look-up tables) or equations such as calibration curve equations. For example, at least part of the non-volatile recording medium may store at least part of a database that includes one or more of such data structures. Such a database may be any of a variety of types of databases, for example, a file system including one or more flat-file data structures where data is organized into data units separated by delimiters, a relational database where data is organized into data units stored in tables, an object-oriented database where data is organized into data units stored as objects, another type of database, or any combination thereof.

The controller(s) and/or computer implemented control system(s) may include a video and audio data I/O subsystem. An audio portion of the subsystem may include an analog-to-digital (A/D) converter, which receives analog audio information and converts it to digital information. The digital information may be compressed using known compression systems for storage on the hard disk to use at another time. A typical video portion of the I/O subsystem may include a video image compressor/decompressor of which many are known in the art. Such compressor/decompressors convert analog video information into compressed digital information, and vice-versa. The compressed digital information may be stored on hard disk for use at a later time.

The controller(s) and/or computer implemented control system(s) may include one or more output devices. Example output devices include a cathode ray tube (CRT) display, liquid crystal displays (LCD), light-emitting diode (LED) displays, and other video output devices, printers, communication devices such as a modem or network interface, storage devices such as disk or tape, and audio output devices such as a speaker.

The controller(s) and/or computer implemented control system(s) also may include one or more input devices. Example input devices include a keyboard, keypad, track ball, mouse, pen and tablet, communication devices such as described above, and data input devices such as audio and video capture devices and sensors. The controller(s) and/or computer implemented control system(s) is not limited to the particular input or output devices described.

It should be appreciated that one or more of any type of controller(s) and/or computer implemented control system(s) may be used to implement various embodiments described. Functions of the controller(s) and/or computer implemented control system(s) may be implemented in software, hardware or firmware, or any combination thereof. The controller(s) and/or computer implemented control system(s) may include specially programmed, special purpose hardware, for example, an application-specific integrated circuit (ASIC). Such special-purpose hardware may be configured to implement one or more methods, steps, simulations, algorithms, systems control, and system elements control described above as part of the controller(s) and/or computer implemented control system(s) described above or as an independent component.

The controller(s) and/or computer implemented control system(s) and components thereof may be programmable using any of a variety of one or more suitable computer programming languages. Such languages may include procedural programming languages, for example, LabView, C, Pascal, Fortran and BASIC, object-oriented languages, for example, C++, Java and Eiffel and other languages, such as a scripting language or even assembly language.

The methods, steps, simulations, algorithms, systems control, and system elements control may be implemented using any of a variety of suitable programming languages, including procedural programming languages, object-oriented programming languages, other languages and combinations thereof, which may be executed by such a computer system. Such methods, steps, simulations, algorithms, systems control, and system elements control can be implemented as separate modules of a computer program or can be implemented individually as separate computer programs. Such modules and programs can be executed on separate computers.

Such methods, steps, simulations, algorithms, systems control, and system elements control, either individually or in combination, may be implemented as a computer program product tangibly embodied as computer-readable signals on a computer-readable medium, for example, a non-volatile recording medium, an integrated circuit memory element, or a combination thereof. For each such method, step, simulation, algorithm, system control, or system element control, such a computer program product may comprise computer-readable signals tangibly embodied on the computer-readable medium that define instructions, for example, as part of one or more programs, that, as a result of being executed by a computer, instruct the computer to perform the method, step, simulation, algorithm, system control, or system element control.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less)

acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A device for supporting at least a portion of a body of a user, the device comprising:
- a plurality of cells, each individual cell within the plurality of cells comprising or operatively associated with:
  - a bladder configured to contain and be inflatable by a compressible fluid within the bladder;
  - a base adjacent, attached to, forming a fluid-tight seal with, and supporting the bladder, wherein the bladder forms a rolling diaphragm portion with the base, the rolling diaphragm portion configured to roll along the base decreasing a volume and a height of the bladder when a force is applied to the bladder by the body of the user;
  - the base comprising functionally associated therewith:
    - at least one valve in fluidic communication with the bladder, the valve configured to control inflow and/or outflow of the compressible fluid;
    - a pressure sensor adapted and arranged to measure a pressure of the compressible fluid;
    - a height sensor configured to measure the height of the bladder over its full range of motion; and
    - a controller having a processor configured and programmed to:
      - individually control the height and/or pressure of each of the plurality of cells;
      - display/record height/pressure data as a function of time for each cell; and
      - maintain a height of one or more cells of the plurality at a lower height to provide a region of clearance between the bladder and the body of the user.

2. The device of claim 1, wherein any one or more of the valve, the pressure sensor, and/or the height sensor are positioned within the base and/or are integrated into the base.

3. The device of claim 1, wherein any one or more of the valve, the pressure sensor, and/or the height sensor are positioned remotely from the base and are functionally interconnected with the base.

4. The device of claim 1, wherein a width of the bladder does not substantially change when a downward force is applied to the bladder.

5. The device of claim 1, wherein the height sensor comprises a time-of-flight sensor.

6. The device of claim 1, wherein at least the valve is positioned remotely from the base and is functionally interconnected with the base.

7. The device of claim 6, wherein at least the valve and the pressure sensor are positioned remotely from the base and are functionally interconnected with the base.

8. The device of claim 1, wherein a full range of motion of the bladder is between 10 cm and 18 cm.

9. The device of claim 1, comprising additional cells differently sized, configured, and/or positioned than the plurality of cells.

10. The device of preceding claim 9, comprising additional cells fluidically interconnected with each other and configured to be controllable as a group.

11. A device for supporting at least a portion of a body of a user, the device comprising:
- a plurality of cells, each of the cells within the plurality of cells comprising or operatively associated with:
  - a bladder configured to contain and be inflatable by a compressible fluid within the bladder;
  - a base adjacent, attached to, forming a fluid-tight seal with, and supporting the bladder, wherein the bladder forms a rolling diaphragm portion with the base, the rolling diaphragm portion configured to roll along the base decreasing a volume and a height of the bladder when a force is applied to the bladder by the body of the user;
- the base comprising functionally associated therewith:
  - at least one valve in fluidic communication with the bladder, the valve configured to control inflow and/or outflow the compressible fluid;
  - a pressure sensor adapted and arranged to measure a pressure of the compressible fluid; and
  - a height sensor configured to measure the height of the bladder within an accuracy of +/−4 mm over its full range of motion.

12. A device for supporting at least a portion of a body of a user, the device comprising:
- a plurality of cells, each of the cells within the plurality of cells comprising or operatively associated with:
  - a bladder configured to contain and be inflatable by a compressible fluid within the bladder;
  - a base adjacent, attached to, forming a fluid-tight seal with, and supporting the bladder, wherein the bladder forms a rolling diaphragm portion with the base, the rolling diaphragm configured to roll along the base decreasing a volume and a height of the bladder when a force is applied to the bladder by the body of the user; and
  - an optical sensor configured to determine a height of the bladder over its full range of motion independent of a light intensity.

13. The device of claim 12, wherein each of the cells within the plurality of cells further comprises a base adjacent, attached to, forming a fluid-tight seal with, and supporting the bladder, and wherein the base is functionally associated with the optical sensor.

14. The device of claim 12, further comprising a pressure sensor adapted and arranged to measure a pressure of the compressible fluid.

15. A system for providing adjustable and controllable support for at least a portion of a body of a user, the system comprising:
- a plurality of cells, each of the cells within the plurality of cells comprising or operatively associated with:
  - a bladder configured to contain and be inflatable by a compressible fluid within the bladder;

at least one valve in fluidic communication with the bladder, the valve configured to control inflow and/or outflow of the compressible fluid;

a pressure sensor adapted and arranged to measure a pressure of the compressible fluid; and a height sensor configured to measure a height of the bladder over its full range of motion; and a controller operatively associated with each of the cells within the plurality of the cells, the controller comprising a processor, wherein the processor is configured and programmed to:

independently control the pressure of the compressible fluid to an accuracy of +/−10 mmHg, and the height of each bladder to an accuracy of +/−5 mm; and record and/or display the pressure and the height of each bladder.

16. The system of claim 15, wherein the processor is configured and programmed to maintain a height of a subset of bladders at a subset height within an accuracy of +/−20 mm.

17. The system of claim 16, wherein the processor is configured and programmed to maintain a height of the subset of bladders at the subset height within an accuracy of +/−2 mm.

18. A method of supporting a body of a user, the method comprising:

positioning the body of the user adjacent to a plurality of cells, each of the cells within the plurality of cells comprising or operatively associated with:

a bladder;

a compressible fluid within the bladder;

a base adjacent, attached to, forming a fluid-tight seal with, and supporting the bladder, wherein the bladder forms a rolling diaphragm portion with the base, the rolling diaphragm configured to roll along the base when a force is applied to the bladder by the body of the user; and for each cell:

measuring a pressure of the compressible fluid in the bladder with a pressure sensor to an accuracy of +/−10 mmHg;

measuring a height of the bladder with a height sensor configured to determine a height of the bladder to an accuracy of +/−5 mm over its full range of motion; and adjusting the height and/or pressure of the cell.

19. The method of claim 18, comprising adjusting a subset height of a subset of the plurality of cells.

20. The method of claim 19, further comprising positioning the subset of the plurality of cells to subset height different than a height of other cells of the plurality of cells not in the subset.

21. The method of claim 19, further comprising providing a readout of each cell of the subset of the plurality of cells, wherein the readout is indicative of a height value and a pressure value.

22. A device for supporting at least a portion of a body of a user, the device comprising:

a plurality of cells, comprising:

at least one cell comprising between 2 and 20 bladders configured to contain and be inflatable by a compressible fluid within the bladders;

a common base adjacent, attached to, forming a fluid-tight seal with, and supporting each bladder, wherein each bladder forms a rolling diaphragm portion with the base, the rolling diaphragm portion configured to roll along the base decreasing a volume and a height of the bladder when a force is applied to the bladder by the body of the user;

the base containing or comprising functionally associated therewith:

at least one valve in fluidic communication with the bladders, the valve configured to control inflow and/or outflow of the compressible fluid;

at least one pressure sensor adapted and arranged to measure a pressure of the compressible fluid to an accuracy of +/−10 mmHg; and a height sensor associated with each bladder configured to measure the height of each bladder to an accuracy of +/−5 mm over its full range of motion.

* * * * *